US012574102B2

(12) United States Patent
　　Goettle

(10) Patent No.:　US 12,574,102 B2
(45) Date of Patent:　　Mar. 10, 2026

(54) APPARATUS AND METHODS FOR BROADBAND AERONAUTICAL COMMUNICATIONS SYSTEMS

(71) Applicant: Peter E. Goettle, Haymarket, VA (US)

(72) Inventor: Peter E. Goettle, Haymarket, VA (US)

( * ) Notice: Subject to any disclaimer, the term of this patent is extended or adjusted under 35 U.S.C. 154(b) by 267 days.

(21) Appl. No.: 16/286,696

(22) Filed: Feb. 27, 2019

(65) Prior Publication Data

US 2020/0244346 A1　　Jul. 30, 2020

Related U.S. Application Data

(63) Continuation of application No. 16/258,943, filed on Jan. 28, 2019, now abandoned.

(51) Int. Cl.
| | |
|---|---|
| *H04B 7/185* | (2006.01) |
| *H04B 7/0408* | (2017.01) |
| *H04B 7/204* | (2006.01) |
| *H04W 84/00* | (2009.01) |
| *H04W 84/06* | (2009.01) |
| *H04W 88/16* | (2009.01) |

(52) U.S. Cl.
CPC ....... *H04B 7/18508* (2013.01); *H04B 7/0408* (2013.01); *H04B 7/18515* (2013.01); *H04B 7/2041* (2013.01); *H04W 88/16* (2013.01); *H04W 84/005* (2013.01); *H04W 84/06* (2013.01)

(58) Field of Classification Search
CPC .... H01Q 3/2682; H04B 7/043; H04B 7/1851; H04B 7/18534; H04B 7/18547; H04B 7/18595; H04B 7/19; H04J 1/05; H04W 56/0015
See application file for complete search history.

(56) References Cited

U.S. PATENT DOCUMENTS

| | | | | |
|---|---|---|---|---|
| 4,858,225 | A | * | 8/1989 | deSantis ............. H04B 7/2045 |
| | | | | 370/325 |
| 4,931,802 | A | | 6/1990 | Assal |
| 6,175,719 | B1 | | 1/2001 | Sarraf |
| 6,201,797 | B1 | | 3/2001 | Leuca |
| 6,285,878 | B1 | | 9/2001 | Lai |
| 6,529,706 | B1 | | 3/2003 | Mitchell |
| 8,671,432 | B2 | | 3/2014 | Frisco |
| 9,397,745 | B2 | | 7/2016 | Jalali |
| 9,425,888 | B2 | | 8/2016 | Tong |
| 9,848,433 | B2 | | 12/2017 | Freking |
| 9,991,944 | B2 | | 6/2018 | Noerpel |

(Continued)

FOREIGN PATENT DOCUMENTS

| | | | |
|---|---|---|---|
| WO | 1997007609 A2 | 2/1997 | |
| WO | WO-2016209332 A2 * | 12/2016 | ......... H04B 7/18513 |

*Primary Examiner* — Wutchung Chu
*Assistant Examiner* — Berhanu D Belete

(57) ABSTRACT

The invention relates to the implementation of wireless communications in a network, which employs a multi-beam satellite, with an associated satellite service area, and a terrestrial-based capacity augmentation system, such as an air-to-ground communications system and/or an aircraft platform, for broadband Internet service to aeronautical mobile users. The capacity augmentation system may serve users in areas of elevated demand in the satellite service area. The network adapts to changes in demand over the service area and provides smooth service transitions as airplanes fly across the service area.

17 Claims, 48 Drawing Sheets

| Category | 2018 | 2019 | 2020 | 2021 | Avg data rate (Mbps) |
|---|---|---|---|---|---|
| Internet Video | 77% | 79% | 80% | 81% | 0.75 |
| Web, e-mail, social networking, data | 13% | 12% | 11% | 10% | 0.128 |
| Gaming | 3% | 4% | 4% | 5% | 1.0 |
| File sharing | 7% | 5% | 4% | 3% | 1.0 |

Breakdown of Internet traffic according to Cisco VNI traffic assessment

(56) References Cited

U.S. PATENT DOCUMENTS

| | | | | |
|---|---|---|---|---|
| 10,111,109 B2 * | 10/2018 | Hreha | .................... | H04B 7/043 |
| 10,347,987 B2 * | 7/2019 | Hreha | ................. | H04B 7/1851 |
| 2001/0026537 A1 | 10/2001 | Massey | | |
| 2002/0187747 A1 * | 12/2002 | Sawdey | ............... | H04B 7/2045 |
| | | | | 455/13.1 |
| 2003/0207684 A1 * | 11/2003 | Wesel | ............... | H04B 7/18578 |
| | | | | 455/12.1 |
| 2004/0072561 A1 * | 4/2004 | LaPrade | ............. | H04B 7/18582 |
| | | | | 455/430 |
| 2004/0157554 A1 * | 8/2004 | Wesel | .................... | H04B 7/195 |
| | | | | 455/12.1 |
| 2005/0171653 A1 * | 8/2005 | Taylor | ............... | H04B 7/18508 |
| | | | | 455/442 |
| 2006/0030311 A1 * | 2/2006 | Cruz | ....................... | H01Q 1/28 |
| | | | | 455/431 |
| 2008/0064328 A1 * | 3/2008 | Wesel | .................... | H04B 7/195 |
| | | | | 455/13.3 |
| 2009/0186611 A1 * | 7/2009 | Stiles | ................. | H04B 7/18506 |
| | | | | 455/431 |
| 2011/0007686 A1 * | 1/2011 | Burr | ................... | H04B 7/18582 |
| | | | | 370/316 |
| 2011/0053628 A1 * | 3/2011 | Kim | ................... | H04B 7/18539 |
| | | | | 455/509 |
| 2013/0205310 A1 * | 8/2013 | Stahl | ....................... | H04W 4/42 |
| | | | | 725/5 |
| 2013/0205340 A1 * | 8/2013 | Stahl | .................... | H04W 48/04 |
| | | | | 725/39 |
| 2014/0295752 A1 * | 10/2014 | Dankberg | .......... | H04B 7/18513 |
| | | | | 455/12.1 |
| 2015/0188623 A1 * | 7/2015 | Angeletti | .......... | H04B 7/18515 |
| | | | | 455/13.3 |
| 2015/0270891 A1 * | 9/2015 | Re | ....................... | H04W 52/146 |
| | | | | 455/13.4 |
| 2016/0037434 A1 * | 2/2016 | Gopal | .................... | H04L 45/02 |
| | | | | 370/316 |
| 2016/0142130 A1 * | 5/2016 | Hudson | ................. | H04B 7/185 |
| | | | | 370/316 |
| 2016/0234281 A1 * | 8/2016 | Padmanabhan | ......... | H04W 4/18 |
| 2017/0214500 A1 * | 7/2017 | Hreha | .................. | H04W 84/06 |
| 2017/0215176 A1 * | 7/2017 | Chan | .................... | H04B 7/2041 |
| 2017/0215190 A1 * | 7/2017 | Chung | .................. | H04W 72/21 |
| 2018/0006370 A1 * | 1/2018 | Hreha | ................. | H04B 7/1851 |
| 2018/0227350 A1 * | 8/2018 | Padmanabhan | ....... | H04W 4/029 |
| 2018/0234166 A1 * | 8/2018 | Peponides | .......... | H04B 7/18513 |
| 2018/0234167 A1 * | 8/2018 | Foxworthy | ........ | H04B 7/18513 |
| 2018/0242345 A1 * | 8/2018 | Johnson | .................. | H04W 8/04 |
| 2018/0247548 A1 * | 8/2018 | Panchangam | .......... | B64D 43/00 |
| 2019/0123809 A1 * | 4/2019 | Oza | ....................... | H04W 4/021 |
| 2019/0245611 A1 * | 8/2019 | Peponides | ............ | H04L 47/822 |
| 2019/0364583 A1 * | 11/2019 | Johnson | ............. | H04W 72/535 |
| 2020/0007604 A1 * | 1/2020 | Padmanabhan | .... | H04B 7/18584 |

* cited by examiner

| Category | 2018 | 2019 | 2020 | 2021 | Avg data rate (Mbps) |
|---|---|---|---|---|---|
| Internet Video | 77% | 79% | 80% | 81% | 0.75 |
| Web, e-mail, social networking, data | 13% | 12% | 11% | 10% | 0.128 |
| Gaming | 3% | 4% | 4% | 5% | 1.0 |
| File sharing | 7% | 5% | 4% | 3% | 1.0 |

FIG 1. Breakdown of Internet traffic according to Cisco VNI traffic assessment

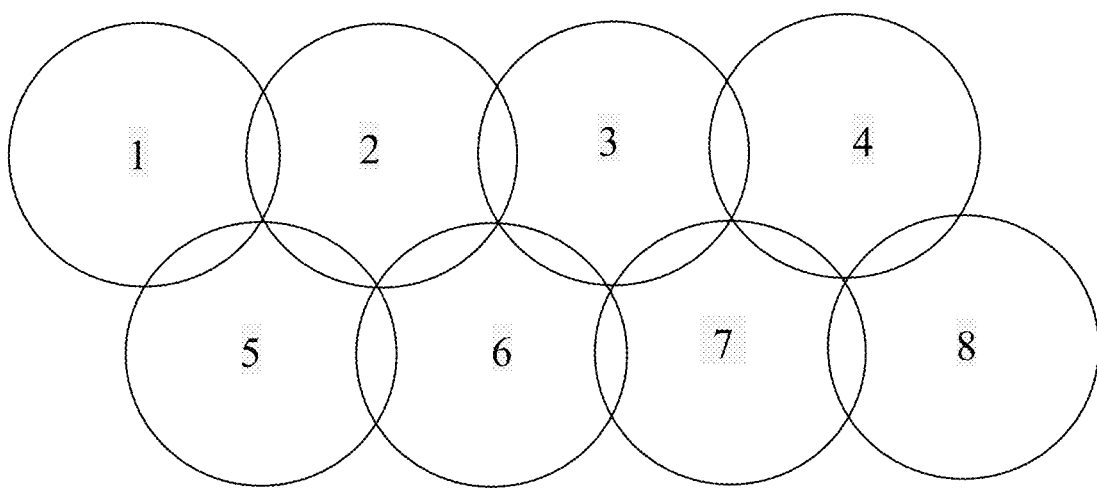
FIG 2. Sample spot beam laydown for a satellite

| Spot Beam Covg Region | Time | | | | | | | | | | | | | | | | Variability: (Max-Min)/ Avg |
|---|---|---|---|---|---|---|---|---|---|---|---|---|---|---|---|---|---|
| | 17:00 | 17:01 | 17:02 | 17:03 | 17:04 | 17:05 | 17:06 | 17:07 | 17:08 | 17:09 | 17:10 | 17:11 | 17:12 | 17:13 | 17:14 | 17:15 | |
| 1 | 20 | 21 | 19 | 17 | 17 | 18 | 19 | 20 | 25 | 23 | 24 | 22 | 24 | 21 | 17 | 16 | 45% |
| 2 | 8 | 6 | 9 | 12 | 9 | 11 | 11 | 15 | 16 | 14 | 9 | 10 | 9 | 9 | 15 | 15 | 90% |
| 3 | 3 | 4 | 0 | 0 | 5 | 4 | 2 | 0 | 0 | 0 | 7 | 11 | 5 | 6 | 6 | 4 | 309% |
| 4 | 16 | 15 | 17 | 19 | 17 | 14 | 17 | 19 | 18 | 16 | 16 | 14 | 13 | 12 | 12 | 14 | 45% |
| 5 | 17 | 21 | 26 | 25 | 26 | 31 | 28 | 23 | 17 | 16 | 18 | 19 | 21 | 24 | 21 | 22 | 68% |
| 6 | 15 | 14 | 7 | 9 | 4 | 0 | 0 | 2 | 8 | 9 | 8 | 13 | 14 | 12 | 15 | 17 | 185% |
| 7 | 8 | 10 | 13 | 14 | 12 | 9 | 6 | 14 | 12 | 17 | 15 | 10 | 11 | 14 | 13 | 10 | 94% |
| 8 | 12 | 11 | 10 | 8 | 9 | 14 | 13 | 12 | 14 | 10 | 13 | 15 | 18 | 19 | 18 | 17 | 83% |
| Total | 99 | 102 | 101 | 104 | 99 | 101 | 96 | 105 | 110 | 105 | 110 | 114 | 115 | 117 | 117 | 115 | 20% |

FIG 3A. Number of airplanes in each spot beam coverage region and in entire service area vs. time

| Spot Beam Covg Region | Airplane Statistics | | | | |
|---|---|---|---|---|---|
| | Min | Max | Avg | Median | Variability: (Max-Min)/ Avg |
| 1 | 16 | 25 | 20 | 20 | 45% |
| 2 | 6 | 16 | 12 | 11 | 85% |
| 3 | 0 | 11 | 4 | 4 | 273% |
| 4 | 12 | 19 | 15 | 16 | 45% |
| 5 | 16 | 31 | 23 | 22 | 67% |
| 6 | 0 | 17 | 9 | 9 | 198% |
| 7 | 6 | 17 | 12 | 12 | 92% |
| 8 | 8 | 19 | 14 | 14 | 80% |
| Svc Area | 96 | 117 | 107 | 105 | 20% |

FIG 3B. Minimum, maximum, average, median, and variability for airplanes in each spot beam coverage region and in entire service area for traffic model in FIG 3A

| Category | % of traffic | # passengers | Avg data rate (Mbps) | Data rate per app (Mbps) | % of passengers |
|---|---|---|---|---|---|
| Internet Video | 86.4% | 122.5 | 0.75 | 91.9 | 70% |
| Web, e-mail, social networking, data | 5.3% | 43.75 | 0.128 | 5.6 | 25% |
| Gaming | 5.0% | 5.25 | 1.0 | 5.3 | 3% |
| File sharing | 3.3% | 3.5 | 1.0 | 3.5 | 2% |
| Total | 100% | 175 | | 106.3 | 100% |

FIG 4. Estimated breakdown of Internet traffic for airplane passengers

| Spot Beam Covg Region | Time | | | | | | | | | | | | | | | |
|---|---|---|---|---|---|---|---|---|---|---|---|---|---|---|---|---|
| | 17:00 | 17:01 | 17:02 | 17:03 | 17:04 | 17:05 | 17:06 | 17:07 | 17:08 | 17:09 | 17:10 | 17:11 | 17:12 | 17:13 | 17:14 | 17:15 |
| 1 | 2126 | 2232 | 2020 | 1807 | 1807 | 1913 | 2020 | 2126 | 2658 | 2445 | 2551 | 2339 | 2551 | 2232 | 1807 | 1701 |
| 2 | 850 | 638 | 957 | 1276 | 957 | 1169 | 1169 | 1595 | 1701 | 1488 | 957 | 1063 | 957 | 957 | 1595 | 1595 |
| 3 | 319 | 425 | 0 | 0 | 532 | 425 | 213 | 0 | 0 | 0 | 744 | 1169 | 532 | 638 | 638 | 425 |
| 4 | 1701 | 1595 | 1807 | 2020 | 1807 | 1488 | 1807 | 2020 | 1913 | 1701 | 1701 | 1488 | 1382 | 1276 | 1276 | 1488 |
| 5 | 1807 | 2232 | 2764 | 2658 | 2764 | 3295 | 2976 | 2445 | 1807 | 1701 | 1913 | 2020 | 2232 | 2551 | 2232 | 2339 |
| 6 | 1595 | 1488 | 744 | 957 | 425 | 0 | 0 | 213 | 850 | 957 | 850 | 1382 | 1488 | 1276 | 1595 | 1807 |
| 7 | 850 | 1063 | 1382 | 1488 | 1276 | 957 | 638 | 1488 | 1276 | 1807 | 1595 | 1063 | 1169 | 1488 | 1382 | 1063 |
| 8 | 1276 | 1169 | 1063 | 850 | 957 | 1488 | 1382 | 1276 | 1488 | 1063 | 1382 | 1595 | 1913 | 2020 | 1913 | 1807 |
| Total | 10524 | 10843 | 10736 | 11055 | 10524 | 10736 | 10205 | 11162 | 11693 | 11162 | 11693 | 12118 | 12225 | 12437 | 12437 | 12225 |

FIG 5A. Table illustrating demand (Mbps) in each spot beam coverage region and the entire service area over a 15-minute span

| Spot Beam Covg Region | Demand Statistics | | | | |
|---|---|---|---|---|---|
| | Min | Max | Avg | Median | Variability: (Max-Min)/ Avg |
| 1 | 1701 | 2658 | 2146 | 2126 | 45% |
| 2 | 638 | 1701 | 1250 | 1176 | 85% |
| 3 | 0 | 1169 | 429 | 425 | 273% |
| 4 | 1276 | 2020 | 1645 | 1678 | 45% |
| 5 | 1701 | 3295 | 2393 | 2349 | 67% |
| 6 | 0 | 1807 | 911 | 957 | 198% |
| 7 | 638 | 1807 | 1274 | 1276 | 92% |
| 8 | 850 | 2020 | 1464 | 1452 | 80% |
| Svc Area | 10205 | 12437 | 11361 | 11162 | 20% |

FIG 5B.  Table illustrating demand statistics (Mbps) for each spot beam coverage region and the entire service area

| Sum of Maximum Demand | 16477 Mbps |
|---|---|

FIG 5C.  Sum of maximum demand levels (Mbps) in each spot beam coverage region

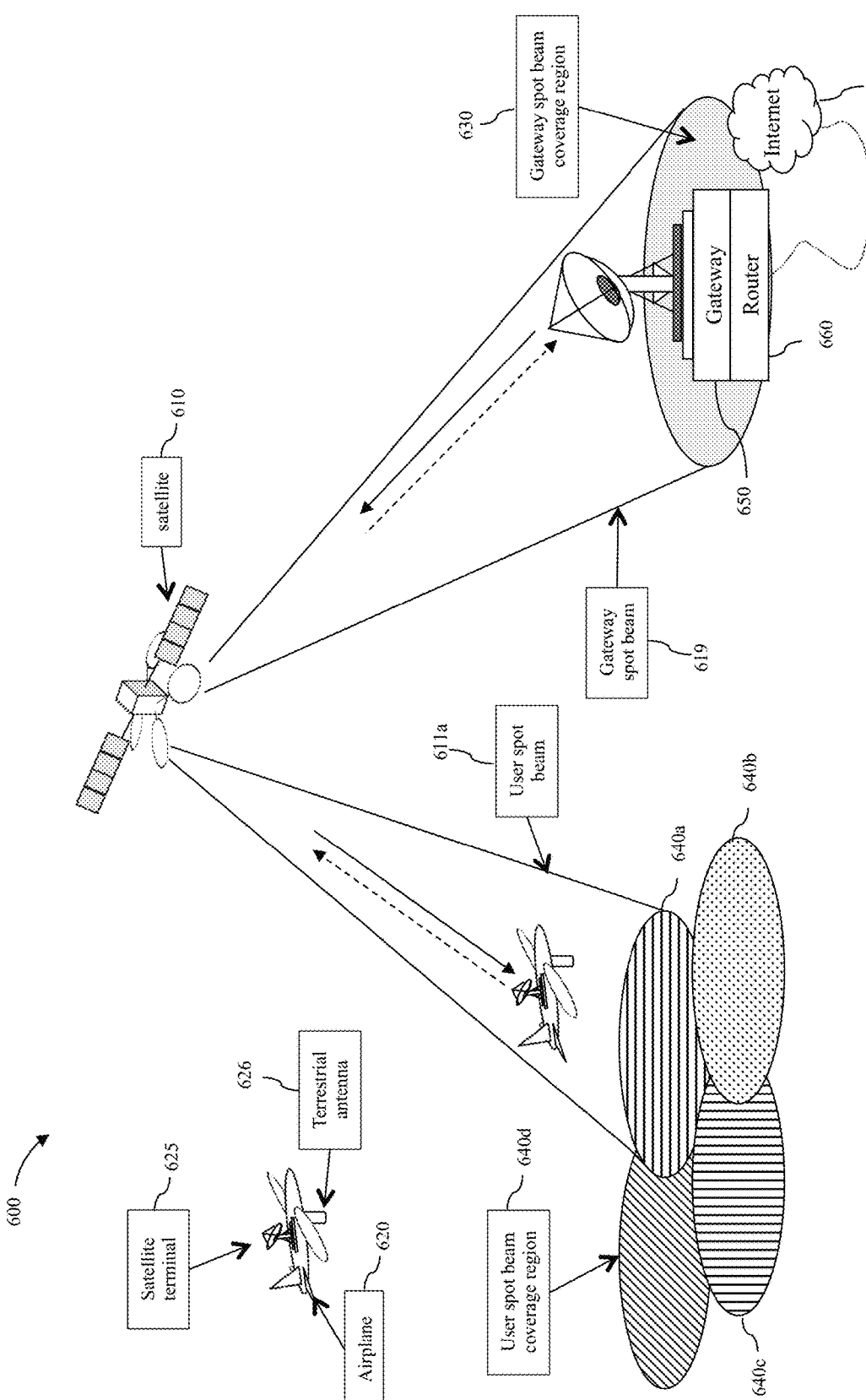
FIG 6. Depiction of example components in a satellite-based aeronautical communications network

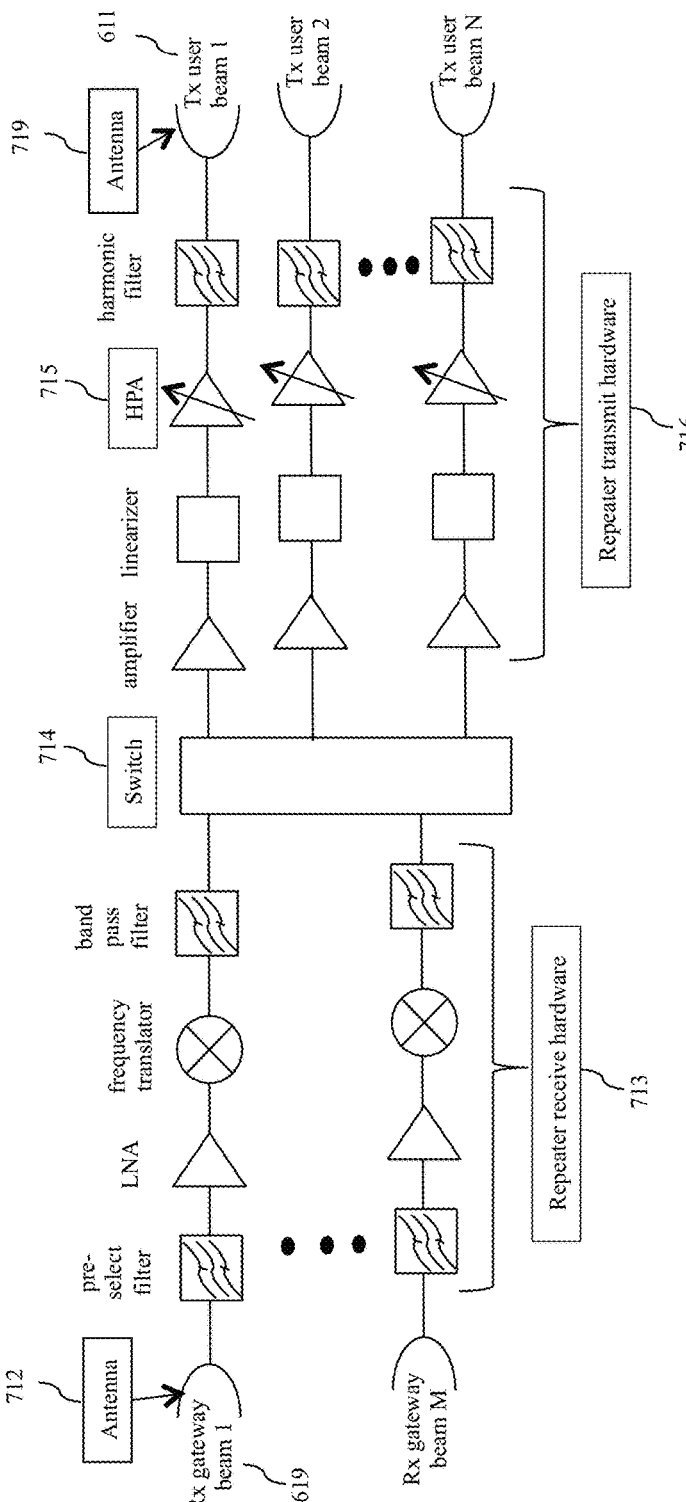
FIG 7A. Example satellite payload block diagram for forward link channels with switched interconnections between gateway and user beam channels

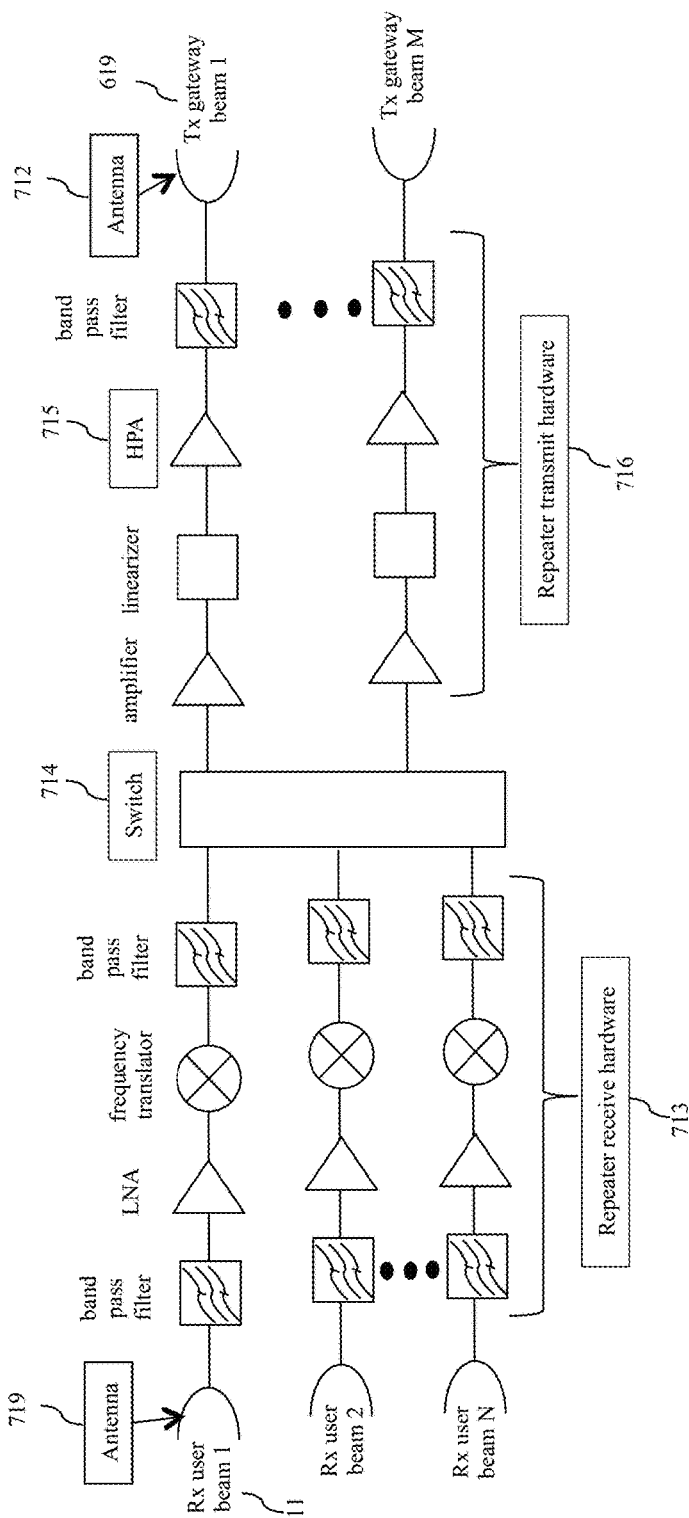
FIG 7B. Example satellite payload block diagram for return link channels with switched interconnections between gateway and user beam channels

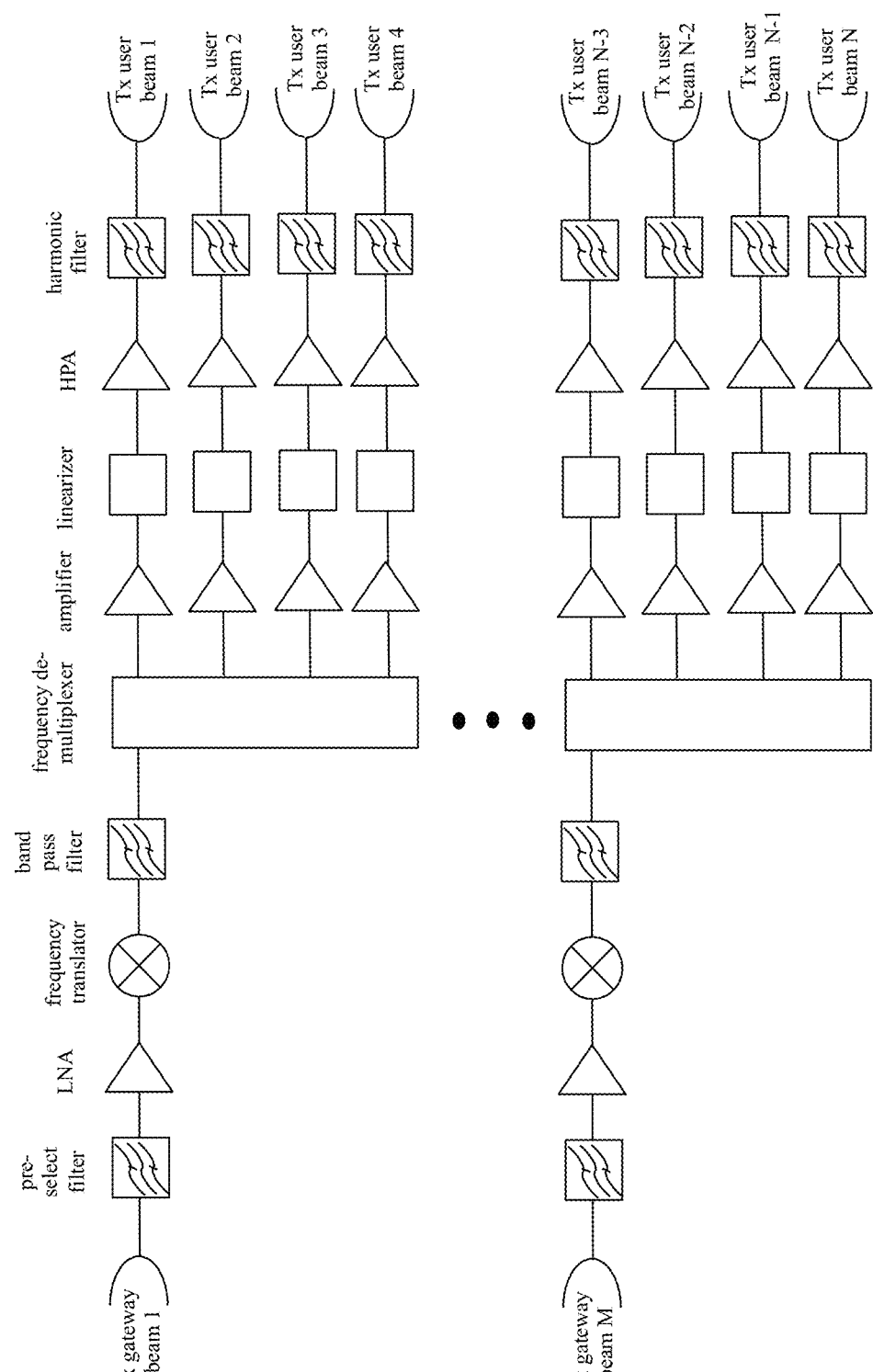
FIG 8A.  Example payload block diagram for forward link channels with static connectivity between gateway and user beams

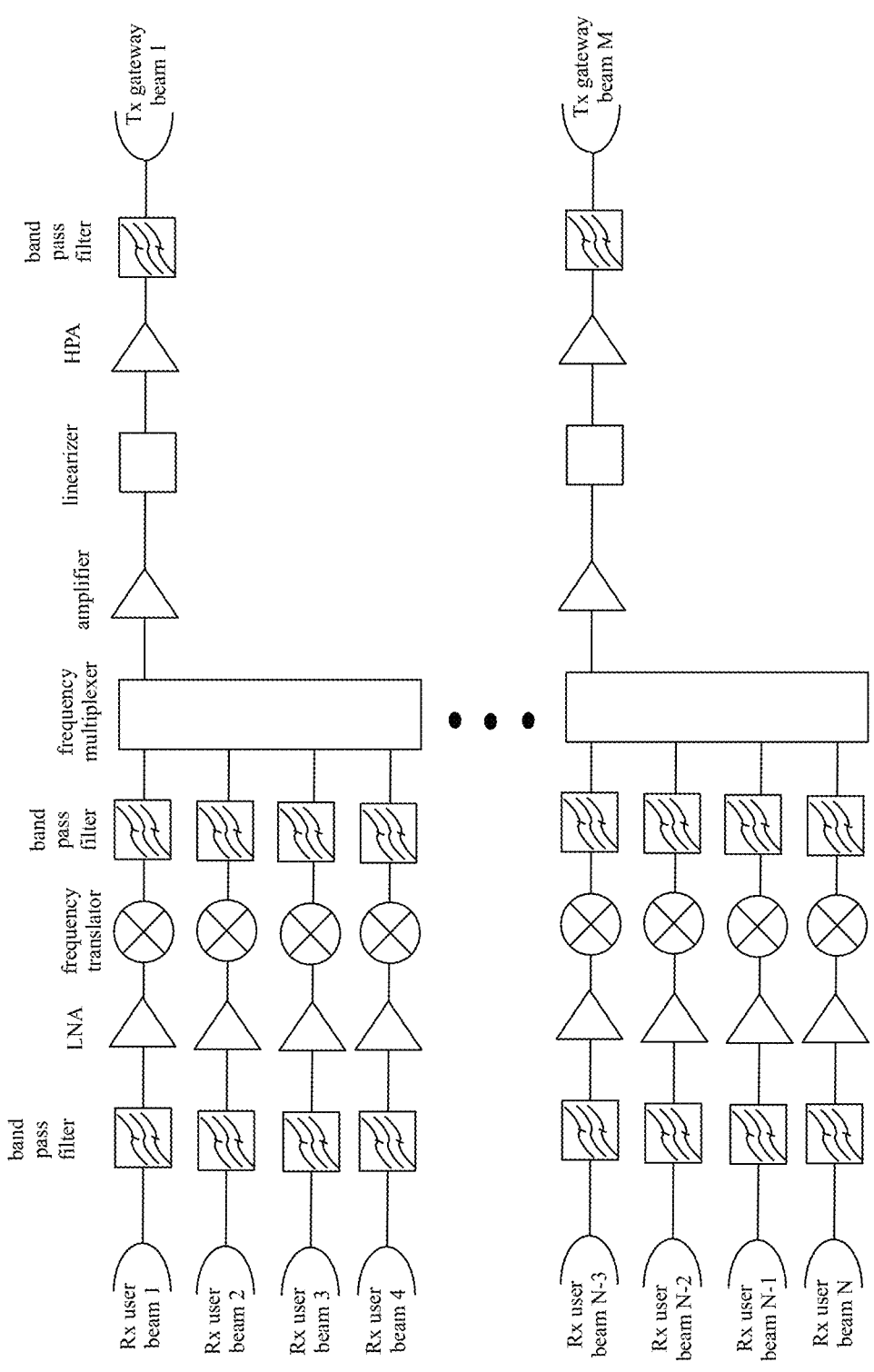
FIG 8B.   Example payload block diagram for return link channels with static connectivity between gateway and user beams

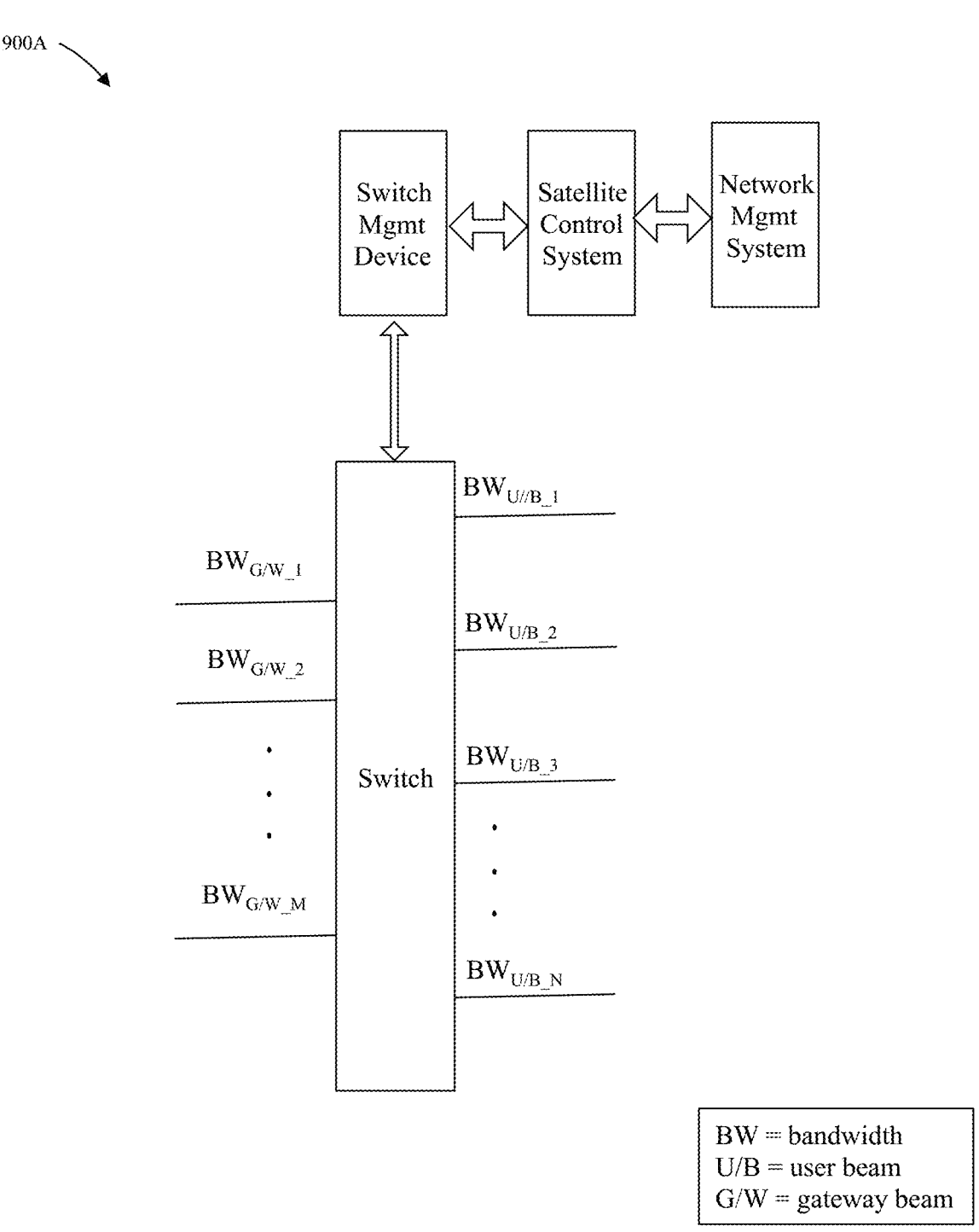
FIG 9A. Block diagram for switch and switch management device to permit flexible interconnection of gateway and user beam channels for forward links

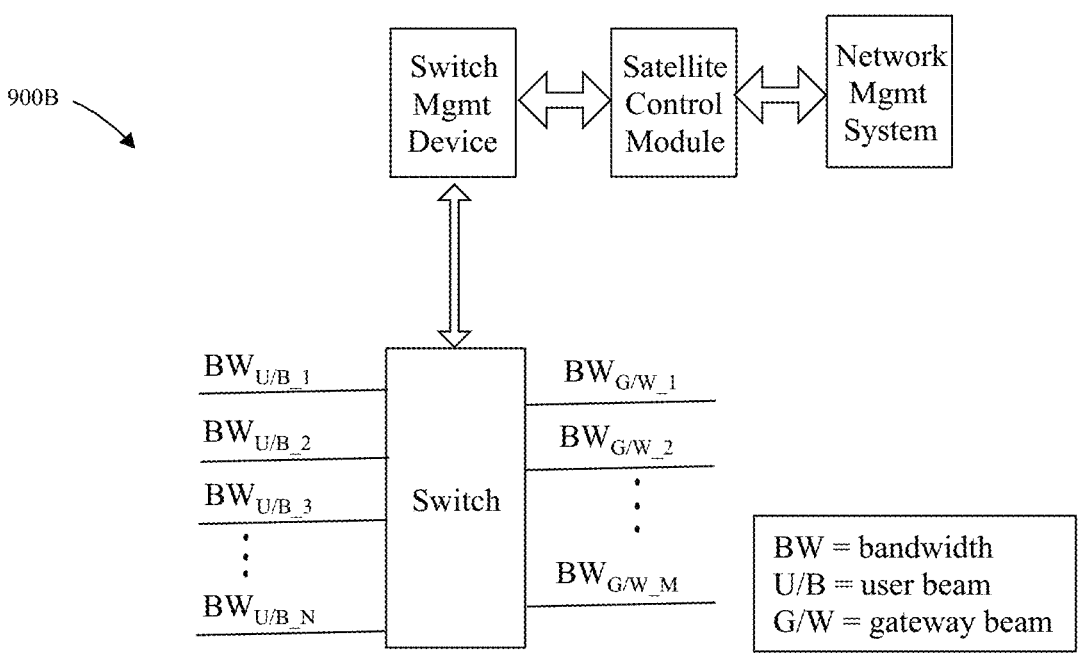
FIG 9B. Depiction of block diagram for switch and switch management device to permit flexible interconnection of gateway and user beam channels for return links
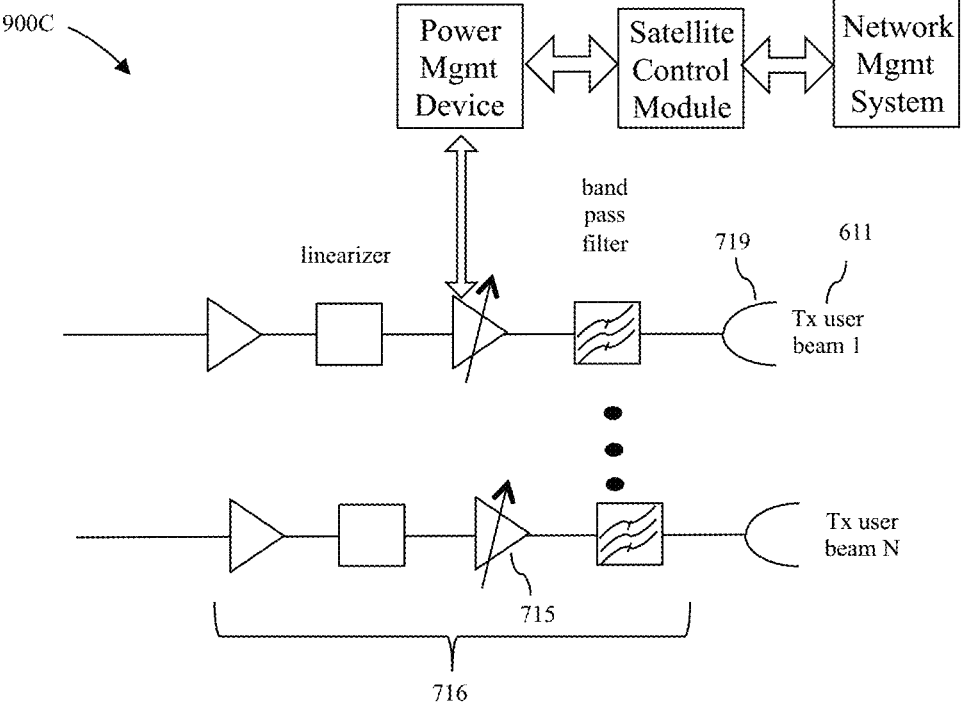
FIG 9C. Depiction of block diagram for output section of satellite repeater with variable power HPA and power management device to enable variable user beam EIRP

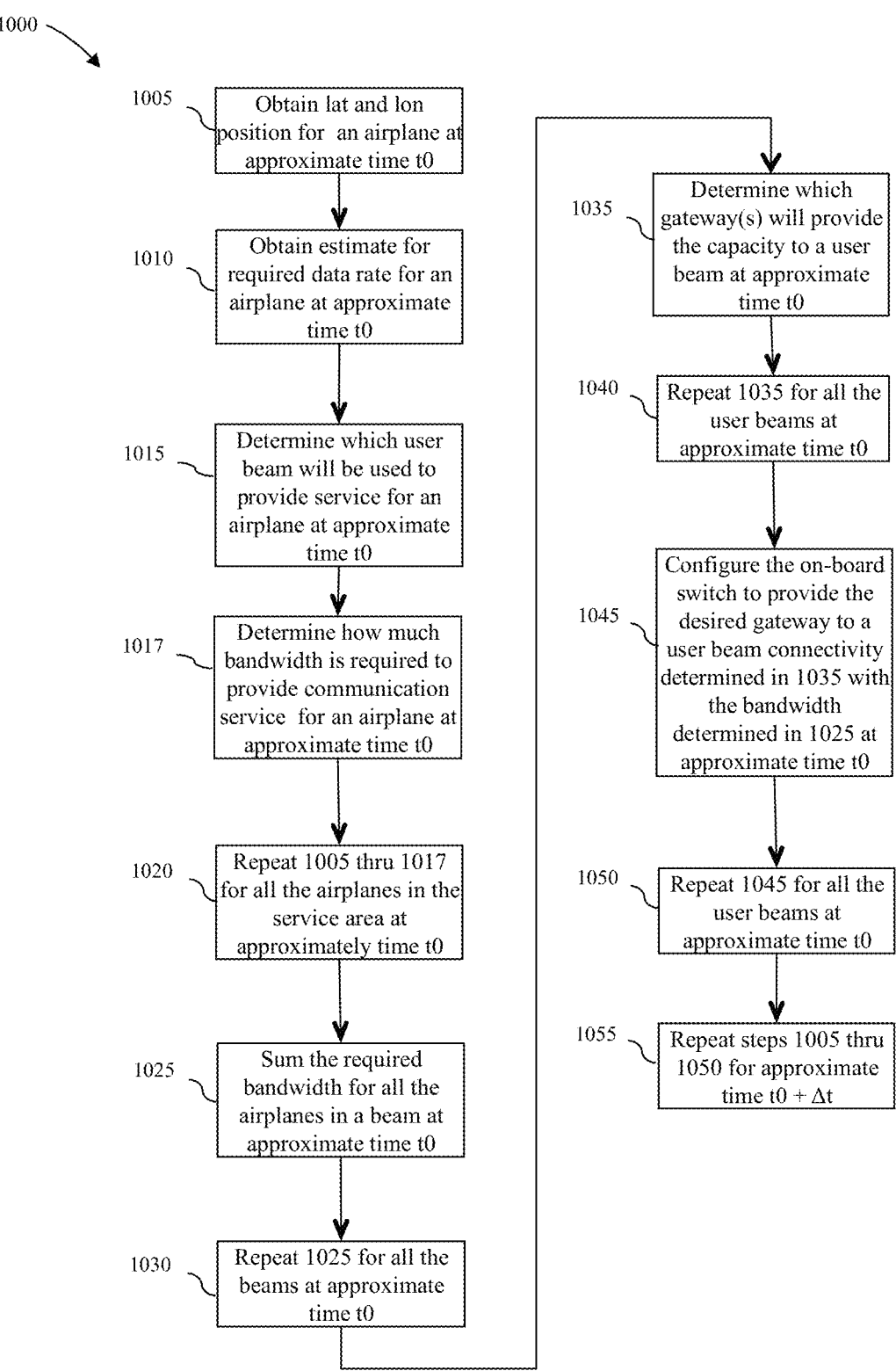
FIG 10.  Method for setting and adjusting connectivity and bandwidth of
connection between gateway and user beams

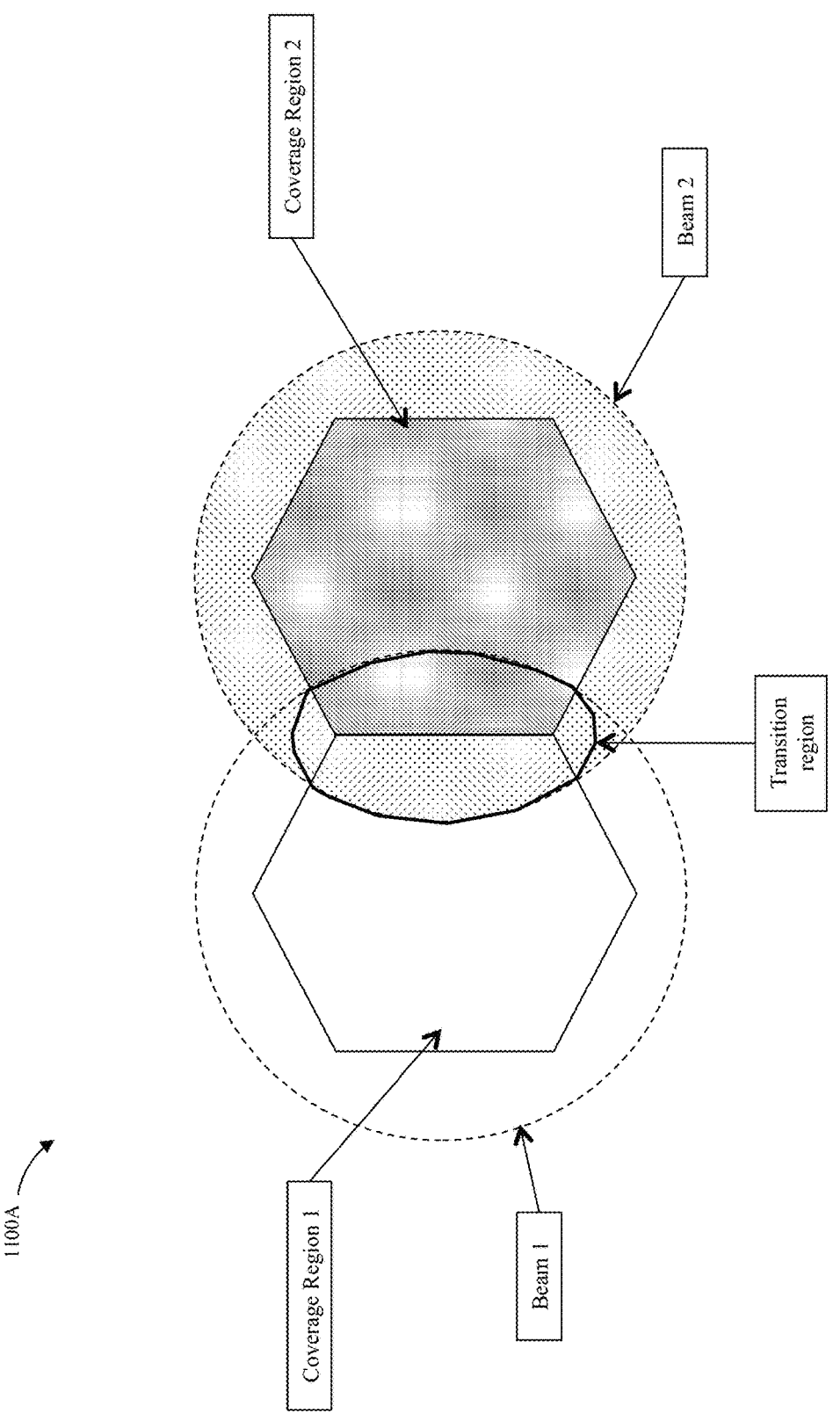
1100A
Coverage Region 2
Beam 2
Transition region
Coverage Region 1
Beam 1
FIG 11A. Example of transition region between two beams

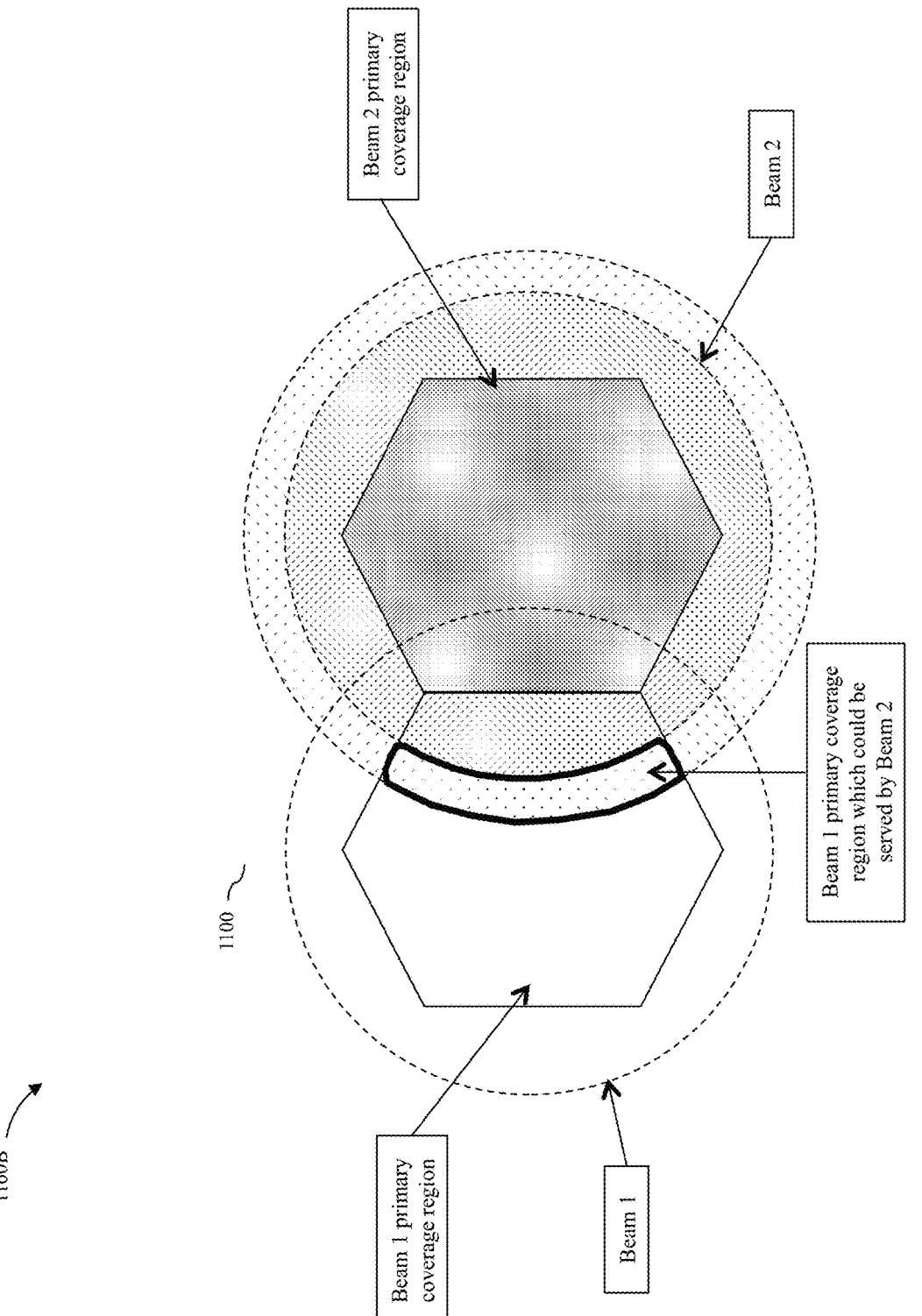
FIG 11B. Example of alternative beam serving a coverage region

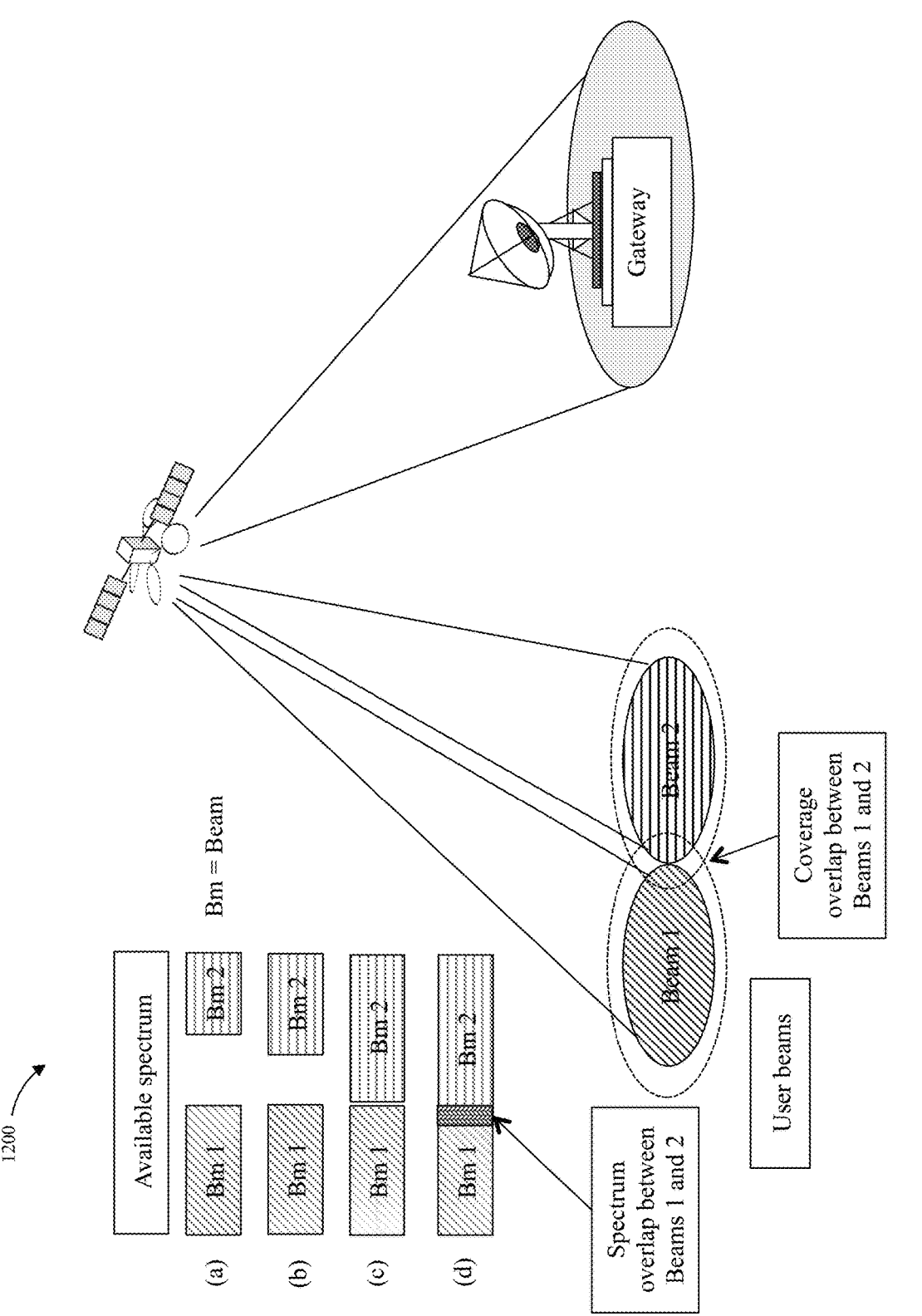
FIG 12. Depiction of gateway-user beam connection bandwidth adjustment and adjustment limitations for a multi-beam satellite

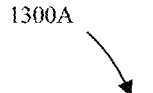
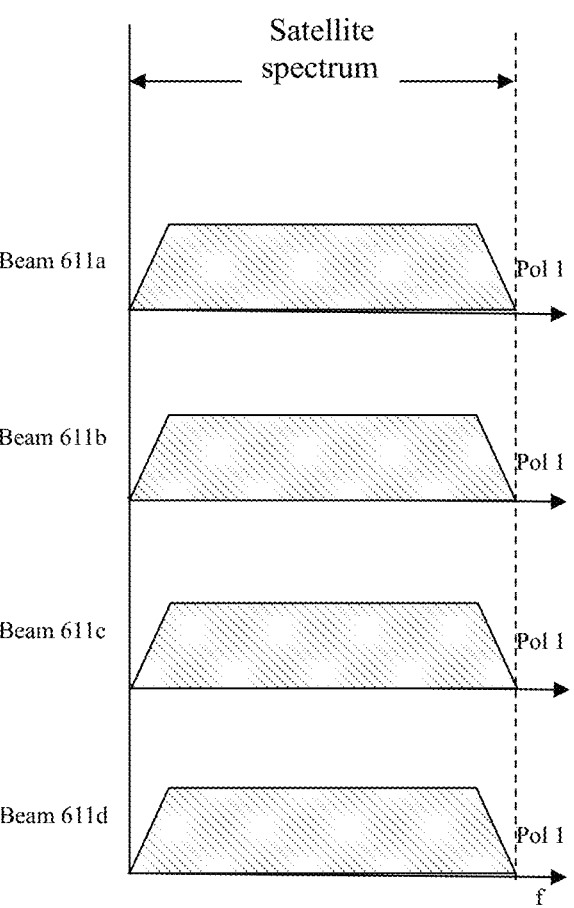
FIG 13A. User beam spectrum allocation for satellite beams for a
beam hopping system 1300B
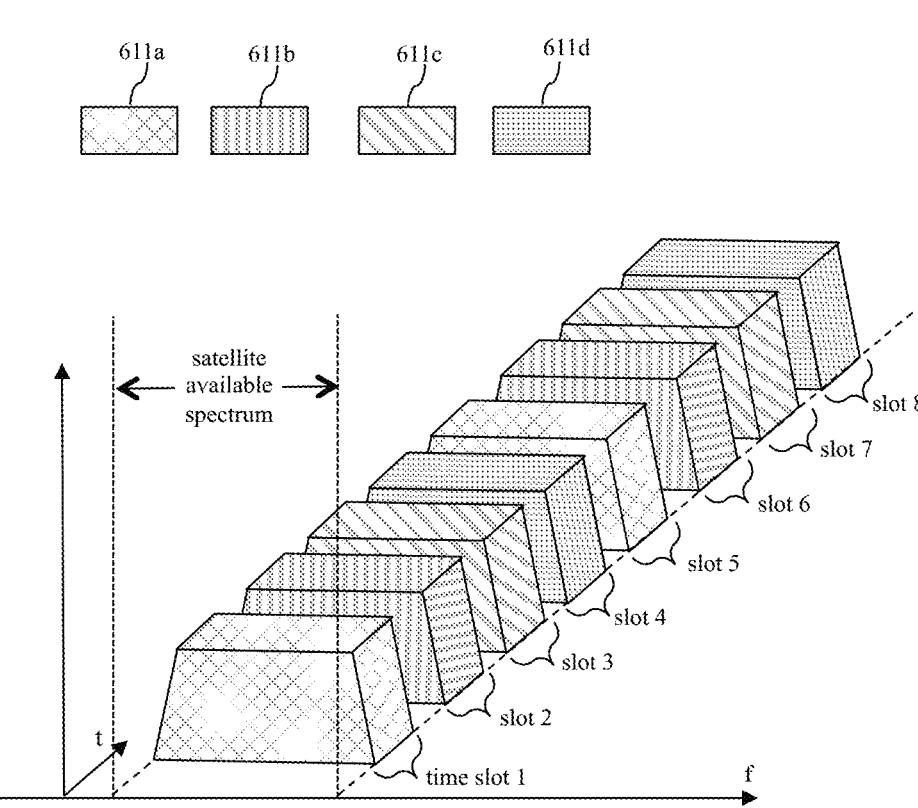
FIG 13B. Timing and frequency allocations for satellite spot beams in
beam hopping system

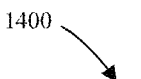
| Spot Beam Covg Region | Demand Statistics | | | | |
|---|---|---|---|---|---|
| | Max Demand (Mbps) | Max Capacity in Sat Beam (Mbps) | Unmet Demand (Mbps) | HAPS and/or ATG | Variability: (Max-Min)/ Avg |
| 1 | 2658 | 2025 | 633 | Y | 45% |
| 2 | 1701 | 2025 | 0 | N | 85% |
| 3 | 1169 | 2025 | 0 | N | 273% |
| 4 | 2020 | 2025 | 0 | N | 45% |
| 5 | 3295 | 2025 | 1270 | Y | 67% |
| 6 | 1807 | 2025 | 0 | Y | 198% |
| 7 | 1807 | 2025 | 0 | N | 92% |
| 8 | 2020 | 2025 | 0 | N | 80% |
FIG 14. Demand in individual coverage regions, maximum capacity supplied in an individual coverage region, and unmet demand in each coverage region

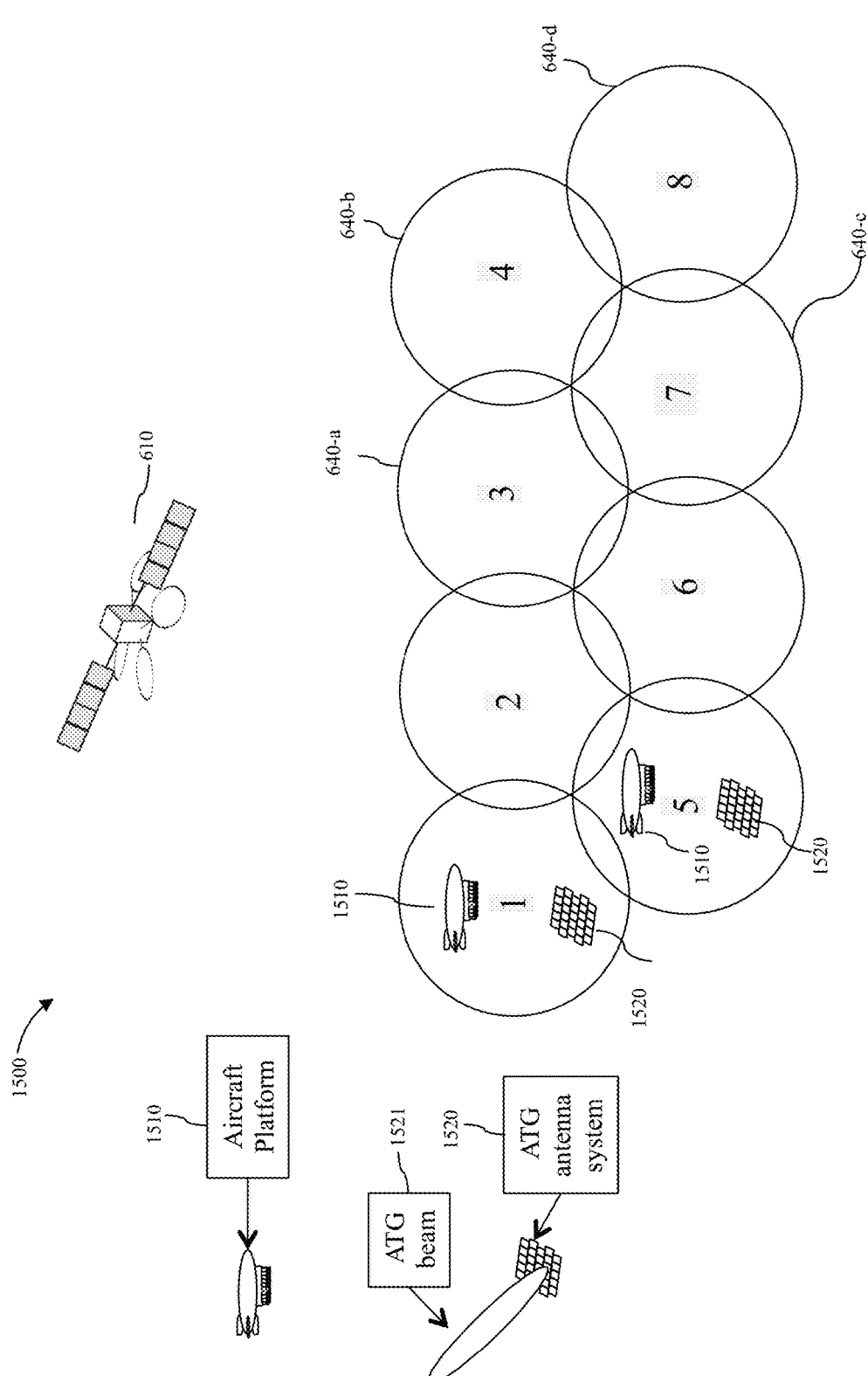
FIG 15. Depiction of service allocation among satellite, aircraft platform, and ATG systems for regions for which satellite capacity is sufficient and regions for which satellite capacity alone is insufficient.

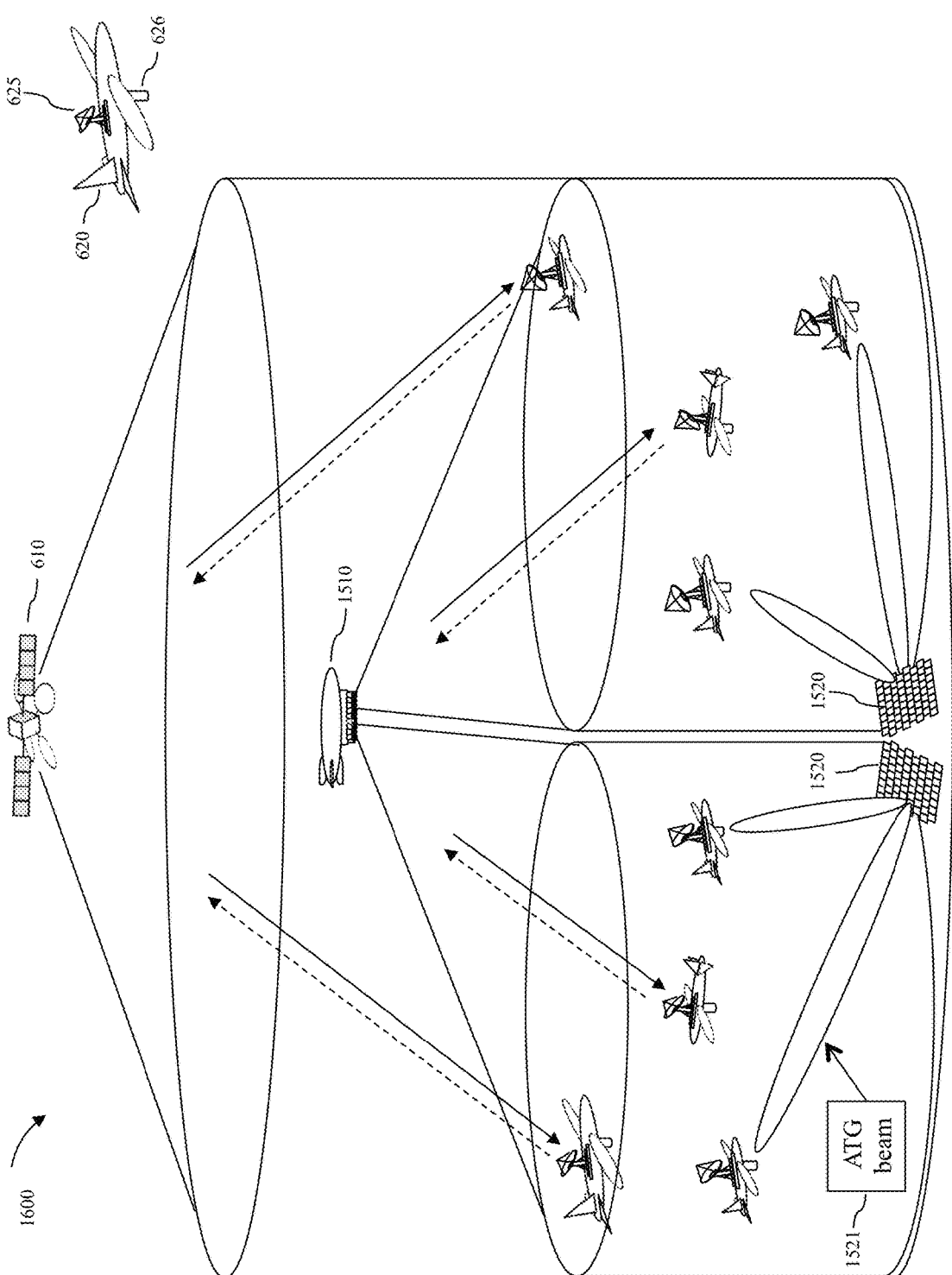
FIG 16. Depiction of service allocation example among satellite, aircraft platform, and ATG systems for an individual satellite beam coverage region

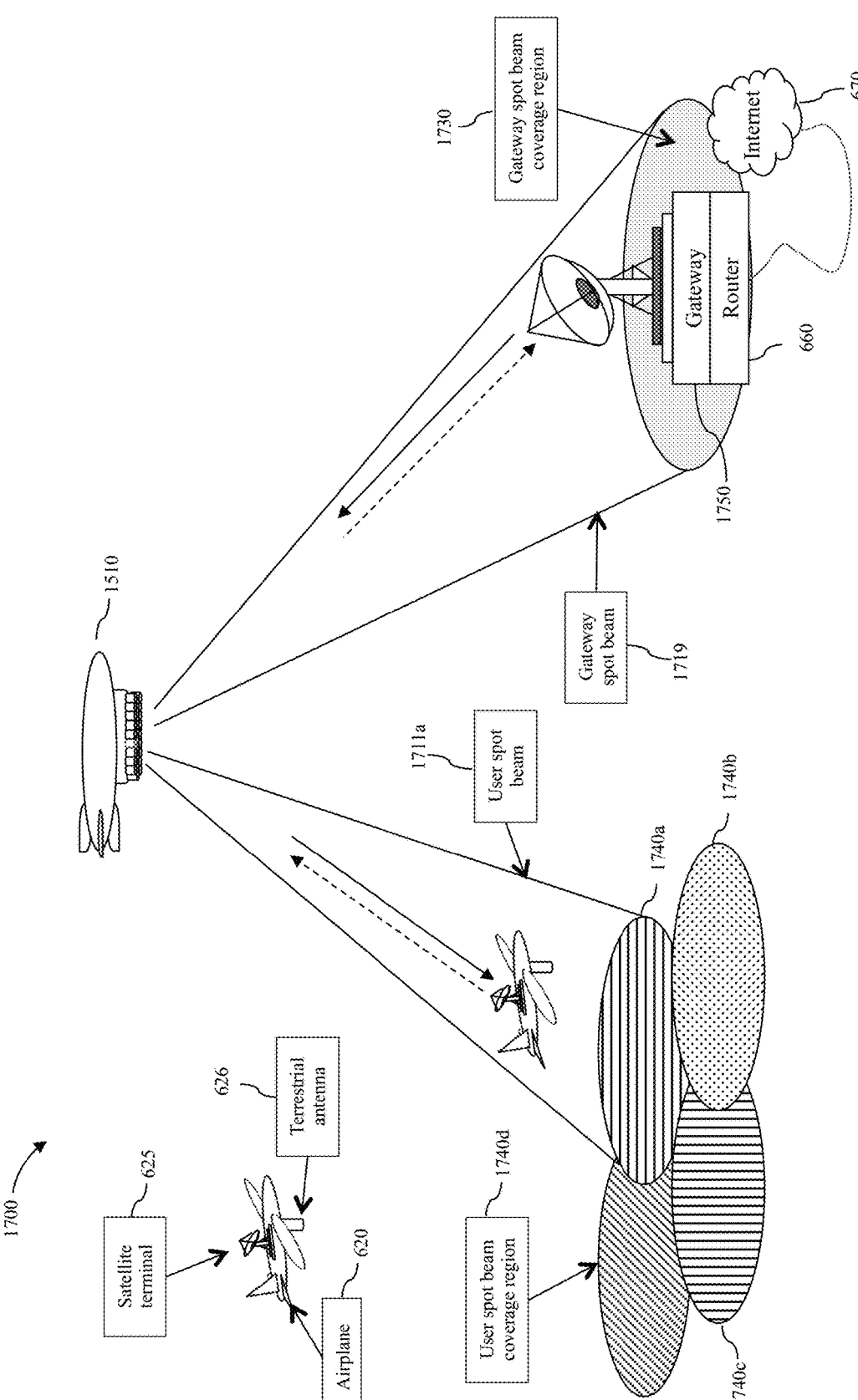
FIG 17. Depiction of elements of an aircraft platform-based aeronautical broadband communications network

| Airplane Elev Angle (deg) | HAPS Altitude (km) | | 20 |
| | Airplane Alt (km) | | 9 |
| | Slant Range (km) | Service Diameter (km) | Nadir Ang (deg) |
| --- | --- | --- | --- |
| 5 | 114.5 | 227.8 | 84.0 |
| 10 | 61.7 | 121.3 | 79.5 |
| 15 | 42.0 | 81.0 | 74.6 |
| 20 | 32.0 | 60.0 | 69.7 |
| 25 | 25.9 | 46.9 | 64.8 |
| 30 | 21.9 | 37.9 | 59.8 |
| 35 | 19.1 | 31.3 | 54.9 |
| 40 | 17.1 | 26.1 | 49.9 |
| 45 | 15.5 | 21.9 | 44.9 |
| 50 | 14.4 | 18.4 | 39.9 |
| 55 | 13.4 | 15.4 | 34.9 |
| 60 | 12.7 | 12.7 | 29.9 |
| 65 | 12.1 | 10.2 | 25.0 |
| 70 | 11.7 | 8.0 | 20.0 |
| 75 | 11.4 | 5.9 | 15.0 |
| 80 | 11.2 | 3.9 | 10.0 |
| 85 | 11.0 | 1.9 | 5.0 |
| 90 | 11.0 | 0.0 | 0.0 |
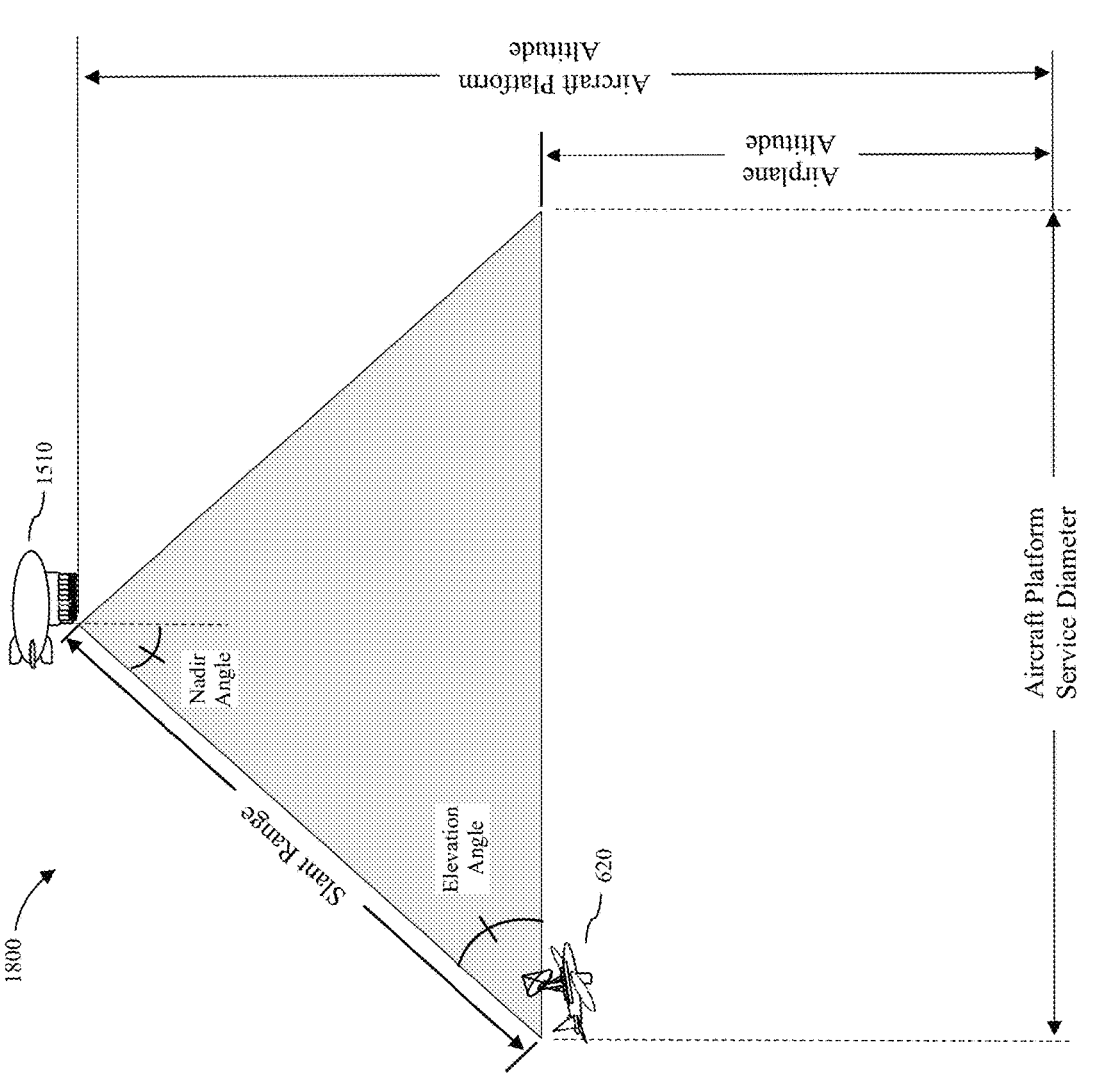
FIG 18. Aircraft platform-airplane geometry with table showing aircraft platform service diameter and other parameters vs. airplane elevation angle towards aircraft platform

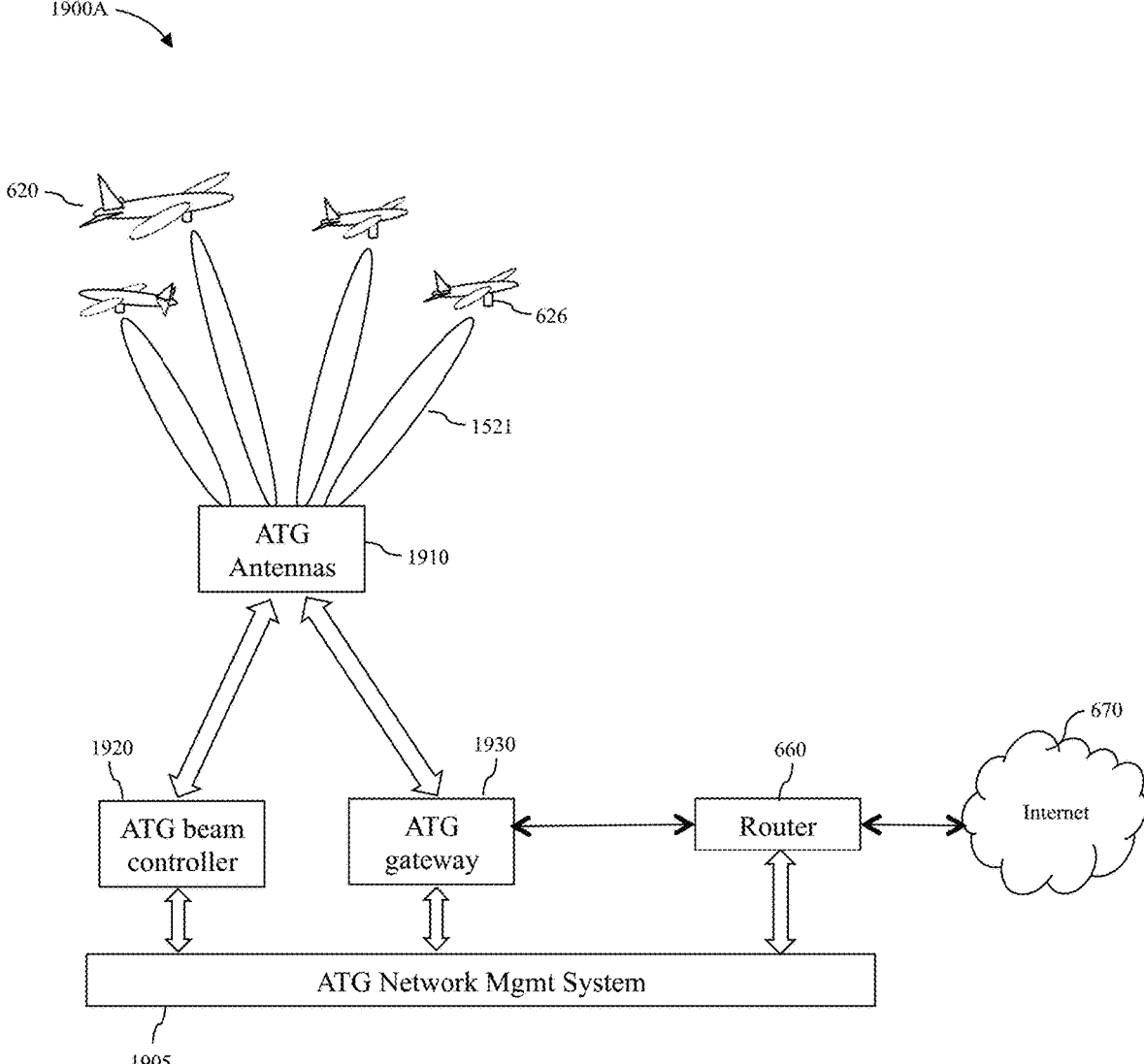
FIG 19A. Depiction key elements of an ATG-based aeronautical broadband
communications network

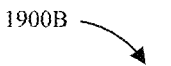
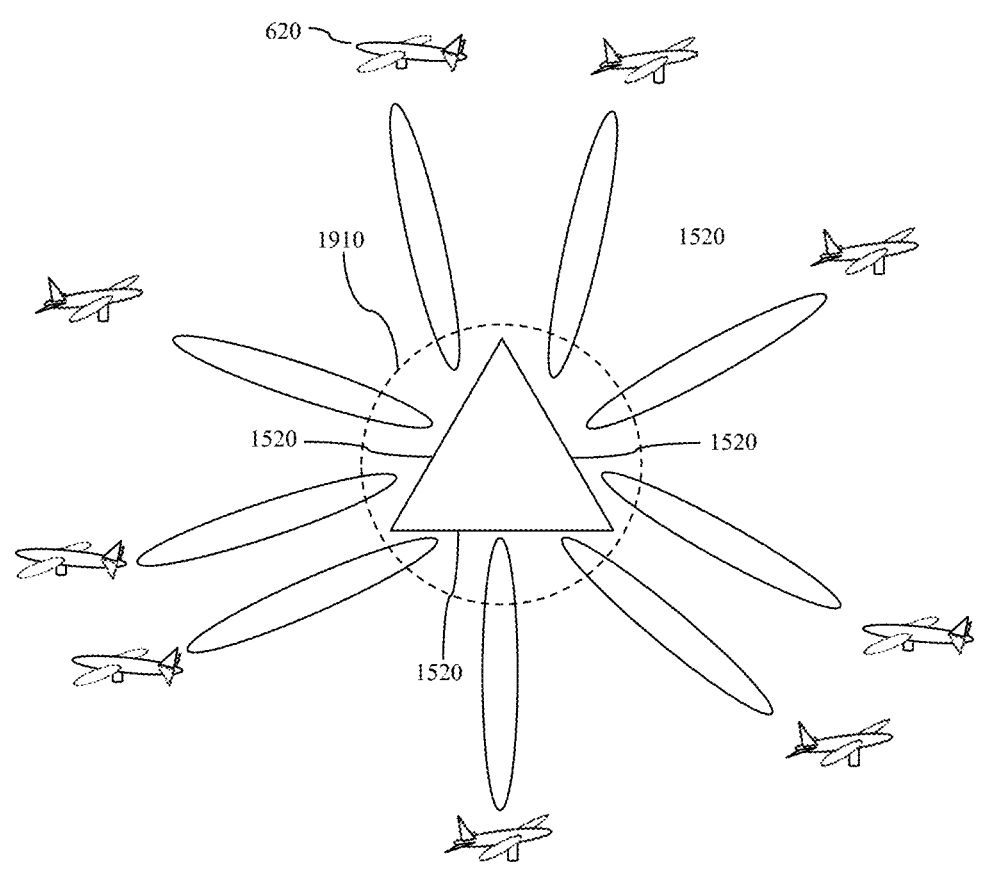
FIG 19B. Depiction of a single site ATG antenna concept to provide 360 degrees of coverage

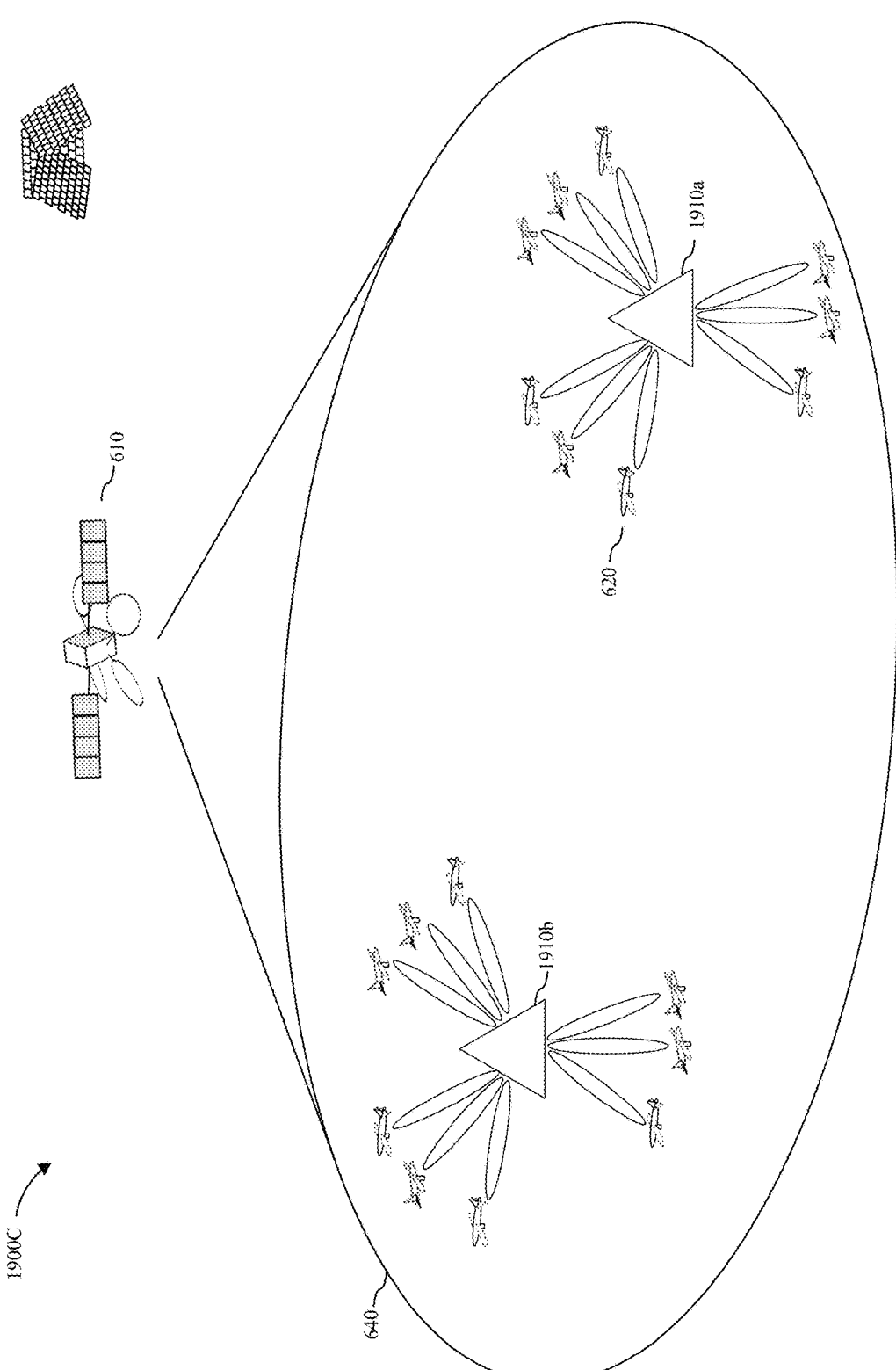
FIG 19C. Depiction of ATG antenna concept at multiple sites in a spot beam coverage region

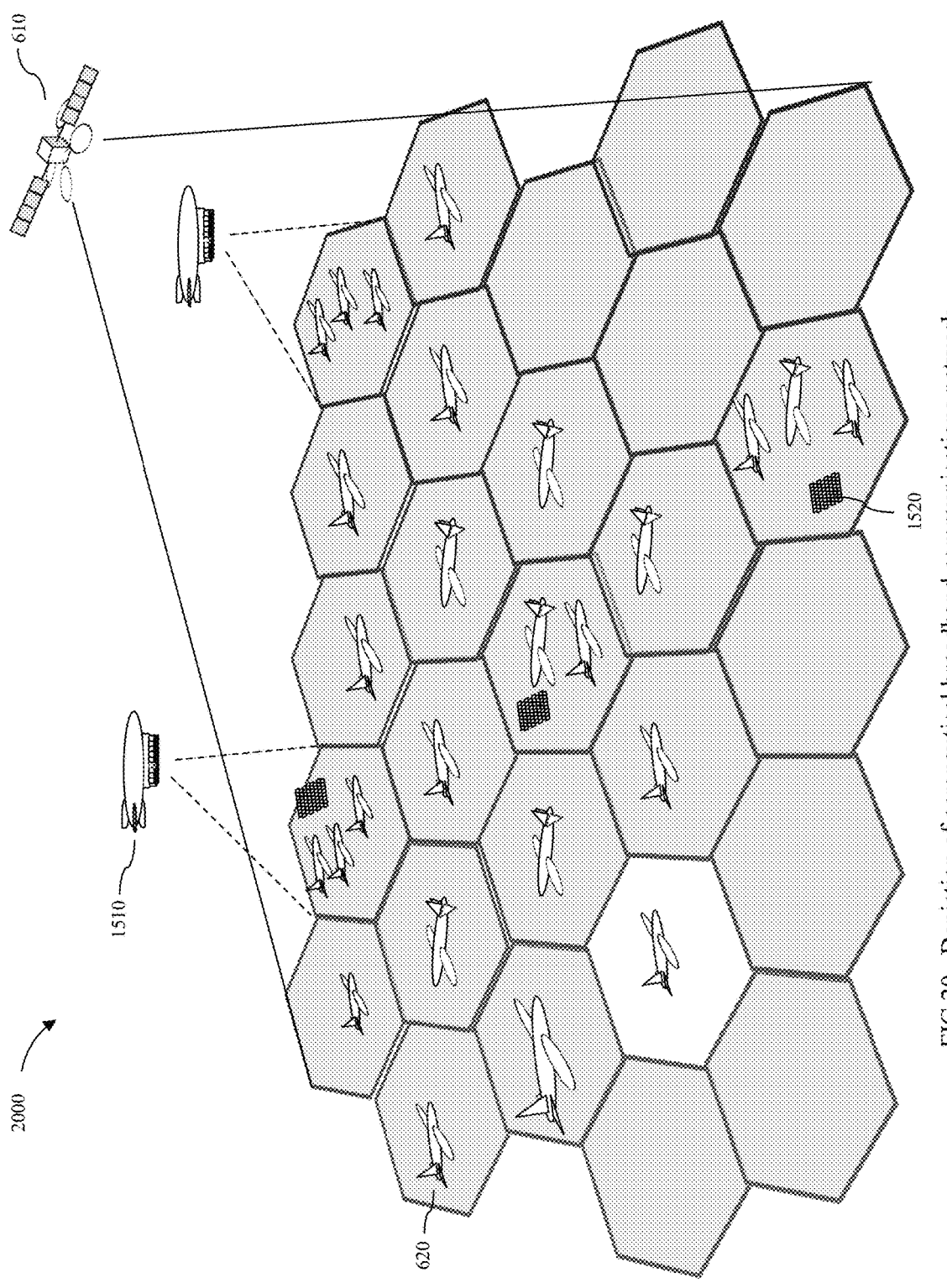
FIG 20. Depiction of aeronautical broadband communications network architecture, featuring satellite, aircraft platform, and ATG systems 2100
2105
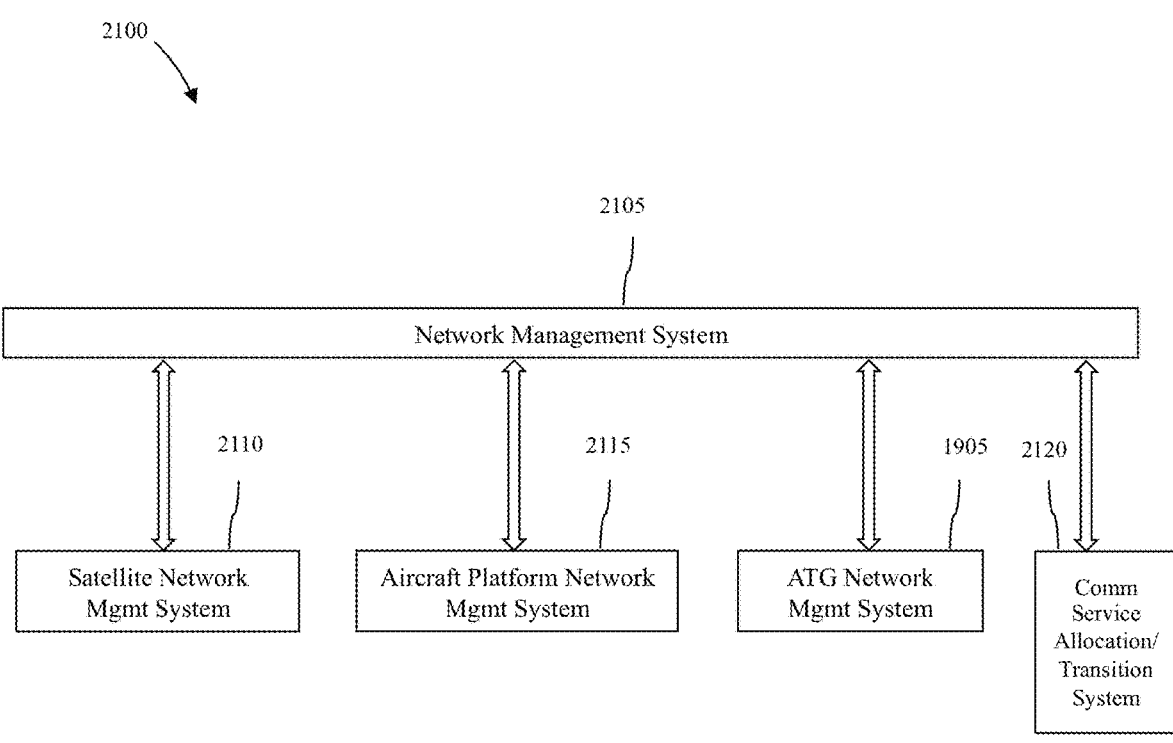
FIG 21.  High level architecture of the Network Management System for
aeronautical broadband communication service

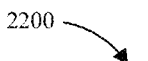
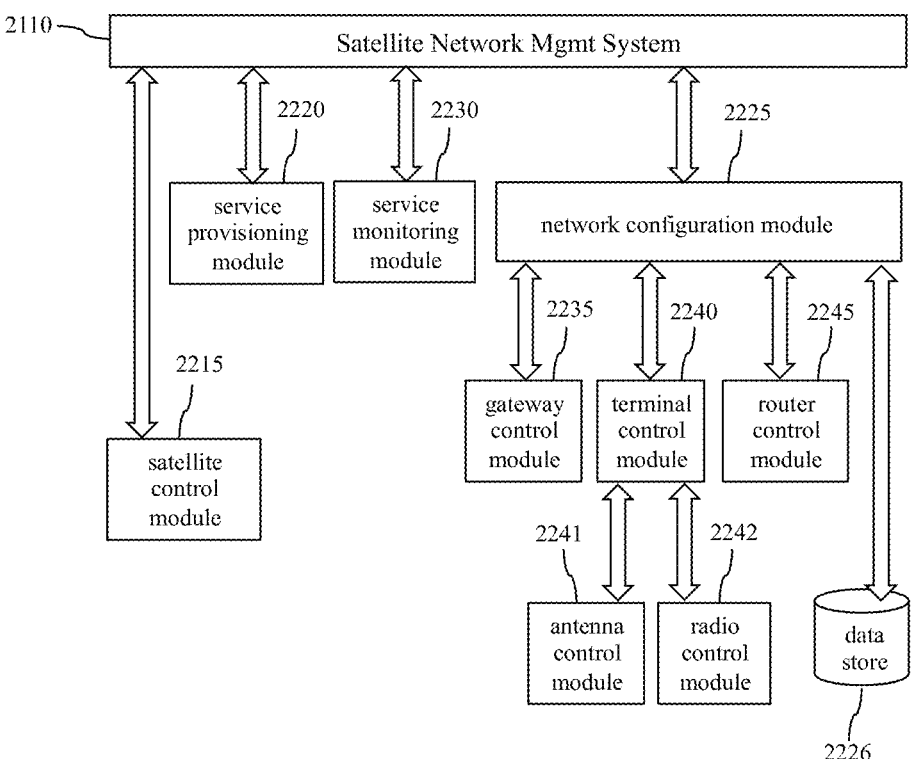
FIG 22.  High level architecture of the Satellite Management System

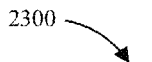
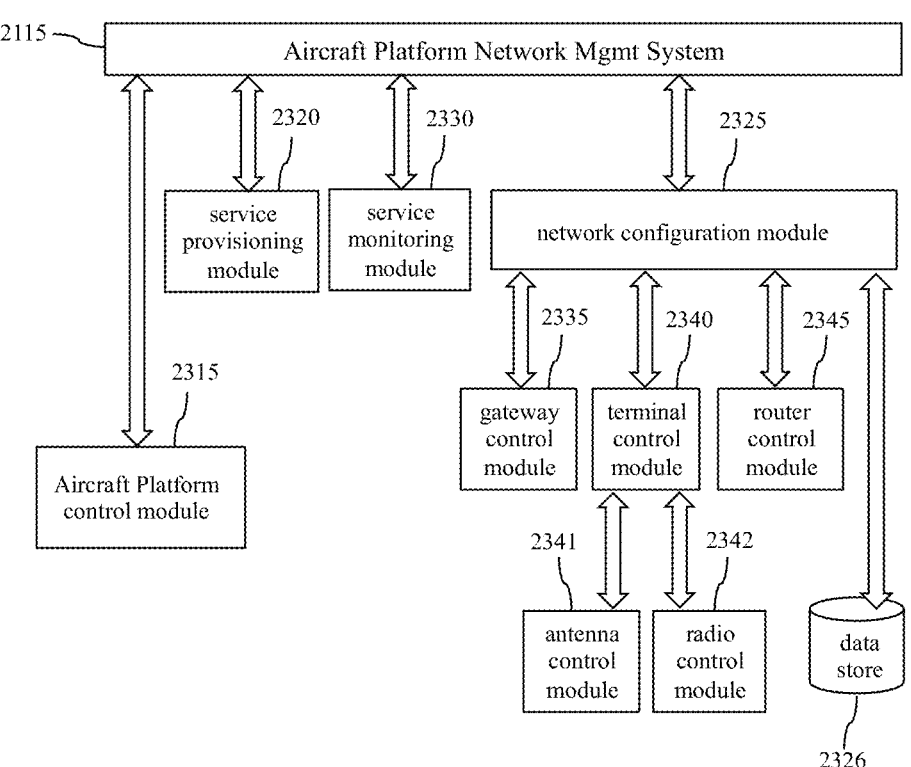
FIG 23.  High level architecture of the Aircraft Platform Management System

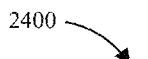
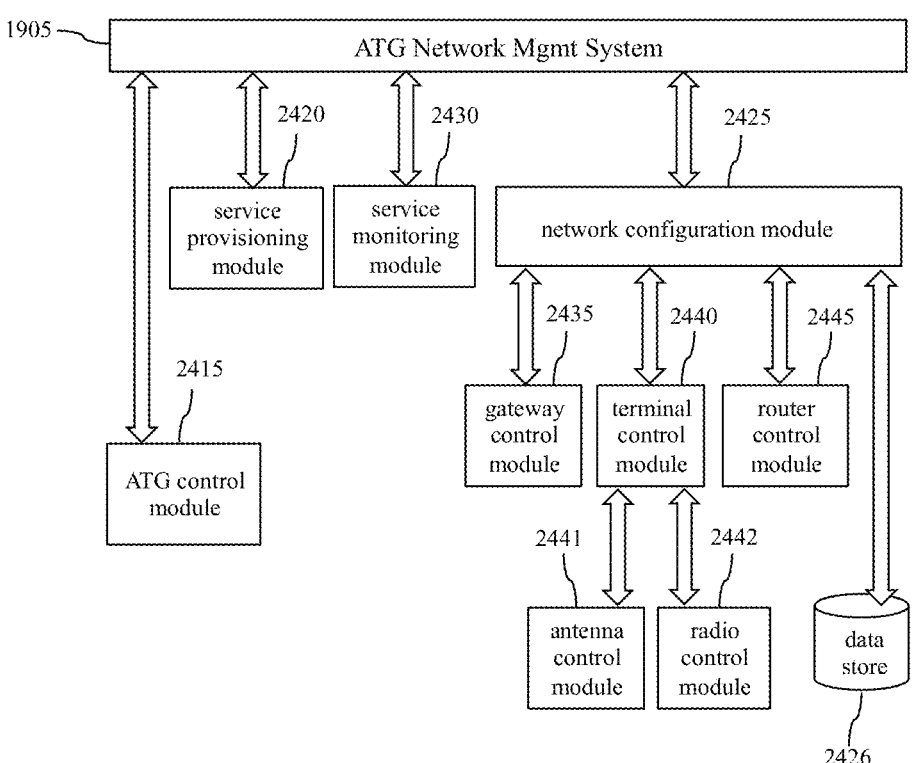
FIG 24. High level architecture of the ATG Management System

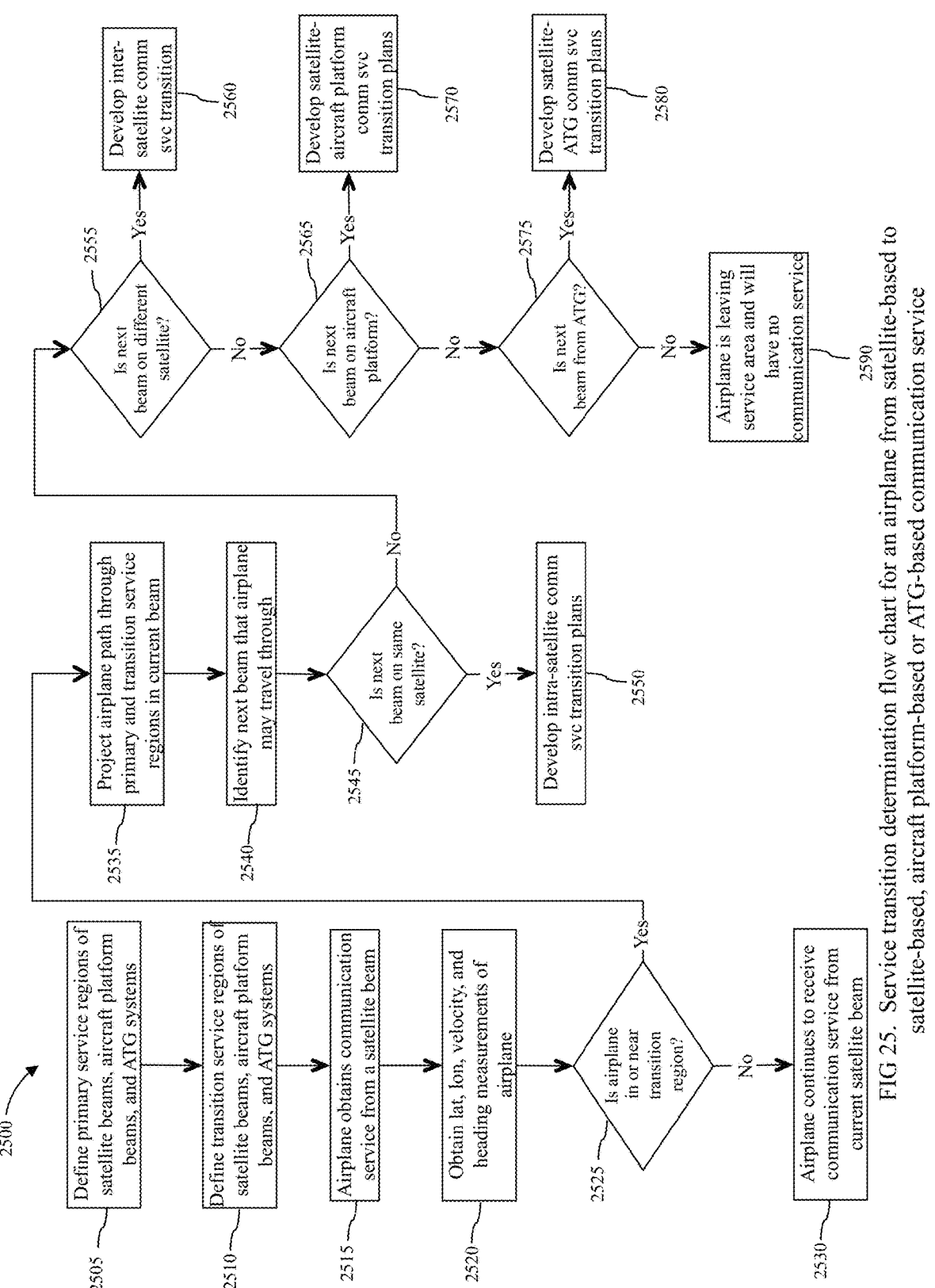
FIG 25. Service transition determination flow chart for an airplane from satellite-based to satellite-based, aircraft platform-based or ATG-based communication service

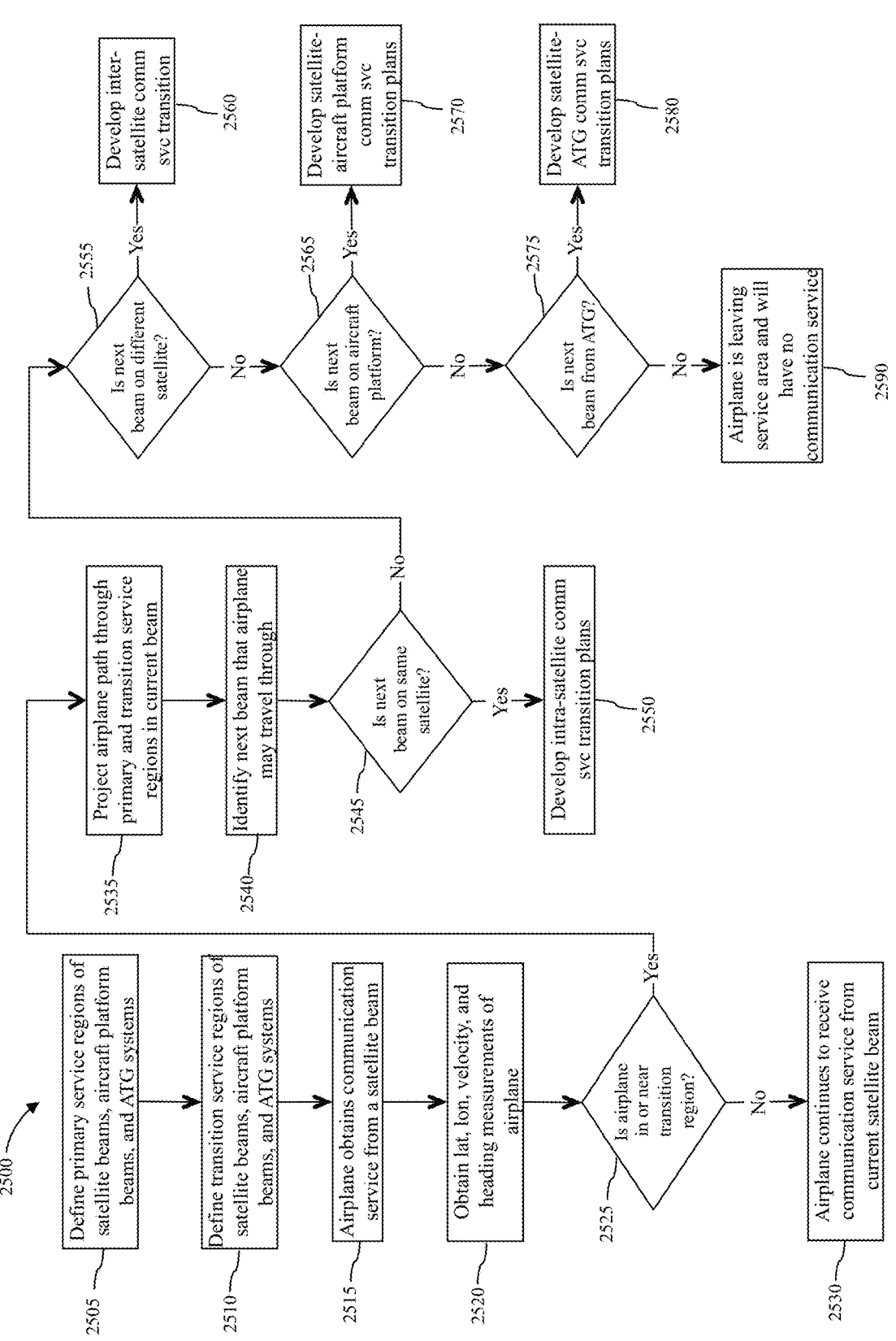
FIG 26. Service transition determination flow chart for an airplane from satellite-based to satellite-based or aircraft platform-based communication service

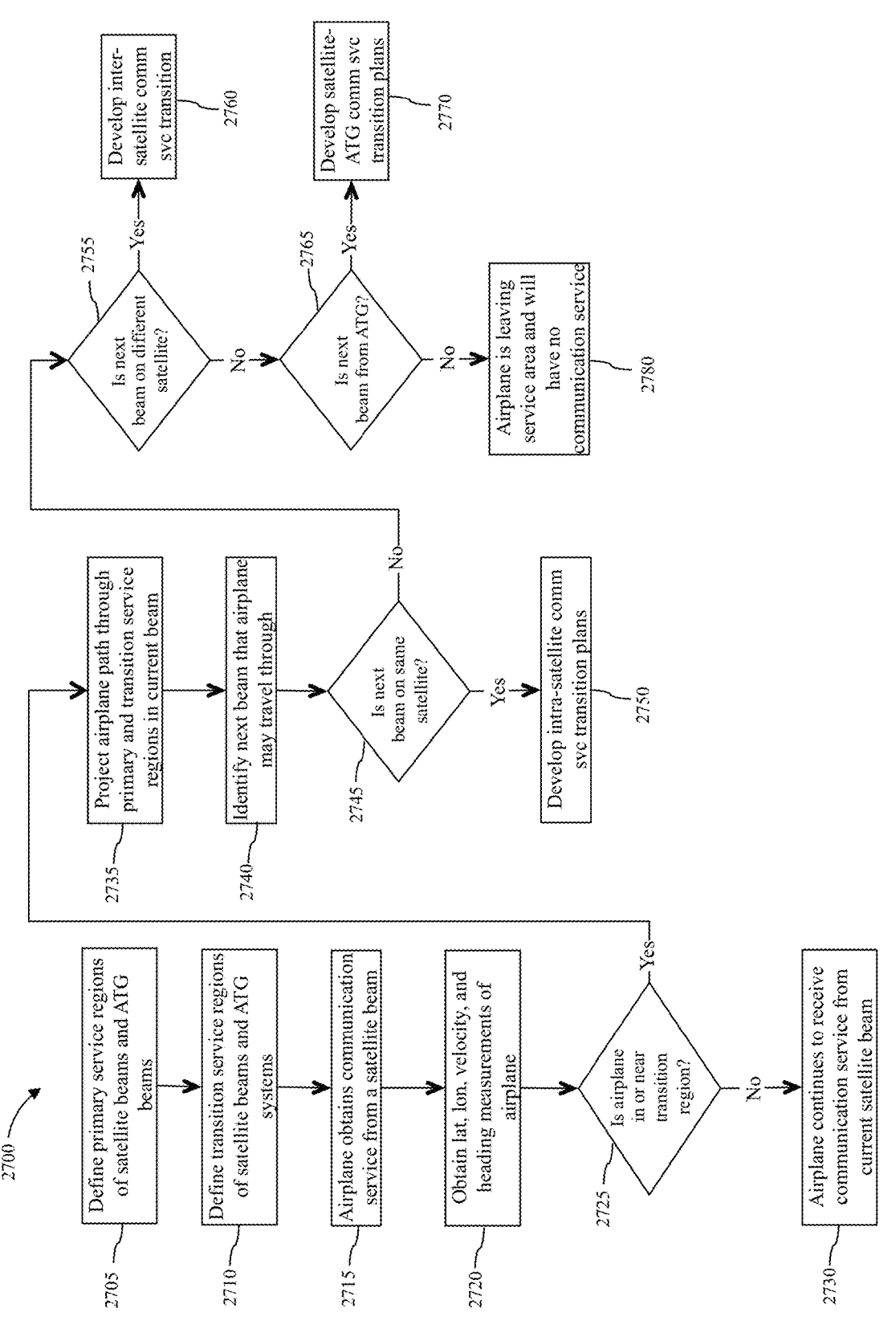
FIG 27. Service transition determination flow chart for an airplane from satellite-based to satellite-based or ATG-based communication service

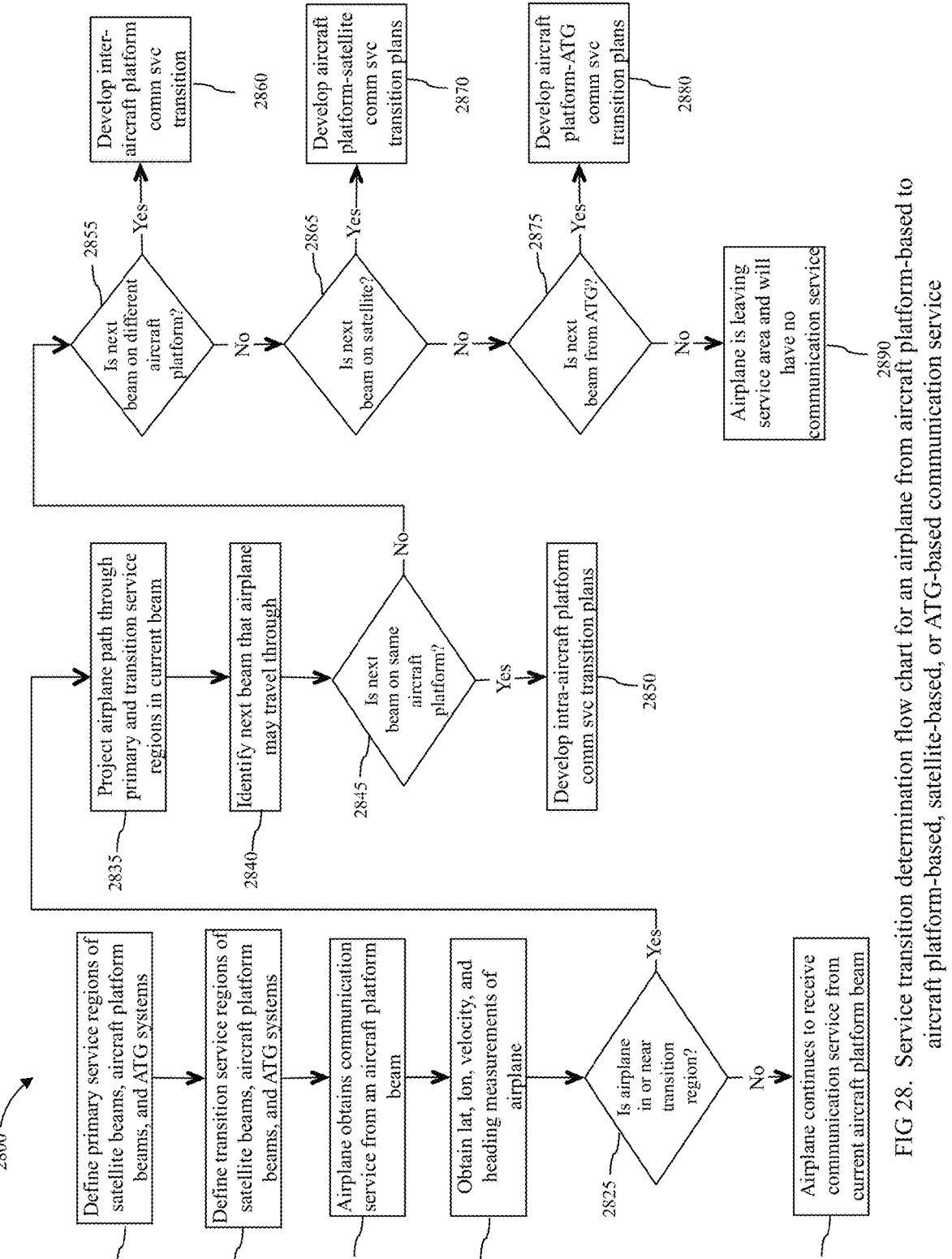
FIG 28.  Service transition determination flow chart for an airplane from aircraft platform-based to aircraft platform-based, satellite-based, or ATG-based communication service

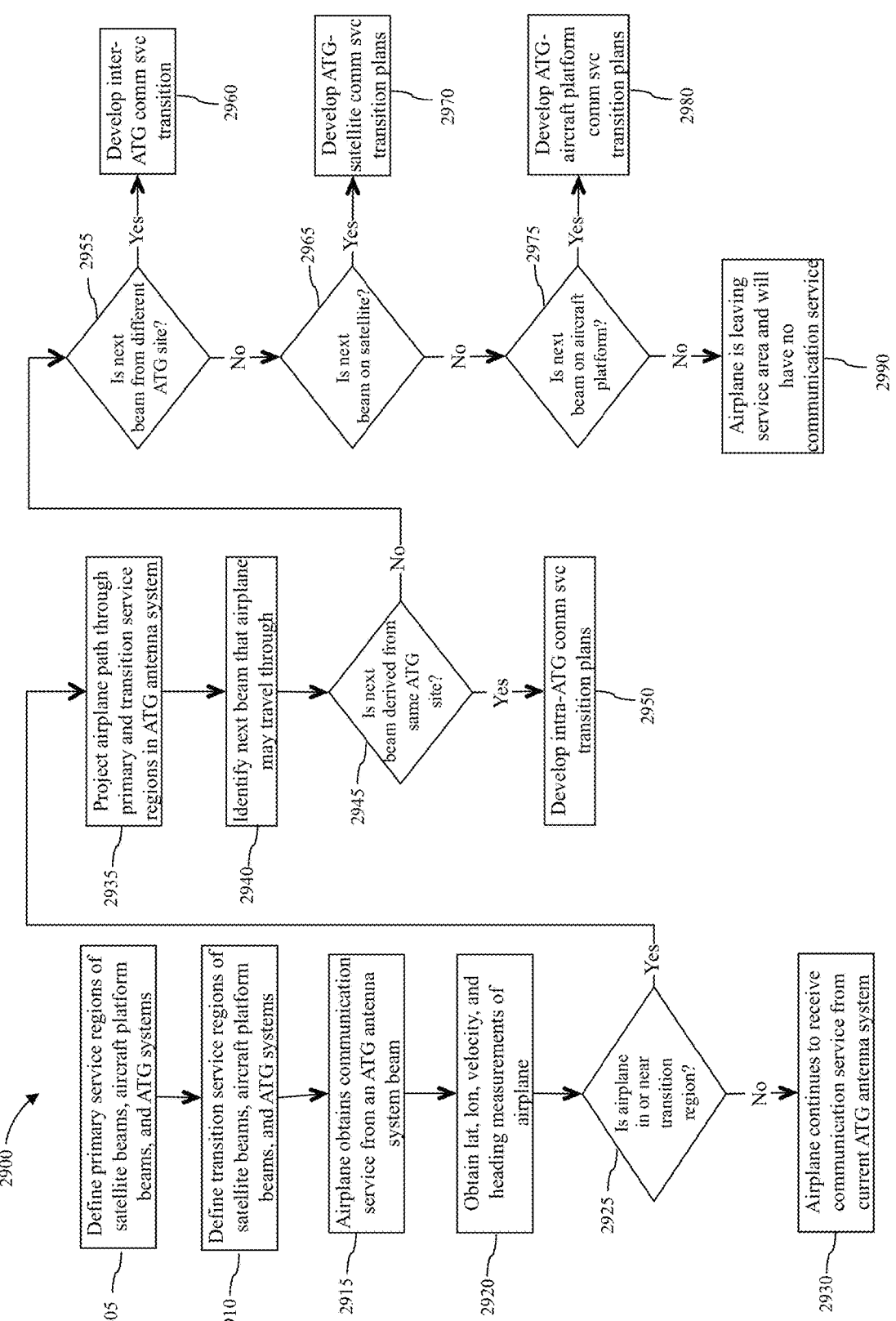
FIG 29.  Service transition determination flow chart for an airplane from ATG-based to ATG-based, satellite-based, or aircraft platform-based communication service

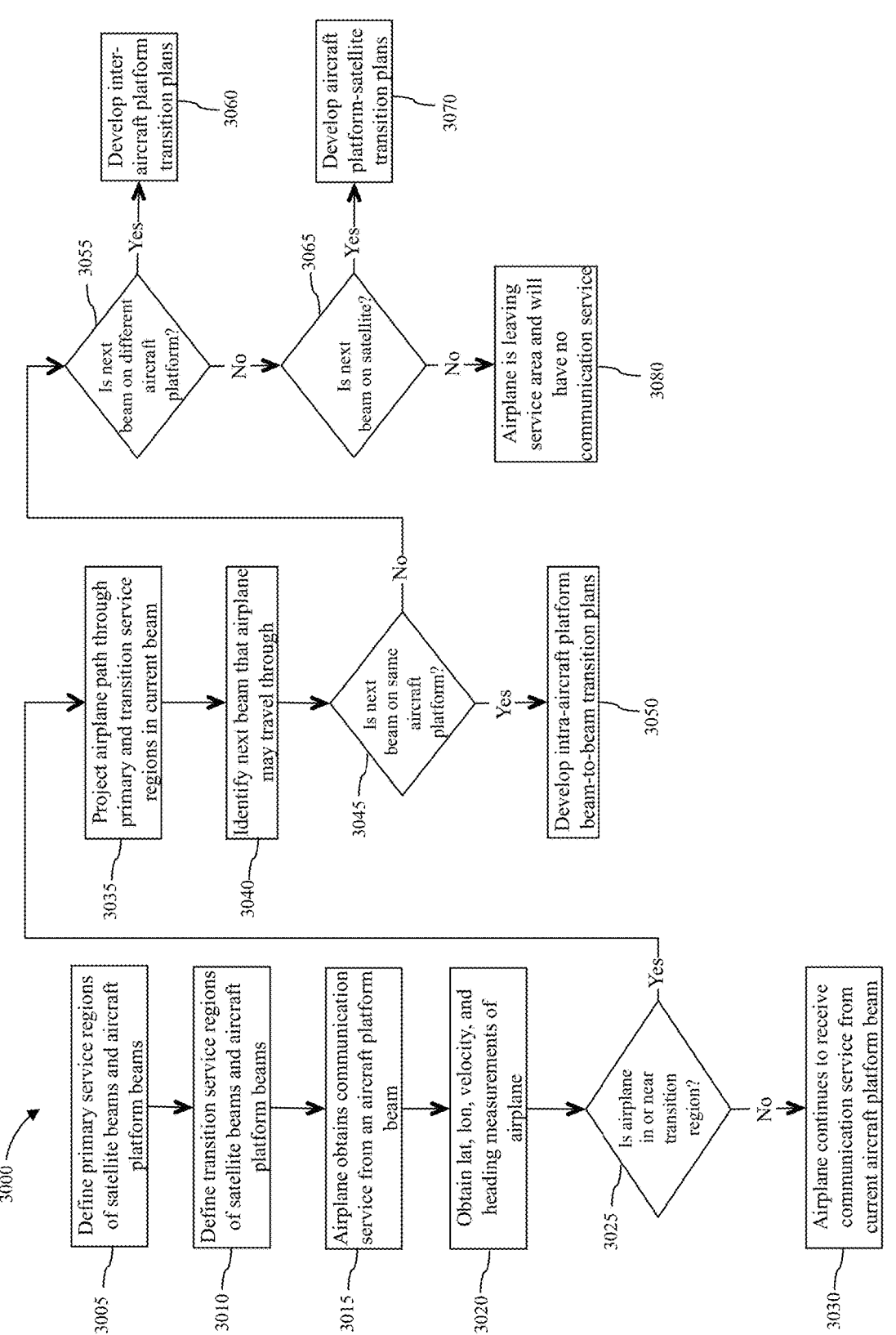
FIG 30.    Service transition determination flow chart for an airplane from aircraft platform-based to aircraft platform-based or satellite-based communication service

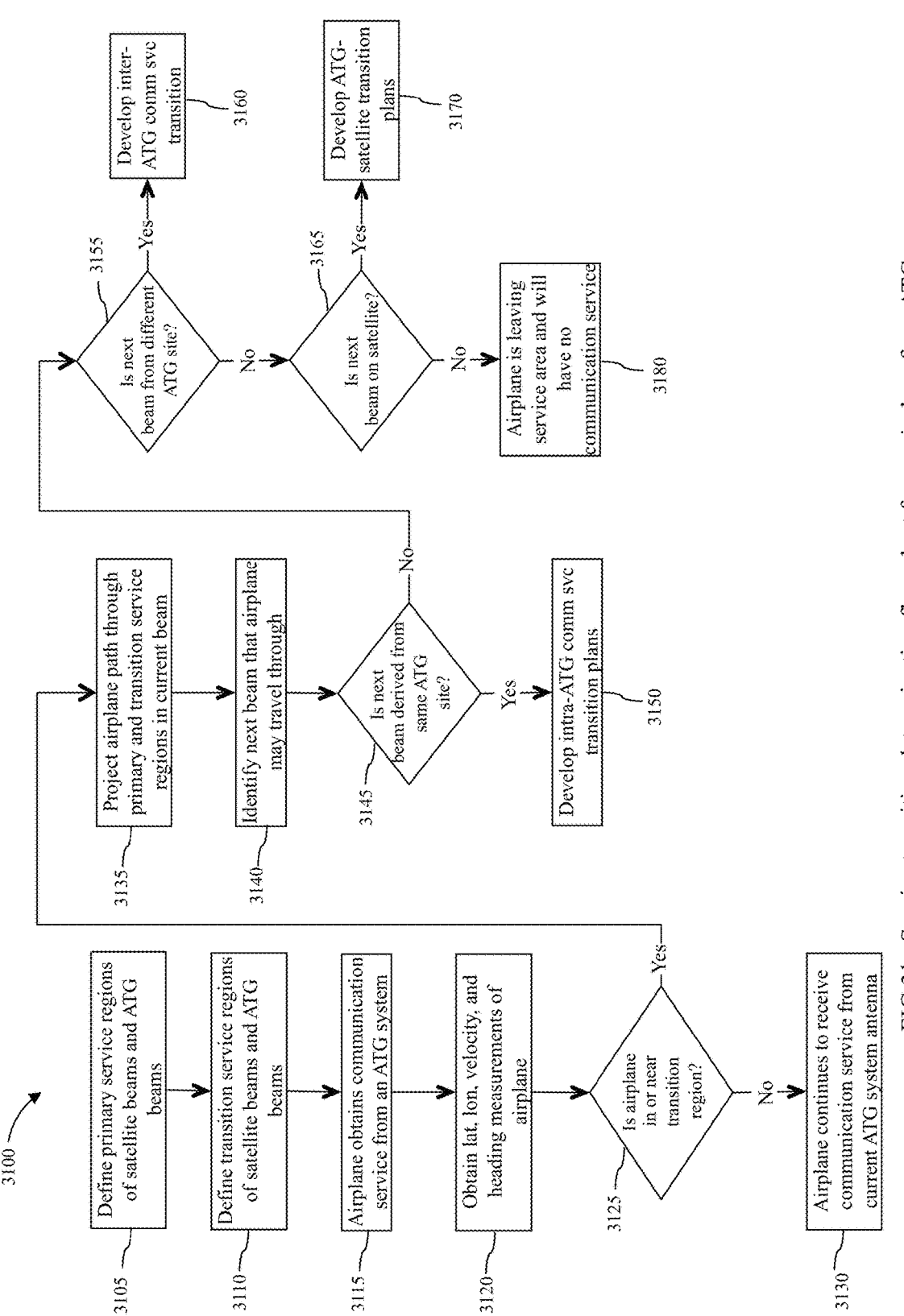
FIG 31.  Service transition determination flow chart for an airplane from ATG-based to ATG-based or satellite-based communication service

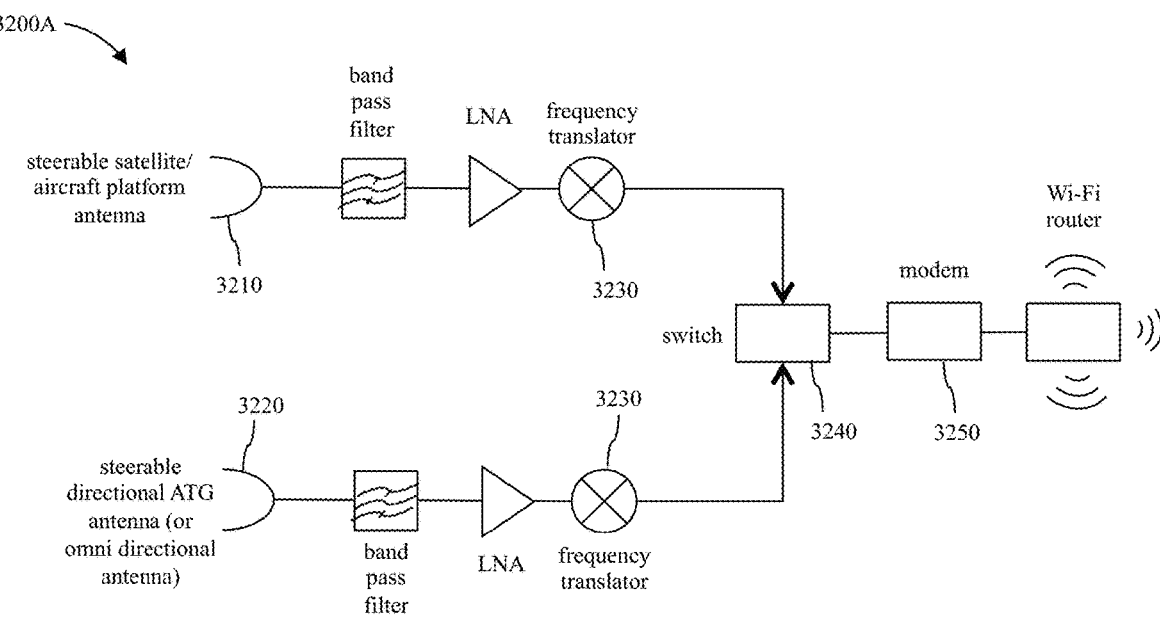
FIG. 32A. Block diagram of aircraft communication system with single modem for satellite/aircraft platform and ATG links
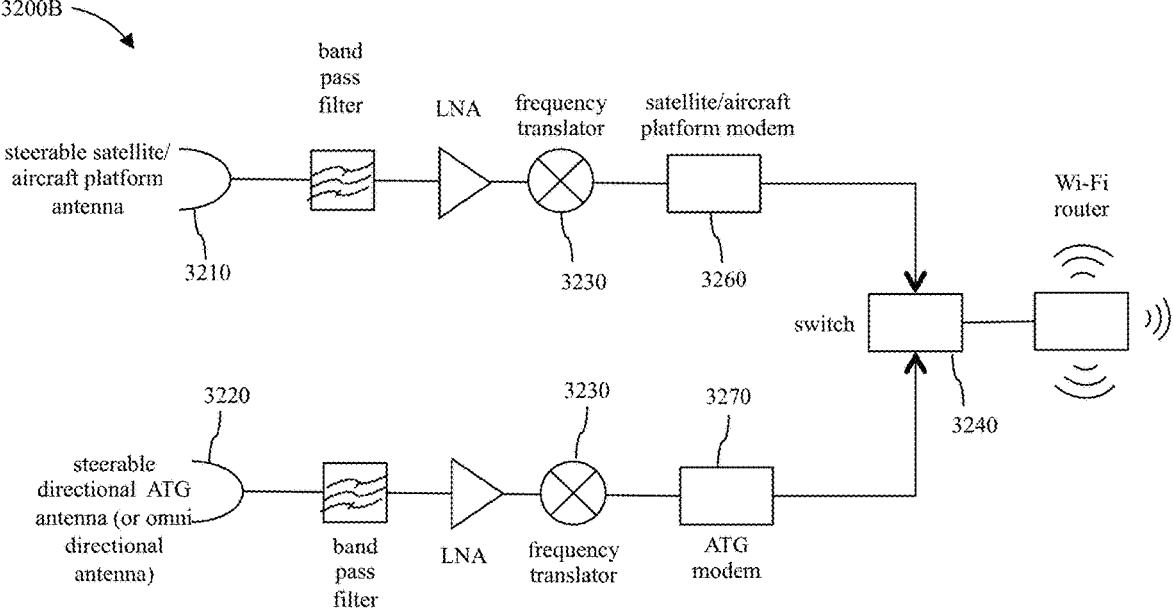
FIG. 32B. Block diagram of aircraft communication system with separate modems for satellite/aircraft platform and ATG links

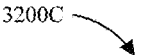
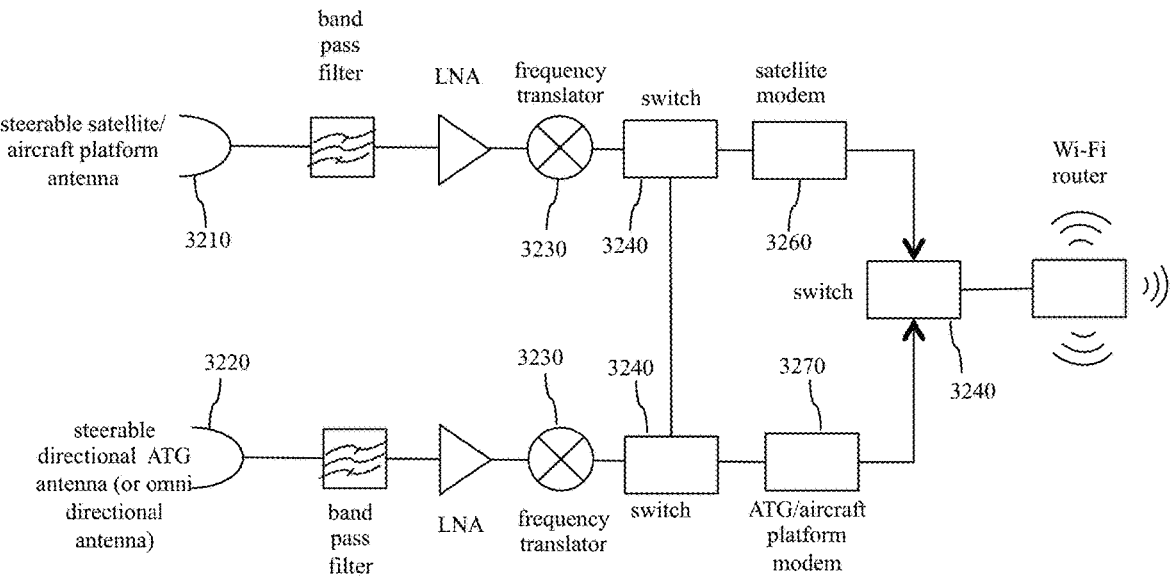
FIG. 32C.  Block diagram of aircraft communication system with separate
modems for satellite and ATG/aircraft platform/links 3300A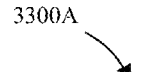

| Comm Svc Transition type | What happens during transition |
| --- | --- |
| Intra-satellite | Service moves from one beam to another – both beams are on the same satellite |
| Inter-satellite | Service moves from one beam to another – beams are on different satellites |
| Satellite-Aircraft Platform | Service moves from satellite beam to aircraft platform beam |
| Aircraft Platform-Satellite | Service moves from aircraft platform beam to satellite beam |
| Satellite-ATG | Service moves from satellite beam to ATG beam |
| ATG-Satellite | Service moves from ATG beam to satellite  beam |
| Intra-Aircraft Platform | Service moves from one beam to another – both beams are on the same aircraft platform |
| Inter-Aircraft Platform | Service moves from one beam to another – beams are on different aircraft platform |
| Intra-ATG | Service moves from one beam to another – both beams are from the same ATG site |
| Inter-ATG | Service moves from one beam to another – beams are from different ATG sites |
| Aircraft Platform-ATG | Service moves from aircraft platform beam to ATG beam |
| ATG-Aircraft Platform | Service moves from ATG beam to aircraft platform beam |

FIG 33A. Table of communication service transitions

3300B

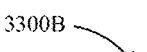

| Comm Svc Transition type | Satellite antenna | Terrestrial antenna | Switch | Freq Xlator | Modem | Wi-Fi router |
|---|---|---|---|---|---|---|
| Intra-satellite | - | - | - | x | - | - |
| Inter-satellite | x | - | - | x | - | - |
| Satellite-Aircraft Platform | x | - | - | x | - | - |
| Aircraft Platform-Satellite | x | - | x | x | - | - |
| Satellite-ATG | - | x | x | x | x | - |
| ATG-Satellite | x | - | x | x | x | - |
| Intra-Aircraft Platform | - | - | - | x | - | - |
| Inter-Aircraft Platform | x | - | - | x | - | - |
| Intra-ATG | - | - | - | x | - | - |
| Inter-ATG | - | x | - | x | - | - |
| Aircraft Platform-ATG | - | x | x | x | x | - |
| ATG-Aircraft Platform | x | - | x | x | x | - |

FIG 33B.  Airplane communications equipment which may require reconfiguration
to accommodate various communication service transitions 3300C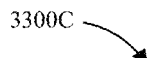

| Comm Svc Transition type | Satellite (Switch & HPA) | Aircraft Platform (Switch & HPA) | ATG System (Beam former & HPA) |
|---|---|---|---|
| Intra-satellite | x | - | - |
| Inter-satellite | x | - | - |
| Satellite-Aircraft Platform | - | x | - |
| Aircraft Platform-Satellite | x | - | - |
| Satellite-ATG | - | - | x |
| ATG-Satellite | x | - | - |
| Intra-Aircraft Platform | - | x | - |
| Inter-Aircraft Platform | - | x | - |
| Intra-ATG | - | - | x |
| Inter-ATG | - | - | x |
| Aircraft Platform-ATG | - | x | x |
| ATG-Aircraft Platform | - | x | x |

FIG 33C.  Satellite/Aircraft Platform/ATG equipment, which may require
reconfiguration to accommodate communication service transition 3300D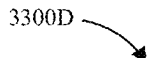

| Comm Svc Transition type | Router | Gateway RF |
|---|---|---|
| Intra-satellite | - | x |
| Inter-satellite | x | x |
| Satellite-Aircraft Platform | x | x |
| Aircraft Platform-Satellite | x | x |
| Satellite-ATG | x | x |
| ATG-Satellite | x | x |
| Intra-Aircraft Platform | - | x |
| Inter-Aircraft Platform | x | x |
| Intra-ATG | x | x |
| Inter-ATG | x | x |
| Aircraft Platform-ATG | x | x |
| ATG-Aircraft Platform | x | x |

FIG 33D. Router and gateway equipment, which may required reconfiguration
to accommodate communication service transitions

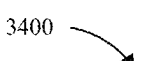
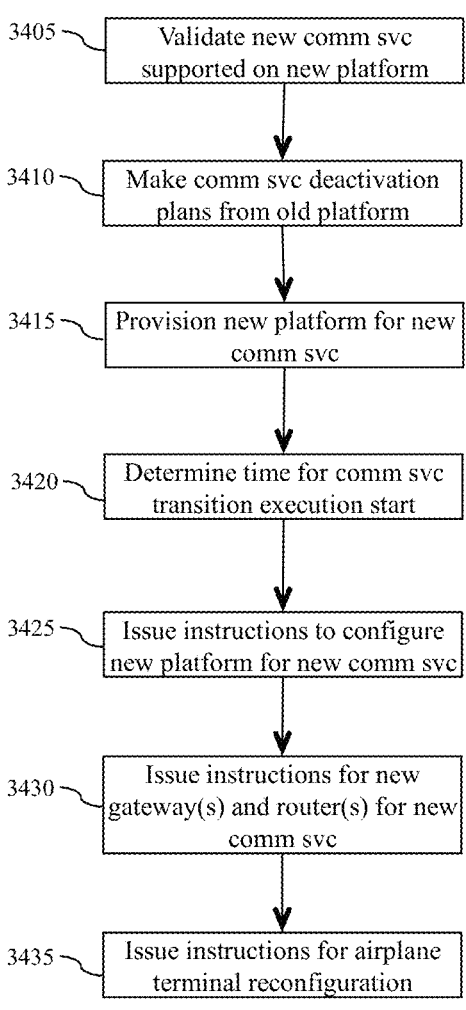
FIG 34.  Method to prepare for communication service transition

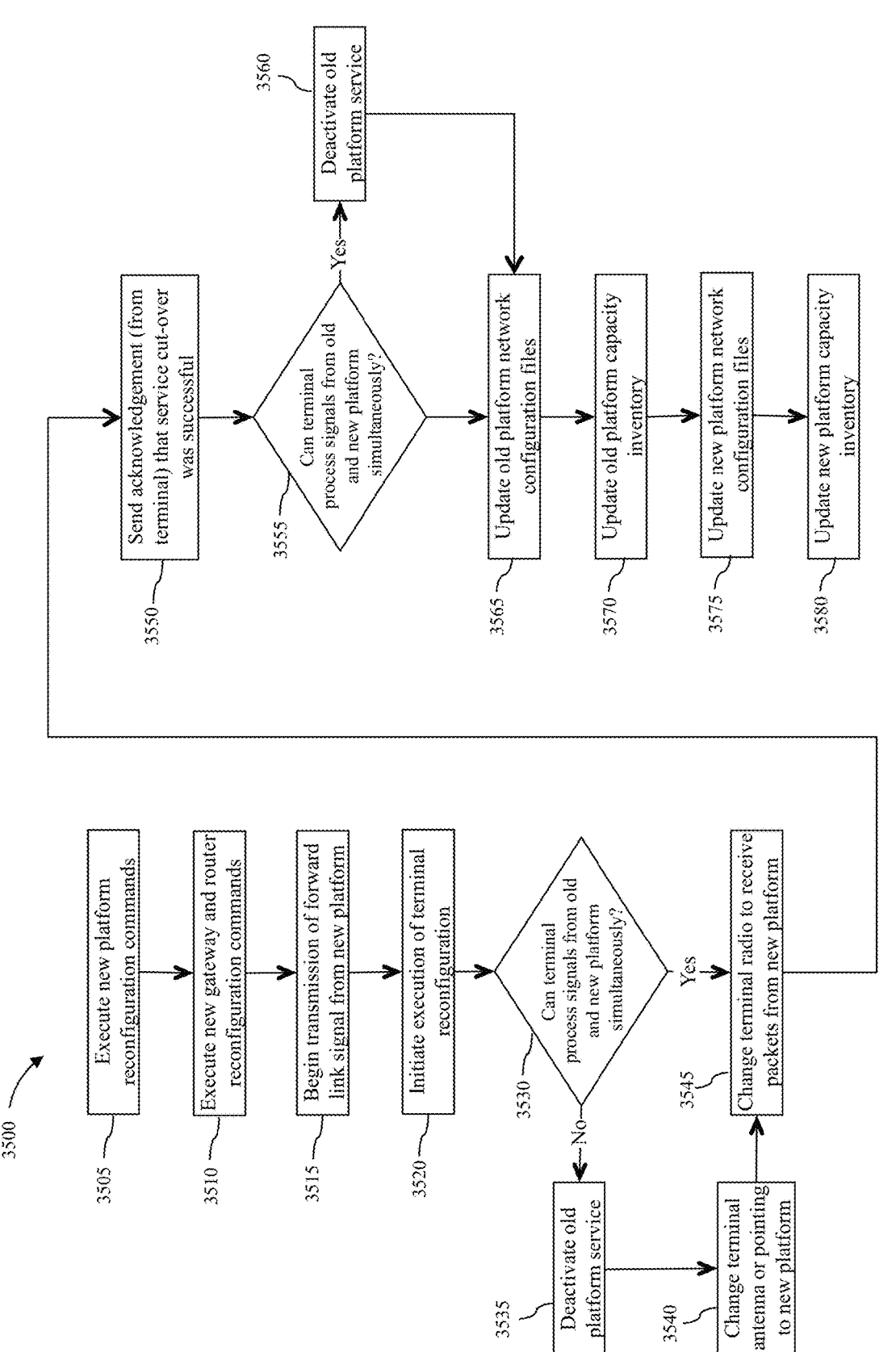
FIG 35. Method for execution of communication service transition

APPARATUS AND METHODS FOR BROADBAND AERONAUTICAL COMMUNICATIONS SYSTEMS

CROSS-REFERENCE TO RELATED APPLICATIONS

This application is continuation-in-part of U.S. patent application Ser. No. 16/258,943 filed Jan. 28, 2019, the contents of which is incorporated herein by reference in its entirety.

BACKGROUND OF THE INVENTION

As the appetite and need for broadband communications has grown, broadband network operators have expanded the reach of their networks to satisfy end users. Technological advancements to improve speed and infrastructure investments to improve reach have underpinned the growth of broadband networks and their usage. Broadband network access is available in most parts of cities, the surrounding suburbs, and also along many well and moderately traveled transportation arteries and roads; generally, broadband Internet networks are rolled out in areas with moderate to high concentrations of people. Networks have been built to provide Internet access to passengers on ships and airplanes, though the performance of such networks has lagged the performance of their terrestrial cousins, and usage costs of these networks are significantly higher. For aeronautical networks, in particular, companies such as Gogo, Panasonic, Global Eagle, ViaSat, Inmarsat, and Thales have built satellite-based networks that provide a range of service qualities, from broadband to dial-up, to a limited number of users. Popular services, such as streaming video, are prohibited, because the networks lack the capacity to provide the necessary bandwidth to all the users. The rollout and take-up of aeronautical networks have lagged that of terrestrial networks, because of cost and application limitations. Streaming video is the Internet's dominant application, accounting for a large percentage of all Internet traffic, according to Cisco's most recent, *Cisco Visual Networking Index: Forecast and Methodology,* 2016-2021. Widespread high-speed connections to airplane passengers can also enable e-learning applications and help passengers and crew respond to on-board medical, safety, and other emergencies. What is needed is a cost-effective implementation of aeronautical networks that does not restrict the most popular applications.

SUMMARY OF THE INVENTION

While ubiquitous coverage from a satellite makes it an attractive element in an aeronautical network, satellite capacity limitations, arising from limited quantity of spectrum and practical limits on the minimum beam size a satellite can generate, present service quality challenges in areas, in which there are high concentrations of airplanes. Airplane traffic over a given region can have a high degree of variability over a day, several days, or several months. The variability is dependent on weather conditions, and not only in the given area, but also far away, level of demand, the position of the jet stream, and other factors. These factors combine to make it challenging to develop models to predict the number of aircraft and number of users in a given region. Airports, especially busy airports, will tend to have somewhat consistent high concentrations of aircraft. Current aeronautical networks lack the capacity to provide sufficient bandwidth to all the users in such regions. More satellites can be built to provide sufficient capacity to such regions, but this is an expensive solution. Deployment of 1-50 km altitude aircraft platforms, where the aircraft is one or more of a balloon, airplane, unmanned aerial vehicle (UAV), airship, blimp, or dirigible with a communications payload, or an air-to-ground (ATG) communications system, in the vicinity of an airport, can provide a cost-effective "aeronautical hotspot" to serve the areas in which there are high concentrations of users. FAA regulations and flight paths of airplanes cause the planes to naturally spread out as they leave busy air space regions, and concentrations of users in a given region drops to levels that can be cost-effectively served by satellite. Many regions with lower concentrations of passengers are remote, and it is generally too expensive to deploy an aircraft platform or ATG systems in such remote regions. The invention described herein combines satellite, aircraft platform, and ATG elements and deploys them in areas where they are the most cost-effective means of providing broadband access to airplane passengers. The resulting system can do what current systems cannot—provide airplane passengers with sufficient affordable bandwidth to use the Internet onboard airplanes the way they use it on the ground, and that usage would not preclude streaming video, the dominant Internet application.

The invention also details methods to transition communication services for airplane passengers while they are en route.

Satellite with its reach and aircraft platforms and ATG systems with their ability to concentrate capacity over areas with high concentration of passengers offer a good combination to improve and expand aeronautical broadband network access. Such technology can be used to foster connection to a network, such as the Internet or private or local network, for example. Such a system may employ capacity allocation and management devices and methods to ensure cost-effective deployment of capacity to users as they travel to their destination.

BRIEF DESCRIPTION OF THE DRAWINGS

The various features and advantages of the present invention may be more readily understood with reference to the following detailed description taken in conjunction with the accompanying drawings, in which:

FIG. 1 provides a breakdown of Internet traffic by application from the Cisco VNI traffic assessment.

FIG. 2 depicts a sample spot beam plan for a satellite.

FIG. 3A provides an example number of airplanes in each spot beam coverage region and in entire service area vs. time for the beam plan in FIG. 2.

FIG. 3B provides example minimum, maximum, average, median, and variability for airplane count in each spot beam coverage region and in entire service area for the traffic model in FIG. 3A.

FIG. 4 depicts an example estimated breakdown of Internet traffic by application for airplane passengers.

FIG. 5A illustrates example demand (Mbps) in each spot beam coverage region and the entire service area over a 15-minute span for the example airplane traffic model of FIG. 3A.

FIG. 5B provides example demand statistics for the individual coverage regions and the entire service area for the example traffic model in FIG. 5A.

FIG. 5C contains example sum of the maximum demand levels in the traffic model of FIG. 5A.

FIG. 6 depicts example elements of a satellite-based aeronautical communications network.

FIG. 7A provides an example satellite payload block diagram for forward link channels with switched interconnections between gateway and user beam channels.

FIG. 7B provides an example satellite payload block diagram for return link channels with switched interconnections between gateway and user beam channels.

FIG. 8A provides an example satellite payload block diagram for forward link channels with static connectivity between gateway and user beams.

FIG. 8B provides an example satellite payload block diagram for return link channels with static connectivity between gateway and user beams.

FIG. 9A contains a block diagram for switch and switch management device to permit flexible interconnection of gateway and user beam channels for forward links.

FIG. 9B contains a block diagram for switch and switch management device to permit flexible interconnection of gateway and user beam channels for return links.

FIG. 9C contains a block diagram for power management device and variable power high power amplifiers to enable flexible EIRP in the transmit user beams channels for forward links.

FIG. 10 illustrates a method for adjusting connectivity and bandwidth of connection between gateway and user beams.

FIG. 11A illustrates a transition region between two beams.

FIG. 11B illustrates a primary region being served by an alternative beam.

FIG. 12 contains a depiction of gateway-user beam connection bandwidth adjustment and adjustment limitations for a multi-beam satellite.

FIG. 13A provides spectrum allocation for satellite user beams for a beam hopping system.

FIG. 13B contains timing and frequency allocations for satellite user spot beams in beam hopping system.

FIG. 14 gives demand in individual coverage regions, maximum capacity supplied in an individual coverage region, and unmet demand in each coverage region of the example spot beam laydown in FIG. 2 and the example traffic model of FIG. 5A.

FIG. 15 depicts service allocation among satellite, aircraft platform, and ATG systems for regions for which satellite capacity is sufficient and regions for which satellite capacity alone is insufficient for the example beam laydown in FIG. 2 and the demand in FIG. 5A.

FIG. 16 depicts service allocation example among satellite, aircraft platform, and ATG systems for an individual satellite beam coverage region.

FIG. 17 illustrates elements of an aircraft platform-based aeronautical broadband communications network.

FIG. 18 illustrates aircraft platform-airplane geometry and contains a table showing aircraft platform service diameter and other parameters vs. airplane elevation angle towards an aircraft platform.

FIG. 19A provides a depiction of elements of an ATG-based aeronautical broadband communications network.

FIG. 19B gives a depiction of ATG antenna concept at a single site.

FIG. 19C illustrates ATG antenna concept at multiple sites in an individual satellite coverage region.

FIG. 20 provides a depiction of an aeronautical broadband communications network architecture, featuring satellite, aircraft platform, and ATG systems.

FIG. 21 has a high level architecture of the Network Management System for aeronautical broadband communication service.

FIG. 22 contains the high level architecture of the Satellite Management System.

FIG. 23 contains the high level architecture of the Aircraft Platform Management System.

FIG. 24 contains the high level architecture of the ATG Management System.

FIG. 25 gives the communication service transition determination flow chart for an airplane from satellite-based communication service to satellite-based, aircraft platform-based or ATG-based communication service.

FIG. 26 gives the communication service transition determination flow chart for an airplane from satellite-based communication service to satellite-based or aircraft platform-based communication service.

FIG. 27 provides the communication service transition determination flow chart for an airplane from satellite-based communication service to satellite-based or ATG-based communication service.

FIG. 28 contains the communication service transition determination flow chart for an airplane from aircraft platform-based communication service to aircraft platform-based, satellite-based or ATG-based communication service.

FIG. 29 contains the communication service transition determination flow chart for an airplane from ATG-based communication service to ATG-based, satellite-based, or aircraft platform-based communication service.

FIG. 30 provides the communications service transition determination flow chart for an airplane from aircraft platform-based communication service to aircraft platform-based or satellite-based communication service.

FIG. 31 provides the communication service transition determination flow chart for an airplane from ATG-based communication service to ATG-based or satellite-based communication service.

FIG. 32A depicts a block diagram of an aircraft communication system with single modem for satellite/aircraft platform and ATG links.

FIG. 32B depicts a block diagram of an aircraft communication system with separate modems for satellite/aircraft platform and ATG links.

FIG. 32C contains a diagram of an aircraft communication system with separate modems for satellite and ATG/aircraft platform links.

FIG. 33A contains the table of communication service transitions.

FIG. 33B lists the airplane communications equipment, which may require reconfiguration to accommodate various communication service transitions.

FIG. 33C lists the satellite/aircraft platform/ATG equipment, which may require reconfiguration to accommodate various communication service transitions.

FIG. 33D lists the router and gateway equipment, which may require reconfiguration to accommodate communication service transitions.

FIG. 34 provides a general method to prepare for a communication service transition for an aeronautical broadband Internet system.

FIG. 35 contains a general method for execution of a communication service transition for an aeronautical broadband Internet system.

DETAILED DESCRIPTION

Demand for Internet access has grown over the past 25 years and connection technologies have evolved to support the demand growth. In the early to late 1990s, dial-up (33 to 56 kbps) connections for residential users and higher speed ISDN, T1, T3, and ATM (64 kbps to 155 Mbps) connections for businesses were popular and adequate for the way consumers and businesses used the Internet. Today, web content is much richer and the connecting technologies are more powerful, as most of the US enjoys broadband connections in their homes and businesses. There has been a virtuous cycle between the growth in the richness of web content and the speed of Internet connections. Rich web content is produced and consumed because the network has high speed. The network has high speed to support the growth of rich content, especially streaming video. The popularity of streaming video has been the major driver in the recent growth in Internet traffic, accounting for approximately 80% of traffic for stationary users and over 50% of traffic for mobile users, according to the 2016 Cisco report, "Cisco Visual Networking Index Forecast and Methodology, 2016-2021." FIG. 1 provides Cisco's breakdown estimate of Internet traffic by major application (Internet video, conventional web-surfing and e-mail usage, gaming, and file sharing) for the years 2018-2021 for fixed users. The table shows that streaming video is the dominant application, and its popularity is expected to continue in the coming years.

Mobile network operators with the deployment of 4G/LTE/4G LTE systems have been able to keep up with the demand—or mostly keep up with demand—for broadband access for users in areas where there are moderate to high concentrations of users. 5G systems are under development to increase the capacity and reach of broadband networks. In addition, progress has been made in encoding and decoding for the bandwidth intensive video delivery and streaming video applications. The H.264 or MPEG-4 standard has enabled economic delivery of HD television transmissions over satellite by packing more channels per transponder, and the H.265 standard has provided further improvement in packing HD and UHD channels for satellite and terrestrial transmissions. The standards have also provided significant bandwidth reductions for lower resolution video that is suitable for viewing on small screen tablets, smartphones, and laptops. Mobile network operators deliver sub-SD resolution programs/video files that video streaming service providers create for their subscribers; the quality of the video is adequate for small tablet and smartphone screens, and the consumption of the content does not consume a subscriber's monthly data allotment in a matter of few hours. The file size for an hour of streaming over a mobile network to tablet or smartphone is approximately 300 MB; an average data rate of 0.7 Mbps would support transmission of such a file and is compatible with the capabilities of most mobile networks.

Air transportation is one market that has lagged in the deployment of broadband networks. It is an expensive proposition to build a broadband network for users that span 1000s of kilometers, are 10 km above sea level, and travel at speeds in excess of 900 km per hour. Current Internet access providers, Gogo, Panasonic, ViaSat, Global Eagle, Inmarsat, and Thales have not implemented networks that enable commercial airline passengers to use the Internet on planes the way they use the Internet in their homes. The networks lack sufficient capacity and are expensive to access. The service providers prohibit the use of bandwidth intensive applications such as streaming video, the dominant Internet application in the developed world. The service quality is uneven with speeds varying from a few kbps to over 1 Mbps. The incumbent service providers have explored using cheaper (on a $/MHz/mo basis) high throughput satellite (HTS) technology, but even with the increased capacity, they are unable to support the popular streaming video application for large numbers of users.

A mobile network operator who can deploy a system, which has the capacity to enable all airline passengers to access streaming video services, such as Netflix, and users can use for a fraction of the price that is currently charged, may generate a great deal of interest from airlines and airline passengers.

Development of a network to provide affordable broadband Internet access to airline passengers requires creation of a demand model, which itself requires three items: geographical location of the airplanes, number of passengers on an airplane who would use the service, and a breakdown of how passengers would use the network. At a high level, airplane traffic patterns are generally consistent to a degree; traffic is very light in the early morning and grows during the day and is fairly heavy during the afternoon through mid-evening and then becomes light late at night.

A multi-beam satellite, an example coverage of which is depicted in FIG. 2, may serve as an element of the aeronautical mobile service network. With its high altitude, 1200 km for low earth orbit (LEO), 8000 km for medium earth orbit (MEO), or 36,000 km for a geostationary (GEO) satellite, a satellite can provide coverage that spans 100s to 1000s of kilometers. Aircraft terminals are small, because there is insufficient mounting room on an airplane for a large antenna and larger antennas contribute to aircraft drag, which drives up fuel usage and fuel costs. High satellite EIRP is required to ensure that the signal levels at that reach the on-board satellite modem are of sufficient strength. Smaller satellite spot beams, which are common in HTS, are able to generate higher EIRP than large or modest-sized area beams for a given high power amplifier (HPA) RF level on board the satellite. With smaller satellite beams, more beams can be fit into a given area, and more frequency re-use and higher capacity can be obtained from a single satellite. A lower cost large area beam that covers the US would lack the bandwidth and power to provide even a few hundred users with sufficient capacity for streaming video.

Plane count estimates in a spot beam coverage region can be modeled from knowledge of flight schedules and aircraft traffic between city pairs, such as Chicago and Atlanta or New York City and Los Angeles. As more city pairs are added to the model, the model more accurately represents the number of planes that can be expected in a spot beam coverage region at a particular instance of time. Regions where there are intersections of flight traffic from different city pairs, for instance, predominantly east-west flight traffic with predominantly north-south flight traffic, may have larger concentrations of airplanes and users than regions where there are no or very few intersections of flight traffic routes. Seasonal changes in the jet stream may affect flight routes and the quantity of airplanes in a particular spot beam coverage region. Seasonal changes in demand for travel between city pairs may also impact quantity of users in a coverage region. Weather may also influence the number of airplanes and users in a particular coverage region. Taken together, the factors listed above and other factors may cause the number of planes in a particular coverage region to change over time, with some of the factors, like weather, causing short term changes and seasonal factors, such as jet stream position and demand for air travel, causing longer term changes. A model that can reasonably account for all the factors can be used to estimate the number of planes and the number of passengers in a given spot beam coverage region.

To determine the level of capacity each spot beam should provide, it is helpful to have a reasonable estimate of how many planes are in the coverage area for each spot beam. Airplanes, which are en route, are not stationary and can be assigned to one of following four categories for the traffic model:

1. Airplanes flies inside the coverage area of one beam
2. Airplane flies from the coverage area of one beam to the coverage area of the next beam
3. Airplane enters the service area, via takeoff, by flying above the altitude at which service is commenced, or by flying across the service area boundary (from outside to inside)
4. Airplane exits the service area, via landing, flying below the altitude at which service is terminated, or by flying across service area boundary (from inside to outside)

Activities 1 and 2 affect the quantity of planes in a given coverage area, but do not impact the population count of airplanes in the service area. Activities 1, 2, 3 and 4 affect the airplane count in an individual coverage region, and those coverage regions which include a busy airport will most likely have the highest plane count, because the speed of an airplane is lower during the takeoff, ascending, descending, and landing phases of a flight, and airplanes make more turns in the ascending and descending phases of flight, and taken together, these factors tend to keep the airplane in a given coverage region longer than a straight flight path through the coverage region at a cruising speed. The difference between activity 3 (airplanes entering the service area) and activity 4 (airplanes leaving the service area) impacts the change in the count of airplanes in the service area. This difference in relation to the total number of airplanes in the service area is generally a much smaller fraction than the changes of airplane count to airplane count in a coverage region. Therefore, aggregate demand in the service area vs. time is less peaky than demand vs. time in a particular coverage region.

It may be helpful to perform the airplane count estimates at meaningful time intervals, and at a minimum, the sampling interval should be short enough so as not to miss airplanes that enter a spot beam coverage region. If the model were to use an interval that is too long, an airplane could enter a spot beam coverage region, fly across the coverage region, and then exit the coverage region, and the model would not capture the demand associated with this airplane—a meaningful model captures all of the planes that enter, traverse, and exit an individual spot beam coverage region, and the time intervals in the model must be small enough to satisfy these criteria. A sampling interval, which catches individual airplane takeoffs and landings, could provide the required granularity for a dynamic system capacity controller, which would adjust capacity in a given spot beam coverage area in response to changes in demand.

FIG. 3A provides an example of plane count estimates vs. time for the sample beam laydown depiction of FIG. 2. The estimates are provided for each spot beam coverage region and for the entire service area over a 15-minute time span in 1-minute increments. Actual airplane traffic patterns may differ from the table; the table is illustrative to convey the concepts of variable demand vs. time in an individual coverage region and across an entire service region. The table in FIG. 3B provides some of the airplane count statistics for the individual coverage regions and for the entire service and includes minimum, maximum, average, median, and variability, where variability is defined as the (maximum-minimum)/average. The variability is generally much higher in the individual coverage regions than for the entire service area.

FIG. 4 shows a breakdown of passenger usage of the network by application and the associated average data rate for a mobile aeronautical network: 0.75 Mbps for streaming video to tablets, smartphones, and laptops (recall that the size of an hour-long video file for mobile users is generally 300 MB), 128 kbps for web-surfing, and approximately 1 Mbps for gaming with the caveat that the gaming video stream is below HD quality and game downloads are not performed; file sharing services over websites such as Bit-Torrent, may be supported with speeds up to 1 Mbps. With the average number of passengers per airplane set at 175 and with 100% of the passengers using the service, the average capacity demand for an airplane works out to 106.3 Mbps. The major difference in the demand profiles in FIG. 1, which pertains to fixed user Internet utilization, and FIG. 4, which pertains to mobile airplane passenger Internet utilization, is the higher fraction of Internet usage for streaming video for airplane passengers. On an airplane, it is more challenging to be productive with work and given the limited amount of room for passengers, the model for airplane Internet usage weights the passive video streaming application more heavily than Cisco's model for fixed network users.

With the tabulation of airplane count in the various individual spot beam coverage regions in FIG. 3A, an estimated average of 175 passengers per airplane with 100% take-up per in terms of percentage of passengers using the system, and the breakdown of Internet usage by application in FIG. 4, it is possible to estimate the demand for capacity in each spot beam coverage region as a function of time, as shown in FIG. 5A. The table in FIG. 5A shows that the demand in a particular spot beam coverage region is proportional to the number of airplanes (and passengers) in the spot beam coverage region. The table also shows that the demand is non-uniform; it varies from spot beam coverage region to spot beam coverage over the 15-minute time span. The demand allocation across the service region may be similar for systems with larger numbers of spot beam coverage areas and for longer time spans. Some spot beam coverage regions may have more airplanes and passengers than other spot beam coverage regions. The table in FIG. 5A provides, minute-by-minute, the demand in each spot beam coverage region and the demand for the entire service area for the sample beam laydown in FIG. 2. The table in FIG. 5B provides the minimum, maximum, average, and median demand levels, and variability in the demand, defined as the (maximum-minimum)/average demand for each of the individual spot beam coverage regions and for the entire service area. As with airplane count, the demand variability in the individual coverage areas is noticeably higher than for the entire service area. The table in FIG. 5C provides the sum of the maximum demand levels in the individual coverage regions. It is interesting to note that the sum of the maximum demand levels in the individual coverage regions (16,477 Mbps) may be 32% higher than the maximum demand level for the entire service area (12,437 Mbps). As the number of beams grows, the ratio of sum of the maximum demand levels for the individual beams to the maximum demand level for the entire service region will grow; for 100 or more beams, the ration may grow to more than 100%. This observation, along with knowledge of the maximum demand level in the individual coverage regions, may be exploited to optimize the system design from a cost point of view.

FIG. 6 depicts elements that may be required for a satellite-based aeronautical communications network 600 and comprise a satellite 610 with multiple user spot beams 611, which provide coverage of user spot beam coverage regions 640 and a satellite gateway beam 619, which provides coverage of a gateway spot beam coverage region 630, which contains a satellite gateway 650. The role of the satellite 610 in the network is to relay signals between a satellite gateway 650 and a satellite terminal 625, which is on board an airplane 620. The airplane may also have a terrestrial antenna 626, which will be discussed later. Passengers on board the airplane connect devices, such as tablets, smartphones, laptop computers, and other appliances to the aircraft terminal via a wireless or wired connection. The satellite gateway 650 is communicatively coupled to a network 670, which is often the public Internet, via a router 660. The communications between the terminal and the gateway may be 2-way; content, such as web pages or streaming video, originates in the network and may be delivered to the user terminal, and this is referred to as the forward link; and requests for content originate with the user (the mouse-clicks) and may be delivered to an Internet destination, such as a web site, and this is referred to as the return link.

FIGS. 7A and 7B depict satellite payload diagrams for the forward and return links, respectively. For the forward link, a satellite antenna 712 generates a gateway beam 619, and the antenna 712 is communicatively coupled to satellite repeater receive hardware 713, and another satellite antenna 719 generates a user beam 619, and the antenna 719 is communicatively coupled to repeater transmit hardware 716 and includes the high power amplifier or HPA 715, which may use various techniques, such as activating or de-activating output stage amplifiers in a power combining scheme or adjusting bias voltages generated by the electronic power conditioner (EPC), to provide variable power or variable saturated power to a user a beam. High power amplifier designers skilled in that art have developed numerous techniques to adjust the output power and/or saturated output power of an amplifier. The connection between the gateway and user beams is made with a switch 714. The switch 714 and parts of the repeater receive hardware 714 and repeater transmit hardware 716 may be implemented with Digital Signal Processing (DSP) circuits and components. Skilled DSP designers may incorporate adjustable bandwidth connections between inputs and outputs in the switch design and employ direct RF sampling to eliminate analog frequency translation components. The satellite antennas 712 and 719 for the user and gateway beams, respectively, may be the same antenna. FIG. 7A and FIG. 7B show that the number of gateway beams, M, may be different from the number of user beams, N. Satellite designers, skilled in the art, attempt to design satellite payloads with minimum number of gateways to reduce gateway and gateway associated capital expenditures and operational expenses.

The usage of the on-board switch may have strong implications for the overall satellite system, including the satellite gateways. Adjusting the bandwidth of the connection between a gateway beam and a user beam may be an important flexibility measure that may reduce system costs compared to systems, which do not have this flexibility. FIG. 5B shows the quantity of forward link capacity that the satellite system must supply for each individual spot beam coverage region to satisfy the demand in the entire service area depicted in FIG. 2. This level of capacity must be supplied in the user spot beams and must be fed to the user spot beams from the gateway beam or beams. The amount of spectrum that is available for the gateways will determine the number of gateways that are required for the system. For instance, if the user beams in a system were to require 12,000 MHz of spectrum, and there is 2000 MHz of spectrum available for gateways in a single polarization (4,000 MHz for dual polarization), then a minimum of 3 dual-polarization gateways would be required to provide 12,000 MHz of user beam spectrum. Generally, system capital expenditures (CAPEX) and operational expenses (OPEX) are lower for systems with fewer gateways, so system architectures with fewer gateways may be superior to those with more gateways.

The connections between channels in the gateway beams and channels in the user beams may be fixed on-board the satellite, as depicted in FIG. 8A and FIG. 8B. For systems in which the demand for capacity is fixed or generally fixed in the user beams and where the traffic patterns are gateway to user (forward links) and user to gateway (return links), static connections may be the most cost effective method to interconnect the channels in the gateway beams with channels in the user beams on-board the satellite. Such a system is consistent with satellite-based enterprise and residential or consumer Internet service, provided by many satellite operators and/or service providers in the US and around the world. Unlike aeronautical mobile Internet users, fixed residential users and their demand for capacity tend to stay in a particular beam coverage region. Usage patterns in individual beam coverage regions, especially beam coverage regions that are in the same time zone, are similar, so peak usage in beam coverage areas in the same time zone occurs simultaneously. Gateway capacity for satellite-based residential Internet system may be sized to provide sufficient capacity for all individual user beams, and since demand in the user beams reaches its maximum levels simultaneously (for user beams in the same time zone), the gateway capacity must be sized by summing the maximum demand levels in the user beams. Static interconnections between gateway and user beam channels, depicted in FIG. 8A and FIG. 8B for forward and return link, respectively, are probably the most cost-effective way to architect systems, wherein peak demand in the beam coverage areas occur simultaneously. Switched interconnections between gateway and user beams may be an architecture choice for a satellite-based Internet access system for fixed users, but it may not be possible to exploit meaningfully the flexibility of the switch for instances of peak demand, since the interconnection flexibility provided by the switch cannot reduce the amount of required gateway beam capacity.

Returning to the aeronautical Internet service system, in which a multi-beam satellite may be an element of the network architecture, it has been noted in the tables of FIG. 5B and FIG. 5C that the maximum demand level for capacity across the service area, provided in FIG. 5B, is substantially lower than the sum of the peak demand level in each beam, provided in FIG. 5C. Therefore, unlike the satellite architecture for fixed users described in the preceding paragraph, it may not be necessary to size the gateway capacity for the sum of the peak demand levels, provided in FIG. 5C, in the individual beams. Instead, the gateway capacity may be sized for a fraction of the maximum demand level, provided in FIG. 5B, across the entire service area. This approach requires an on-board switch and a switch management device to interconnect flexibly gateway and user beam channels. FIG. 9A and FIG. 9B depict block diagrams of the switch and switch management device for forward and return link channels, respectively. For the forward links the switch has M inputs for the M gateways, which provide the required gateway capacity for the forward links, and N outputs for the N user beams. For the return links the switch has N inputs for the N user beams and M outputs for the M gateway beams, which provide the required gateway capacity for the return links. The switch may be configured to provide proper connectivity between the gateway and user beam channels, such that the user beam channels provide sufficient capacity to the spot beam coverage regions to meet the demand in the spot beam coverage regions. The switch configuration may be updated as necessary by the Switch Management Device, which is onboard the satellite and receives instructions from the ground-based Satellite Control System, to ensure that that the supplied capacity meets the demand in the individual coverage regions, as assessed by the Network Management System. Switch configuration updates may include both gateway and user beam interconnectivity changes and a change in the bandwidth of a particular connection between a gateway beam and a user beam. For example, a switch configuration update may call for an increase in the bandwidth of a connection between a gateway beam and user beam 1 and a decrease in the bandwidth of a connection between the gateway beam and user beam 2 as an airplane travels from user beam 1 to user beam 2. FIG. 9C depicts a Power Management Device, which is on board the satellite and receives instructions from the ground-based Satellite Control System. The Power Management Device controls the HPA saturated output power levels and is discussed in more detail below.

FIG. 10 outlines a method, 1000, for setting and dynamically adjusting the connectivity between satellite gateway and user beams in a service area. The method may have applicability to systems, wherein the peak demand is significantly lower than the sum of the peak demand levels in the individual beams and the traffic patterns are gateway to user and user to gateway. The method begins at block 1005 in which the latitude and longitude coordinates of an airplane are obtained for an approximate instance of time $t_0$. At block 1010, the capacity demand for the airplane is estimated, and at block 1015, a determination is made regarding which user beam can meet the capacity demand on board the airplane. The determination may be based on a combination of a user beam signal strength assessment at the airplane coordinates and the available capacity of the user beam. At block 1017 the quantity of bandwidth that delivers the data rate determined in block 1010 is determined. Blocks 1005 through 1017 are performed for all the airplanes in the service area at approximate time $t_0$ in block 1020. In block 1025 the required bandwidth to satisfy the demand for every airplane that is served by a particular spot beam is calculated by summing the required bandwidths for each individual airplane in the spot beam coverage region that will be served by the spot beam. In block 1030, block 1025 is repeated for every spot beam in the service area at approximate time $t_0$, and in block 1035 the gateway that will provide the capacity for a user beam at approximate time $t_0$, is determined, and in block 1040, block 1035 is repeated for all the user the remaining beams at approximate time $t_0$. In block 1045 the switch management device configures the on-board switch to provide the desired gateway to user beam connectivity determined in block 1035 with the bandwidth determined in block 1025 at approximate time $t_0$. In block 1050, block 1045 is repeated for all the remaining user beams at approximate time $t_0$. In block 1055 steps 1005 through 1050 are repeated for approximate time $t_0+\Delta t$, where $\Delta t$ is sufficiently small to ensure that no airplanes enter and exit a coverage service region before a configuration update is performed, and optimum $\Delta t$ is less than or equal to the time an airplane occupies the transition region between two beams, a definition of which follows.

Embodiments of the invention may include a non-transitory computer-readable storage medium storing computer-readable instructions that, when executed by a processor of a computing device, cause the computing device to perform operations outlined in method 1000 in FIG. 10.

FIG. 11A depicts adjacent coverage regions, Coverage Region 1 and Coverage Region 2, and circular spot beams, which are the primary provider of coverage for each of the coverage regions. While the FIG. 11A shows a hexagon-shaped primary coverage region, other shapes are possible. Spot beam 1 is the primary beam for Coverage Region 1, and spot beam 2 is the primary beam for Coverage Region 2. The spot beams may be generated by the same platform or may be generated by two separate platforms, for instance separate satellites. The primary beam may provide the highest level of capacity to a Coverage Region. A plane flying from Coverage Region 1 to Coverage Region 2 passes through a transition region and may be provided with a communication service from the platform that generates Beam 1 or the platform that generates Beam 2, since there is coverage overlap between Beam 1 and Beam 2. While in the transition region, the airplane communication service may be shifted from the platform that generates Beam 1 to the platform that generates Beam 2. A skilled designer optimizes the degree of overlap of adjacent beams, which provide coverage of adjacent regions, and the degree of overlap impacts the size of the transition region. There is a balance between the size of the transition regions and system complexity and cost, as larger transition regions generally require more beams to provide coverage of a given service area, and transition regions, which are very small, will drive the complexity of the communication service transition algorithms and the hardware and software costs associated with their implementation.

FIG. 11B depicts two adjacent primary coverage regions with Beam 1 providing coverage of Coverage Region 1 and Beam 2 providing coverage of Coverage Region 2. Beam 2 and the signals it carries get weaker as an airplane moves farther from center of Beam 2 and closer to the center of Beam 1. Beam 1 may be nearly or fully utilized, and Beam 2 may be underutilized and have unused capacity, and Beam 2 may provide capacity to an airplane Coverage Region 1 in the portions of Coverage Region 1 that are outside the nominal transition region. Using an adjacent beam to provide capacity in portions of a coverage region may be a technique for supplying additional capacity to a coverage region.

Method 1000 discussed switch configuration and configuration updates for all of the beams for approximate time $t_0$ and updating the switch configuration for all of the beams on a satellite within $\Delta t$. It is not necessary to update the switch configuration for all the beams at the same approximate time. For instance, the switch may be configured for half of the beams at approximate time $t_1$ and subsequently updated at time $t_1+\Delta t$, while the switch may be configured for the remaining half of the beams at approximate time $t_2$ and subsequently updated at time $t_2+\Delta t$. For the most general case, the satellite beams can be divided into arbitrary groups with equal or unequal numbers of beams, and a switch configuration for an individual group of beams, group i, is applied at time $t_i$, and switch configuration updates are applied for group i at time $t_i+\Delta t$.

Method 1000 also discussed switch configuration updates after a time interval of $\Delta t$. It is not necessary for $\Delta t$ to be constant for all airplanes in the service area. For airplanes in or near the middle of an individual spot beam coverage region, for instance, it is unlikely that a different spot beam would be used in the next configuration, so Δt could be longer than Δt for an airplane that is in or near (and approaching) a transition region between 2 beams. In general, the switch must be commanded on time-scales that match the variations in demand in the individual coverage regions for the system to deliver the right amount of capacity to each of the coverage regions.

In the beam traffic model depicted in FIG. 5A, FIGS. 5B, and 5C for the beam laydown of FIG. 2, inclusion of a switch and switch management device depicted in FIG. 8A in the satellite payload means that the gateway capacity must deliver a minimum of 12,437 Mbps to satisfy the maximum demand for Internet connectivity for all the planes, and the network operator may determine that the system must be designed to provide a fraction of the maximum demand. With a spectral efficiency of 1.5 bps/Hz, which corresponds to a signal with QPSK modulation and ¾ coding (MOD-COD ¾ QPSK) and is common for small airplane terminals, 8291 MHz of bandwidth is required to deliver 12,437 Mbps. With 2.2 GHz of available gateway spectrum per polarization (4.4 GHz for dual polarization), 2 dual polarization gateways would be required to satisfy 100% of the peak demand.

With static connectivity between the gateway and user beams, 16,477 Mbps of gateway capacity is required, and for ¾ FEC QPSK signals 10,984 MHz of bandwidth is required. With 2.2 GHz of available gateway spectrum per polarization (4.4 GHz for dual polarization), 3 gateways would be required to satisfy the peak demand. In the simple example, 50% more satellite gateways are required for the static connectivity design than for the design, which contains on-board switching and a switch management device. As the number of satellite beams grows, the ratio of the sum of the maximum capacity levels per user beam to the maximum sum for all of the user beams will grow, which results in an even greater number of gateways for the static connectivity design. For systems with more than 100 satellite beams, the ratio is expected to grow to more than 100%. The determination regarding whether to include the switch in the payload architecture comes down to a comparison of the costs of including the switch, which include the switch itself, the switch management device, the software to operate the switch, the software additions to the network management system, the ground and satellite hardware to command and control the switch, and other items, to the hardware, software, and integration costs of additional gateways and the operational costs of the additional gateways. The gateway savings may significantly exceed the switch costs, so inclusion of the switch may lower overall system costs.

Satellite resources of mass, bandwidth, power, heat transfer, layout area, and other resources for payload equipment are precious, and in an optimally designed satellite, sufficient resources are applied to satisfy the demand or predetermined fraction of the demand in a given coverage area. Insufficient resources mean that capacity must be rationed, while too many resources mean that costs expended to provide capacity in a coverage region are higher than necessary. Tailoring capacity to match expected demand in a given coverage region may result in an especially cost-efficient system.

Herein, it has been demonstrated that adjusting the bandwidth of the connection between a gateway beam and a user beam may be an important flexibility measure that may reduce system costs compared to systems, which do not have this flexibility, by reducing the number of gateways. Varying a signal's information rate, which is capacity measure in terms of data rate (Mbps, for instance), modulation, and error correction code may vary the bandwidth of a signal. In general, a wireless communication link requires sufficient power and bandwidth for successful transmission of information from a source to a destination. FIG. 5A shows that the demand in the individual spot beam coverage regions varies over time. A system that can provide a specified fraction of the maximum capacity in each coverage region over a given time span will meet the goals of the network operator, and for this example, the fraction will be 1—that is, system design that is discussed meets 100% of the demand in each coverage beam region in the service area. The satellite payload may be sized such that the capacity in an individual coverage region matches the maximum demand level for the coverage region, which is provided in the table of FIG. 5B. For instance, the capacity levels in spot beam coverage regions 1 and 3 are as high as 2658 Mbps and 1169 Mbps, respectively, which meets the maximum demand in each of these coverage regions. When the demand is lower, the supplied capacity in the individual coverage may be reduced to the demand level, and the system still meets the network operator's goal of supplying 100% of the demanded capacity. For instance, at 17:07 the capacity levels for spot beam coverage regions 1 and 3 are 2126 Mbps and 0 Mbps, respectively, which matches the demand in each of the coverage regions at 17:07.

Adjustment of the RF power and the bandwidth of a gateway-user beam connection may be a powerful technique to vary capacity in a beam. Adjusting either the bandwidth of a gateway-user beam connection (to accommodate alternative signal information rate and/or coding) or RF power of a signal or adjusting both gateway-user beam connection bandwidth and RF power simultaneously are techniques to adjust the capacity that a satellite delivers to an individual coverage region. In a multi-beam satellite the bandwidth adjustment in a gateway to user beam connection is subject to constraints imposed by adjacent beams, as depicted in FIG. 12. Adjacent beams generally cannot utilize the same bandwidth segment, because such utilization would introduce high levels of interference. FIG. 12(a) depicts the initial spectrum that is allocated to Beams 1 and 2 in the example. In FIG. 12(b), Beam 1 spectrum is unchanged and Beam 2 spectrum is increased to permit higher capacity in Beam 2, and there is no overlap of the Beam 1 and Beam 2 spectrum and negligible interference between Beam 1 and 2. In FIG. 12(c) the Beam 1 spectrum remains unchanged and the Beam 2 spectrum is increased to its maximum extent and abuts Beam 1 spectrum. There is no overlap between Beam 1 and Beam 2 spectrum and negligible interference between Beam 1 and 2. In FIG. 12(d), the Beam 1 spectrum remains unchanged and the Beam 2 spectrum is increased such that there is overlap with Beam 1 spectrum. The Beam 1 and 2 are adjacent, and a natural electrical property of antennas cause some of the energy in Beam 1 to spill over in the Beam 2 coverage region and some of the energy in Beam 2 to spill over into the Beam 1 coverage region, and since Beam 1 and Beam 2 share the same spectrum, indicated by the notation of the spectrum overlap region in FIG. 12(d), there will be strong interference between Beam 1 and Beam 2, which will significantly impair the communications signals in both the Beam 1 and Beam 2 coverage regions. There are limits to spectral growth in adjacent beams. Signal bandwidth in a beam can be increased, but the resulting bandwidth growth is limited by the spectrum that is used in the adjacent beam.

It is important to note that incremental capacity growth, in terms of bits per second, decreases as incremental bandwidth is increased if RF power is held constant, since spectral efficiency decreases, as more coding is included in a signal. If the required capacity increase exceeds what can be obtained by only increasing the signal bandwidth (by increasing the information rate and the quantity of coding bits), then the coverage region will be left with an under-supply of capacity. By increasing the signal bandwidth and RF power in a beam, it is possible to boost the capacity in an individual beam more than by just increasing signal bandwidth alone. With additional RF power, it is possible to transmit signals with higher spectral efficiency, which boosts capacity. FIG. 9C depicts an arrangement whereby the saturated output power of the HPA 715 is varied to vary the EIRP in a transmit user beam 611. A Power Management Device, which is on board the satellite, receives instructions from the Satellite Control System, which is on the on the ground (and also issues instructions to the on-board Switch Management Device). The Satellite Control System responds to demand determinations that the Network Management System performs (and nearly continuously updates). The power management device may adjust the DC voltages that are applied to a solid-state power amplifier (SSPA) or travelling wave tube amplifier (TWTA). The power management device may adjust the distribution of power among the input ports of a multi-port amplifiers' (MPA) input network (INET) to achieve a desired distribution of output power among the MPA outputs. Other embodiments of the invention may include additional power management techniques. In coverage regions where the bandwidth demand is close to the maximum available spectrum available for a satellite system, having adjustable RF power in a beam may extend the range over which capacity can be varied in a beam. Varying signal bandwidth and power, together, in an individual beam may provide more flexibility than varying either bandwidth or power, alone, in varying capacity in an individual beam. A Power Management Device could also be used to vary the EIRP in the gateway transmit beams for the return links. On-board switch configuration and HPA power level adjustments are issued from the ground via the Satellite Control System and may be based on demand determination in an individual user beam, which is a function that the Network Management System performs.

The partitioning of the available satellite spectrum among two or more beams is referred to as Frequency Division Multiplexing (FDM). FDM and Frequency Division Multiple Access (FDMA) are techniques of distributing spectrum and providing access to a wireless network. Beam hopping is another technique to provide access and allocate capacity to a wireless network. In beam hopping, all or most of the spectrum is allocated to each of the satellite's individual coverage regions, and the users take turns using the satellite. The method of users sharing taking turns using the network in different time segments is Time Division Multiple Access (TDMA). Returning to FIG. 6, a first user in coverage region 640*a* uses satellite beam 611*a*, which provides coverage of region 640*a* for a segment of time, during which no other users are communicating with the satellite. The first user in coverage region 640*a* then relinquishes the satellite, and a second user in coverage region 640*b* uses the satellite beam, which provides coverage of region 640*b*, for a time segment and then relinquishes access to the satellite; and then a third user in coverage region 640*c* uses the satellite beam, which provides coverage of region 640*c*, for a time segment and then relinquishes access to the satellite;

and then a fourth user in coverage region 640*d* uses the satellite beam, which provides coverage of region 640*d*, for a time segment and then relinquishes access to the satellite. Then, the first user in coverage 640*a* accesses the satellite and the cycle is repeated. The time segments for which each user accesses the network do not have to be equal; in fact, varying the time segments is a method of varying the capacity for each of the users. Users, which have access to the satellite and network for longer segments of time, are provided with more capacity than users, which have access to the satellite and network for shorter segments of time.

FIG. 13A illustrates the user beam frequency plan, and FIG. 13B depicts the time-varying beam hopping plan for the beam-hopping scenario described above. Satellite beam 611*a* uses the entire available network spectrum in time slots 1 and 5. In time slots 2 and 6, satellite beam 611*b* uses the entire available spectrum. In time slots 3 and 7, satellite beam 611*c* uses the entire available spectrum. In time slots 4 and 8, satellite beam 611*d* uses the entire available spectrum. If the time slots are the same duration, then each is allocated ¼ of the network's resources. Time slots for beams in which there is more demand may be made longer than time slots for beams in which there is less demand to tailor network resources to actual demand. For beam hopping or any TDMA system to work well, time must be distributed throughout the network to ensure that the intended users are indeed using the network during their assigned slots. When only one user, the first user in coverage region 640*a*, for instance, is using the network, it cannot introduce harmful interference into the communications channels utilized by the nearest neighbor beams, because there are no co-frequency users in the neighboring beams during the time segment that first user is using the network. TDMA, like FDMA, is helpful in preventing harmful interference among network users.

Some of the individual coverage regions in the spot beam laydown, depicted in FIG. 2, have significantly higher capacity demand than other individual coverage regions. The flexibility measures discussed herein may be used to allocate precious satellite resources to satisfy as much of the demand as possible. However, if the demand in a particular beam coverage region exceeds the maximum capacity that can be provided by a single satellite, then some of the demand will be unmet, if there are no other sources of capacity. Other sources of capacity may include one or more of an additional satellite, and/or a terrestrial-based system, such as an aircraft platform and/or an air-to-ground (ATG) communication system, and demand, which cannot be satisfied by a single satellite beam, may be met by a combination of (another) satellite, aircraft platform, and ATG systems. An aircraft platform can be a balloon, airplane, unmanned aerial vehicle (UAV), airship, blimp, or dirigible with a communications payload to relay signals to and from an airplane. The aircraft platform may be fixed or confined to a specified volume or float with the prevailing winds and may fly at an altitude from 1 to 50 km. The FCC has categorized a type of aircraft platform as a high altitude platform station (HAPS) and has allocated spectrum for HAPS. HAPS are UAVs or airships that are confined to a specified volume and operate at altitudes ranging from 20 to 50 km. An aeronautical broadband Internet service system for a service area may be designed such that some regions are served by satellite only and some regions are served by a combination of satellite and terrestrial based systems, such as aircraft platform, and ATG systems. System implementation and operational cost considerations, along with plans to accommodate future demand growth, may determine the optimum combination of assets to provide the service.

The quantity of satellite spectrum, the size of the beam, and the amount of RF power (and the size of the user terminal) affect the maximum capacity a satellite can deliver to a coverage region. For some coverage regions, for instance, coverage regions, which may include busy airports or intersections of dense flight routes, the number of planes and passengers may be too great for a single spot beam to supply all the required capacity. Additional capacity may be supplied from an additional satellite. Still, even with 2 satellites, there may not be sufficient capacity for all the passengers in the vicinity of busy airports. Building and launching more and more satellites to raise the supply of capacity over a very busy region may become expensive, if only a few coverage beams in the service area require additional capacity. Adding satellites for a few high demand coverage areas, such as Chicago, Atlanta, and New York City, may not be cost-effective. Instead, the additional supply required in the very high demand coverage regions may be delivered by less expensive terrestrial-based capacity augmentation systems, such as an ATG system or an aircraft platform, which are capable of providing high capacity over a targeted region. FIG. 5B provided the maximum demand in each of the individual coverage regions for the spot beam laydown of FIG. 2. If the maximum quantity of spectrum that can be allocated to an individual satellite spot beam coverage area is 1500 MHz, the maximum usable spectrum is 90% of the allocated spectrum (based on signal roll-off and guard bands), and the spectral efficiency is 1.5 bps/Hz, then the maximum data rate in an individual spot beam coverage area for FIG. 2 is 1500 MHz*0.9*1.5 bps/Hz, which equals 2025 Mbps. Maximum capacity of 2025 Mbps in an individual coverage region is insufficient to meet the maximum demand for spot beam coverage regions 1 and 5, as shown in the table in FIG. 14. Deployment of an additional satellite to provide additional capacity in coverage regions 1 and 5 may be expensive, and it may be more cost-effective to utilize a terrestrial-based system, such as an aircraft platform 1510, and/or ATG antenna system 1520, systems to provide additional capacity to meet the full demand in coverage areas 1 and 5, as depicted in FIG. 15. Those skilled in the art of satellite system design are able to generate a trade space of individual coverage region demand for capacity and satellite system capacity vs. cost to optimize a cost-effective overall system architecture that includes satellite and terrestrial-based capacity augmentation systems, such as ATG systems and aircraft platforms, that provides the required capacity over a service area to meet expected current and future demand for communication services for airplane passengers in the service area.

FIG. 16 illustrates a hybrid satellite, aircraft platform, and ATG system scenario that provides broadband Internet service to airplanes in a satellite beam coverage region in which broadband service demand is too high to be satisfied by satellite alone. Some of the airplanes may use their satellite terminal 625 to communicate with a satellite 610; some of the airplanes may use the satellite terminal 625 to communicate with an aircraft platform 1510; and some of the airplanes may use a terrestrial antenna 626, to communicate with the ATG antenna system 1520. In the FIG. 16 example, the ATG antenna system 1520 uses a multi-feed phased array antenna to generate multiple ATG beams 1521. The ATG system could also use distributed ground antennas, which may be mounted on cell phone towers and may employ some of the techniques used in massive MIMO system. The ATG antenna system may also deploy mechanically steered antennas. For ATG reception and transmission, the terrestrial antenna 626 must be mounted on the belly or sides of the airplane. The terrestrial antenna on the airplane may be directional or omni-directional and the choice will depend on cost of the antenna and installation, the cost of ground portion of the ATG system, and the permissible emission levels from the airplane and ground portions of the ATG system.

Many of the satellites, such as ViaSat 2 and the Inmarsat Global Xpress fleet, that provide Internet service to airplane passengers use the 20/30 GHz Ka-band. The FCC has proposed usage of portions of Ka-band, specifically 24.25-27.5 GHz, for HAPS, a type of aircraft platform, in ITU Region 2 (North and South America), and the satellite terminals on board the airplanes are capable of operation in this frequency band, and since HAPS, like satellites, are "above" the airplanes, an airplane's satellite terminals may be able to communicate with HAPS, so separate HAPS terminals may not be required. While FIG. 15 shows the scenario in which the aircraft platform and ATG service coverage areas are completely within a single satellite spot beam coverage area, there will be cases in which the aircraft platform and ATG systems serve parts of 2 or 3 adjacent satellite spot beam coverage regions.

FIG. 17 depicts an aircraft platform-based aeronautical communications network 1700, comprising an aircraft platform 1510 with multiple user spot beams 1711, which provide coverage of user spot beam coverage regions 1740, and an aircraft platform gateway beam 1719, which provides coverage of a gateway spot beam coverage region 1730, which contains an aircraft platform gateway 1750. While FIG. 17 shows a multi-beam aircraft platform, the aircraft platform may deploy a single spot beam. The role of the aircraft platform 1710 in the network is to relay signals between an aircraft platform gateway 1750 and a satellite terminal 625, which is on board an airplane 620. Passengers on board the airplane may connect devices, such as tablets, smartphones, and laptop computers, to the aircraft terminal via a wireless or wired connection. The aircraft platform gateway 1750 may be communicatively coupled to a router 660, which may be connected to a network 670, which is often the public Internet and could also be a private network or local network. The communications between the terminal and the gateway may be 2-way; content, such as web pages or streaming video, originates in the network and may be delivered to the user terminal, and this is referred to as the forward link; and requests for content originate with the user (the mouse-clicks) and may be delivered to an Internet destination, such as a web site, and this is referred to as the return link.

An aircraft platform may fly at approximately 20 km in FAA Class E airspace, in which unmanned aerial vehicles may be operated, and may be stationary or carried by the prevailing winds. FIG. 18 depicts the geometry between an airplane flying at altitude of 9 km (~30,000 feet) and an aircraft platform. As discussed earlier, an aircraft platform may be deployed in the vicinity of busy airports, where larger concentrations of airplanes, airplane passengers, and demand for broadband service are expected. FIG. 18 also contains a table showing aircraft platform service diameter vs. airplane elevation angle for an aircraft platform and airplane altitudes of 20 km and 9 km, respectively. The service diameter is the region in which the aircraft platform can provide broadband service. The table shows that at an elevation angle of 10 degrees, the aircraft platform service diameter is approximately 120 km.

FIG. 19A depicts an ATG-based broadband communications network, 1900, comprising ATG antennas 1910, which may generate multiple user spot beams 1521, which may track airplanes 620 and communicate with the airplane's terrestrial antenna 626. The ATG antenna system may be located in or near the satellite beam coverage region in which there is a high concentration of airplane passengers, who are to be served by the broadband communication system. The ATG antenna system may be centralized and comprise a few multi-feed electronically controlled phased array antennas, as depicted in FIG. 16, or several mechanically steered antennas or be distributed among several cell phone towers across the high demand region. The ATG antennas may be controlled by an ATG beam controller 1920, which is used for beam forming, in the case of phased array antenna implementation, and airplane tracking. The ATG antenna inputs and outputs may be connected to an ATG gateway 1930, which may be communicatively coupled to a network 670, often the public Internet, via a router 660. The ATG-based broadband communications system is managed by the ATG Network Management System 1905, which may communicate with and control the ATG beam controller 1920, the ATG gateway 1930, and the router 1940. The ATG management system may include a gateway to communicate with the Network Management System and a gateway to communicate with an airplane terminal. The range of the ATG system may be approximately 10-100 km and may depend on implementation and operational costs and on permissible emission levels from the airplane and ground parts of the system. The communications between the airplane and the ATG-based broadband communications system are 2-way; content, such as web pages or streaming video, originates in the network and may be delivered to passengers on the airplane, and this is referred to as the forward link; and requests for content originate with the airplane passengers (the mouse-clicks) and may be delivered to an Internet destination, such as a web site, and this is referred to as the return link.

FIG. 19B shows a single-site ATG antenna system 1910 implementation that uses three ATG antenna subsystems 1520 to provide 360 degrees of coverage. Other arrangements are possible to obtain 360 degrees of coverage from a single site. The antennas at the site may be mechanically or electronically steered to track the moving airplanes 620. FIG. 19C depicts a multi-site implementation of ATG systems 1910 in a satellite 610 spot beam coverage region 640. Multiple ATG antenna systems may be necessary, if a single ATG system lacks the range and capacity to provide coverage of the complete satellite beam coverage regions 640, in which there is elevated demand for communication services.

To summarize, the aeronautical broadband Internet delivery system described herein, an example depiction of which is provided in FIG. 20, may use satellite 610 to provide capacity to airplanes 620 over a geographically broad service area and a terrestrial-based capacity augmentation systems, such as an aircraft platform 1510 or ATG system with an associated ATG antenna system 1520, to create high capacity hotspots in the parts of the service area, where the satellite capacity may be insufficient to meet demand. In FIG. 20, 0 or 1 airplane in a region represent regions in a satellite service area in which the satellite has sufficient capacity to satisfy the demand; multiple airplanes in a region represent regions in which satellite capacity is insufficient to support the demand, and aircraft platforms 1510, and ATG systems 1520, are deployed in these regions to boost the capacity locally, so that all of the airplanes in the satellite service area are provided with sufficient capacity to meet the demand. Deployment of aircraft platforms and ATG systems to provide broadband service to airplane passengers across the entire US may be very expensive, as several hundred aircraft platforms and ATG sites would be required and in rural and low population areas, such as the Rocky Mountains, the telecommunications and power infrastructure may be lacking and may have to be constructed for aircraft platform and ATG gateways. The goal of a system designer is to figure out how to apportion the capacity supply among the satellite, aircraft platform, and ATG elements to obtain the most cost-effective way to meet the demand. Generally, if demand were spread relatively evenly across the service area, then overall system costs may be lowest if only satellites were used. If demand across the service area were very peaky in a few locations, then system costs may be lowest if satellites are used in the lower and moderate demand parts of the service area and to provide some of the capacity in the high demand regions, and aircraft platforms and ATG systems are used in the high demand areas to provide the capacity that satellites are unable to deliver.

Satellite gateways, which may be controlled by a satellite network management system, may be connected to routers, which relay traffic to and from a network such as the Internet in the case that the system is used for Internet access. Aircraft platform gateways, which may be controlled by an aircraft platform network management system, may be connected to routers, which relay traffic to and from a network such as the Internet in the case that the system is used for Internet access. ATG gateways, which may be controlled by an ATG network management system, may be connected to routers, which relay traffic to and from a network such as the Internet in the case that the system is used for Internet access. In the case of a private network, the routers are connected to a special router that permits traffic flow between the user terminals and the private network, after the users/user terminals are properly authenticated. The invention described herein pertains to connection to the Internet, a private network, or any other network or local-area network.

The satellite controller performs satellite configuration management and control; the aircraft platform controller performs aircraft platform configuration management and control; and the ATG controller performs ATG configuration management and control. The controllers configure the satellite, aircraft platform, and ATG hardware to set up the proper channels for the forward and return links. The satellite and aircraft platform controllers perform transponder pad setting, active hardware selection and configuration, and switch setting to permit the desired uplink and downlink connections for the gateway and user beams. In the case of a hardware failure, a receiver, for instance, the controller may command the satellite or aircraft platform to take the failed receiver offline and activate and bring a spare receiver online to take the place of the failed receiver. The ATG controller enables the beams to track the airplanes and sets the RF levels, and in the case of a phased array implementation, forms the beams. The ATG controller may also manage hardware failures.

The satellite, aircraft platform, and ATG elements must be managed to provide a communication service to an end user, ensure the end user is provided with an acceptable experience and Quality of Service (QoS), and maximize network throughput and revenue, whether the system is implemented using FDMA or TDMA techniques. FIG. 21 depicts the high-level architecture of the Broadband Aeronautical Network Management System (NMS). Via gateways in the NMS, the NMS is directly or indirectly in communication with the managements systems for the satellite, ATG, and aircraft platform, and is capable of determining overall capacity to provide communications services to the airplane terminal and allocating satellite capacity and aircraft platform capacity for the airplane terminal, depending on various factors described herein. An NMS gateway may be directly or indirectly in communication with the aircraft terminal to configure it (the terminal) to interact with the designated platform for connectivity. The system management device may allocate satellite, aircraft platform, and ATG capacity to the airplane terminal depending on demand for the satellite, aircraft platform, or ATG capacity in the geographic vicinity of the airplane. A skilled artisan would recognize that the invention can be implemented using various combinations of the foregoing NMS elements and various combinations of subsets of the foregoing, such as satellite and ATG network management systems only and satellite and aircraft platform network management systems only, to match the system architecture.

Since airplane speeds can approach 900 km per hour or more, it is important for the management system to have anticipatory behavior, especially as a communication service for an airplane terminal moves from one satellite beam to another satellite beam, from a satellite to a terrestrial-based capacity augmentation system, such as an ATG system or aircraft platform, or from an ATG system or aircraft platform to satellite.

The system management device may allocate one or more of the satellite, aircraft platform, and ATG capacity to the user terminal depending on, for example, an amount of overlapping geographic coverage associated with the multi-beam satellite and the aircraft platform or multi-beam satellite and the ATG system. In areas of partial or no overlapping geographic coverage, the system management device may be capable of allocating capacity from one or more of the ATG capacity, aircraft platform capacity, or satellite capacity. In areas of partial or complete overlapping geographic coverage, the system management device may allocate capacity from one or more of the ATG capacity, aircraft platform capacity, or satellite capacity. The system management device may allocate satellite capacity, aircraft platform capacity, and ATG capacity based on a comparison among two or more of a signal strength of the satellite, a signal strength of the aircraft platform, and a signal strength of ATG system. Furthermore, the system management device may allocate satellite capacity, aircraft platform capacity, and ATG capacity based on assessment of a current available satellite capacity, aircraft platform capacity, ATG capacity and also an expected satellite capacity, an expected aircraft platform capacity, and an expected ATG capacity. The system management device may change the allocation of one or more of the satellite capacity, aircraft platform capacity, and ATG capacity based on a change of communication service provided to the airplane terminal. The system management device may transition allocation of capacity from the satellite capacity to the aircraft platform capacity, or from the aircraft platform capacity to the satellite capacity. Or the system management device may move allocation of capacity from the satellite capacity to the ATG capacity, or from the ATG capacity to the satellite capacity. The system management device may move capacity in response to a customer request, at the direction of a system operator, or for other reasons.

There may be a Satellite Network Manager 2110 that manages and controls the satellite network, and an Aircraft Platform Network Manager 2115 that manages and controls the aircraft platform network, and an ATG Network Manager 1905 that manages and controls the ATG network. The NMS 2105 may have gateways to communicate with the Satellite Network Manager 2110, the Aircraft Platform Network Manager 2115, and the ATG Network Manager. The NMS may also have a gateway to communicate with a terminal, which may be an airplane terminal. The Satellite Network Manager 2110, Aircraft Platform Network Manager 2115, and ATG Network Manager 1905 may have gateways to communicate with the NMS 2105 and gateways to communicate with a terminal, such as an airplane terminal. Functions for the Satellite Network Management System, Aircraft Platform Network Management System, and the ATG Network Management System may be processing communications service requests from new users, processing communications service adjustment requests from existing users, provisioning services, service initiation, service termination, tracking capacity usage, tracking capacity inventory, configuring the network elements, and service monitoring and reporting. Some, many, or all of these functions may be performed by or shared with the NMS 2105 in other embodiments of the invention. The NMS, satellite, and capacity augmentation management systems may be implemented with a computer device that has a non-transitory computer readable storage medium and executes instructions to perform the operations of:

configuring a satellite network to provide a communication service to an airplane terminal configuring a capacity augmentation network, such as an ATG system or aircraft platform, to provide a communication service to an airplane terminal allocating capacity among the satellite and capacity augmentation network to an airplane terminal transitioning an airplane terminal from a satellite network to a capacity augmentation network (ATG system or aircraft platform) or vice versa Capacity inventory refers to the unused satellite, aircraft platform, and ATG capacity that may be available to new users or to accommodate service change requests from existing users.

The Satellite Network Manager 2110 may manage the satellite controller 2215, which performs satellite configuration management and control, as depicted in FIG. 22. The satellite controller configures the hardware on the satellite to set up the proper channels for the forward and return links. The satellite controller may issue commands for transponder pad setting, active hardware selection and configuration, and switch setting to permit the desired uplink and downlink connections for the gateway and user beams. In the case of an on-board hardware failure, a receiver, for instance, the controller may command the satellite to take the failed receiver offline and activate and bring a spare receiver online to take the place of the failed receiver. The Satellite Network Manager may also be responsible for service provisioning 2220, service monitoring 2230, and network configuration 2225. The network configuration module 2225 may be responsible for configuring the elements in the path between the Internet (or private network or other network or local area network) and the airplane terminal to ensure data packets arriving from the Internet are delivered to the intended airplane terminal for the forward links, and data packets sent from the airplane terminal are properly forwarded to the Internet. The network configuration control module may manage and control the satellite gateway control module 2235, the airplane terminal control module 2240, or the router control module 2245. The airplane terminal module 2240 may manage the antenna control 2241 and radio control 2242 modules in the remote terminals. The network configuration module may contain a data store 2226 for storage of network configuration files, which may include terminal, gateway, router, satellite, and other configuration files for a particular communication service.

In the areas where the demand for communication services for airplane terminals exceed the capacity a satellite may supply, a capacity augmentation system, which may be terrestrial-based, with an associated capacity augmentation management system, may be deployed. The capacity augmentation management system could be the management system for an ATG system or an aircraft platform and may have gateways for communication with a NMS and with an airplane terminal. The capacity augmentation management system may configure the airplane terminal and manage a communication service for the terminal in accordance with instructions it receives from the NMS, one of whose functions is to allocate capacity among satellite and capacity augmentation elements. The communication service may provide connectivity to the Internet for the airplane terminal.

The Aircraft Platform Network Manager 2115 may manage the aircraft platform controller 2315, which may perform aircraft platform configuration management and control, as depicted in FIG. 23. The aircraft platform controller may configure the hardware on the aircraft platform to set up the proper channels for the forward and return links. The aircraft platform controller may issue commands for transponder pad setting, active hardware selection and configuration, and switch setting to permit the desired uplink and downlink connections for the gateway and user beams. In the case of a hardware failure, a receiver, for instance, the controller may command the aircraft platform to take the failed receiver offline and activate and bring a spare receiver online to take the place of the failed receiver. The Aircraft Platform Network Manager may also be responsible for service provisioning 2320, service monitoring 2330, and network configuration 2325. The network configuration module 2325 may be responsible for configuring the elements in the path between the Internet (or private network or other network) and the airplane terminal to ensure data packets arriving from, for example, the Internet are delivered to the intended airplane terminal for the forward links, and data packets sent from the airplane terminal are properly forwarded to the Internet. The network configuration control module may manage or control the aircraft platform gateway control module 2335, the airplane terminal control module 2340, and the router control module 2345. The airplane terminal module 2340 may manage the antenna control 2341 and radio control 2342 modules in the remote terminals. The network configuration module may contain a data store 2326 for storage of network configuration files, which may include terminal, gateway, router, aircraft platform, and other configuration files for a particular communication service. In other embodiments of the invention described herein, the NMS functions may be arranged differently and consolidated or part of other modules.

The ATG Network Manager 1905 may manage the ATG controller 2415, which may perform ATG configuration management and control, as depicted in FIG. 24. The ATG controller may configure the hardware in the ATG system to set up the proper channels for the forward and return links. The ATG controller may issue commands for beam forming, airplane tracking, and RF level setting to permit the desired transmit and receive connections for the ATG beams. In the case of a hardware failure, an element in the array, for instance, the controller may command the ATG to take the failed element offline and activate and bring a spare element online to take the place of the failed element or develop a work-around for the failed element and not bring a spare element online. The ATG Network Manager is also responsible for service provisioning 2420, service monitoring 2430, and network configuration 2425. The network configuration module 2425 may be responsible for configuring the elements in the path between the Internet (or private network or other network) and the airplane terminal to ensure data packets arriving from, for example, the Internet are delivered to the intended airplane terminal for the forward links, and data packets sent from the airplane terminal are properly forwarded to the Internet. The network configuration control module may manage or control the ATG gateway control module 2435, the airplane terminal control module 2440, and the router control module 2445. The airplane terminal module 2440 may manage the antenna control 2441 and radio control 2442 modules in the remote terminals. The network configuration module may contain a data store 2426 for storage of network configuration files, which may include terminal, gateway, router, aircraft platform, and other configuration files for a particular communication service. In other embodiments of the invention described herein, the NMS functions may be arranged differently and consolidated or part of other modules.

The NMS 2105 may manage the satellite, aircraft platform, and ATG network management systems to ensure that the overall system resources are used in the most efficient manner. The NMS may be in communication with the satellite, aircraft platform, and ATG network systems and may make decisions based on inputs from these systems. One of the decisions may be which network—satellite, aircraft platform, or ATG—should serve a particular airplane terminal at a particular instance in time and in the future over a particular time duration. This decision can be made especially frequently for an airplane terminal, as airplane speed can exceed 900 km per hour. An outcome of this decision may be the transition of an airplane terminal and associated communication service from the satellite network to the aircraft platform network and vice versa or from the satellite network to the ATG network and vice versa. Communication service transition may be based on signal strength estimates or measurements at the user terminal from one or more of the satellite, aircraft platform, and ATG networks, available capacity or future expected available capacity in the satellite, aircraft platform, and ATG capacity inventory, location of the airplane terminal, expected movement of the airplane terminal, or other rationale.

In addition to the Satellite Network Management, Aircraft Platform Network Management, and ATG Network Management modules, the NMS 2105 may possess a gateway to communicate with the Communications Service Allocation and Transition System 2120 to allocate capacity for an airplane among the satellite and capacity augmentation systems (aircraft platform and/or ATG system) and to facilitate and control the transition of a communications service provided to an airplane terminal from satellite to aircraft platform and vice versa or from satellite to ATG and vice versa. In some embodiments of the invention the Communication Service Allocation and Transition System may be partially or entirely contained in the NMS 2105. To orchestrate such a move, the control plane for the Communication Service Transition System may extend to the airplane terminal antenna and radio and the satellite, aircraft platform, and ATG gateways and routers. The radio in an airplane terminal may include one or more of RF circuits and a modem. The NMS may issue instructions to one or more of the satellite, aircraft platform, and ATG network management modules to make the appropriate adjustments in the airplane terminals and the gateway and routers; it may interface with the airplane terminals and gateways.

FIG. 25 outlines a general example method 2500 to determine transition plans for an airplane terminal's communication service via a satellite network to another satellite network or an aircraft platform or ATG network. Such a communication service may be, for example, connectivity to a private network, a local area network, the Internet, a cellular network such as a 3G, 4G, 4G LTE, LTE or 5G network, other radio network, the PLMN, the PSTN, a component of a Wi-Fi hotspot, or any other network. Applications of a communication service may be for streaming video, linear television, web browsing, e-mail, or other data. The method begins at blocks 2505, 2510, and 2515 at which the boundaries for the primary service region for the satellite beams, aircraft platform beams, and ATG antenna systems are defined; the boundaries for the transition regions for all the satellite beams, aircraft platform beams, and ATG antenna systems are defined; and the airplane terminal is receiving a communication service via a satellite beam. At block 2520 the latitude, longitude, speed, and direction for the airplane are obtained, and in block 2525, a determination is made as to whether or not the airplane is in or near a transition region in the satellite beam. If the airplane is not in a transition region, the airplane continues to obtain its communication via the current satellite beam, as stated in block 2530. If the airplane is in a transition region, then at block 2535, the airplane's path is projected, based on its location, speed, and heading, and at block 2540, the next beam through which the airplane will fly is identified. If at block 2545 the next beam is a satellite beam on the same satellite as the beam that is providing the communication service, then at block 2550, the transition plan is for an intra-satellite communication service change. If at block 2545, the next beam is not a satellite beam on the current satellite, then at block 2555, a determination is made as to whether the next beam is on a different satellite, and if "Yes", then the transition plan is for an inter-satellite communication service change. If at block 2555, the answer is "No", then at block 2565 a determination is made regarding whether the next beam is from an aircraft platform, and if answer is "Yes," at block 2570, then the transition plan is for a satellite-aircraft platform communication service change. If at block 2565, the answer is "No", then at block 2575 a determination is made regarding whether the next beam is from an ATG system, and if answer is "Yes," at block 2580, then the transition plan is for a satellite-ATG system communication service change. If at block 2575, the answer is "No", then at block 2590 a determination is made that the airplane is leaving the service area and continued communication service is not possible.

Embodiments of the invention may include a non-transitory computer-readable storage medium storing computer-readable instructions that, when executed by a processor of a computing device, cause the computing device to perform operations outlined in method 2500 in FIG. 25.

FIG. 26 outlines a general example method 2600 to determine transition plans for an airplane terminal's communication service from a satellite network to another satellite network or an aircraft platform network. Such a communication service may be, for example, connectivity to a private network, a local area network, the Internet, a cellular network such as a 3G, 4G, 4G LTE, LTE or 5G network, other radio network, the PLMN, the PSTN, a component of a Wi-Fi hotspot, or any other network. Applications of a communication service may be for streaming video, linear television, web browsing, e-mail, or other data. The method begins at blocks 2605, 2610, and 2615 at which the boundaries for the primary service region for all of the satellite and aircraft platform beams are defined; the boundaries for the transition regions for all the satellite and aircraft platform beams are defined; and the airplane terminal is receiving a communication service via a satellite beam. At block 2620 the latitude, longitude, speed, and direction for the airplane are obtained, and in block 2625, a determination is made as to whether or not the airplane in or near a transition region in the satellite beam. If the airplane is not in a transition region, the airplane continues to obtain its communication via the current satellite beam, as stated in block 2630. If the airplane is in a transition region, then at block 2635, the airplane's path is projected, based on its location, speed, and heading, and at block 2640, the next beam through which the airplane will fly is identified. If at block 2645, the next beam is a satellite beam on the same satellite as the beam that is providing the communication service, then at block 2650, the transition plan is for an intra-satellite communication service change. If at block 2645, the next beam is not a satellite beam on the current satellite, then at block 2655, a determination is made as to whether the next beam is on a different satellite, and if "Yes", then the transition plan is for an inter-satellite communication service change. If at block 2655, the answer is "No", then at block 2665 a determination is made regarding whether the next beam is from an aircraft platform, and if answer is "Yes," at block 2670, then the transition plan is for a satellite-aircraft platform communication service change. If at block 2665, the answer is "No", then at block 2680 a determination is made that the airplane is leaving the service area and continued communication service is not possible.

Embodiments of the invention may include a non-transitory computer-readable storage medium storing computer-readable instructions that, when executed by a processor of a computing device, cause the computing device to perform operations outlined in method 2600 in FIG. 26.

FIG. 27 outlines a general example method 2700 to determine transition plans for an airplane terminal's communication service from a satellite network to another satellite network or a ATG network. Such communication service may be, for example, connectivity to a private network, a local area network, the Internet, a cellular network such as a 3G, 4G, 4G LTE, LTE or 5G network, other radio network, the PLMN, the PSTN, a component of a Wi-Fi hotspot, or any other network. Applications of a communication service may be for video streaming, linear television, web browsing, e-mail, or other data. The method begins at blocks 2705, 2710, and 2715 at which the boundaries for the primary service region for all of the satellite beams and ATG antenna systems are defined; the boundaries for the transition regions for all the satellite beams and ATG antenna systems are defined; and the airplane terminal is receiving a communication service via a satellite beam. At block 2720 the latitude, longitude, speed, and direction for the airplane are obtained, and in block 2725, a determination is made as to whether or not the airplane is in or near a transition region in the satellite beam. If the airplane is not in a transition region, the airplane continues to obtain its communication via the current satellite beam, as stated in block 2730. If the airplane is in a transition region, then at block 2735, the airplane's path is projected, based on its location, speed, and heading, and at block 2740, the next beam through which the airplane will fly is identified. If at block 2745, the next beam is a satellite beam on the same satellite as the beam that is providing the communication service, then at block 2750, the transition plan is for an intra-satellite communication service change. If at block 2745, the next beam is not a satellite beam on the current satellite, then at block 2755, a determination is made as to whether the next beam is on a different satellite, and if "Yes", then the transition plan is for an inter-satellite communication service change. If at block 2755, the answer is "No", then at block 2765 a determination is made regarding whether the next beam is from an ATG system, and if answer is "Yes," at block 2770, then the transition plan is for a satellite-ATG system communication service change. If at block 2765, the answer is "No", then at block 2780 a determination is made that the airplane is leaving the service area and continued communication service is not possible.

Embodiments of the invention may include a non-transitory computer-readable storage medium storing computer-readable instructions that, when executed by a processor of a computing device, cause the computing device to perform operations outlined in method 2700 in FIG. 27.

FIG. 28 outlines a general example method 2800 to determine transition plans for an airplane terminal's communication service from an aircraft platform network to a satellite or ATG network. Such a communication service may be, for example, connectivity to a private network, a local area network, the Internet, a cellular network such as a 3G, 4G, 4G LTE, LTE or 5G network, other radio network, the PLMN, the PSTN, a component of a Wi-Fi hotspot, or any other network. Applications of a communication service may be for video streaming, linear television, web browsing, e-mail, or other data. The method begins at blocks 2805, 2810, and 2815 at which the boundaries for the primary service region for all of the satellite beams, aircraft platform beams, and ATG antenna systems are defined; the boundaries for the transition regions for all the satellite beams, aircraft platform beams, and ATG antenna systems are defined; and the airplane terminal is receiving a communication service via a satellite beam. At block 2820 the latitude, longitude, speed, and direction for the airplane are obtained, and in block 2825, a determination is made as to whether or not the airplane is in or near a transition region in the aircraft platform beam. If the airplane is not in a transition region, the airplane continues to obtain its communication via the current aircraft platform beam, as stated in block 2830. If the airplane is in a transition region, then at block 2835, the airplane's path is projected, based on its location, speed, and heading, and at block 2840, the next beam through which the airplane will fly is identified. If at block 2845, the next beam is an aircraft platform beam on the same aircraft platform as the beam that is providing the communication service, then at block 2850, the transition plan is for an intra-aircraft platform communication service change. If at block 2845, the next beam is not an aircraft platform beam on the current aircraft platform, then at block 2855, a determination is made as to whether the next beam is on a different aircraft platform, and if "Yes", then the transition plan is for an inter-aircraft platform communication service change. If at block 2855, the answer is "No", then at block 2865 a determination is made regarding whether the next beam is from a satellite, and if answer is "Yes," at block 2870, then the transition plan is for a aircraft platform-satellite communication service change. If at block 2865, the answer is "No", then at block 2875 a determination is made regarding whether the next beam is from an ATG system, and if answer is "Yes," at block 2880, then the transition plan is for a aircraft platform-ATG system communication service change. If at block 2875, the answer is "No", then at block 2890 a determination is made that the airplane is leaving the service area and continued communication service is not possible.

Embodiments of the invention may include a non-transitory computer-readable storage medium storing computer-readable instructions that, when executed by a processor of a computing device, cause the computing device to perform operations outlined in method 2800 in FIG. 28.

FIG. 29 outlines a general example method 2900 to determine transition plans for an airplane terminal's communication service from an ATG network to a satellite or aircraft platform network. Such a communication service may be, for example, connectivity to a private network, a local area network, the Internet, a cellular network such as a 3G, 4G, 4G LTE, LTE or 5G network, other radio network, the PLMN, the PSTN, a component of a Wi-Fi hotspot, or any other network. Applications of a communication service may be for video streaming, linear television, web browsing, e-mail, or other data. The method begins at blocks 2905, 2910, and 2915 at which the boundaries for the primary service region for all of the satellite beams, aircraft platform beams, and ATG antenna systems are defined; the boundaries for the transition regions for all the satellite beams, aircraft platform beams, and ATG antenna systems are defined; and the airplane terminal is receiving a communication service via an ATG beam. At block 2920 the latitude, longitude, speed, and direction for the airplane are obtained, and in block 2925, a determination is made as to whether or not the airplane is in or near a transition region in the ATG antenna system. If the airplane is not in a transition region, the airplane continues to obtain its communication via the current ATG antenna system, as stated in block 2930. If the airplane is in a transition region, then at block 2935, the airplane's path is projected, based on its location, speed, and heading, and at block 2940, the next beam through which the airplane will fly is identified. If at block 2945, the next beam is an ATG beam at the same ATG site as the beam that is providing the communication service, then at block 2950, the transition plan is for an intra-ATG system communication service change. If at block 2945, the next beam is not derived from the current ATG system site, then at block 2955, a determination is made as to whether the next beam is on a different ATG system site, and if "Yes", then the transition plan is for an inter-ATG system communication service change. If at block 2955, the answer is "No", then at block 2965 a determination is made regarding whether the next beam is from a satellite, and if answer is "Yes," at block 2970, then the transition plan is for an ATG-satellite communication service change. If at block 2965, the answer is "No", then at block 2975 a determination is made regarding whether the next beam is from an aircraft platform, and if answer is "Yes," at block 2980, then the transition plan is for a ATG-aircraft platform system communication service change. If at block 2975, the answer is "No", then at block 2990 a determination is made that the airplane is leaving the service area and continued communication service is not possible.

Embodiments of the invention may include a non-transitory computer-readable storage medium storing computer-readable instructions that, when executed by a processor of a computing device, cause the computing device to perform operations outlined in method 2900 in FIG. 29.

FIG. 30 outlines a general example method 3000 to determine transition plans for an airplane terminal's communication service from an aircraft platform network to another aircraft platform network or a satellite network. Such a communication service may be, for example, connectivity to a private network, a local area network, the Internet, a cellular network such as a 3G, 4G, 4G LTE, LTE or 5G network, other radio network, the PLMN, the PSTN, a component of a Wi-Fi hotspot, or any other network. Applications of a communication service may be for video streaming, linear television, web browsing, e-mail or other data. The method begins at blocks 3005, 3010, and 3015 at which the boundaries for the primary service region for all of the satellite and aircraft platform beams are defined; the boundaries for the transition regions for all the satellite and aircraft platform beams are defined; and the airplane terminal is receiving a communication service via an aircraft platform beam. At block 3020 the latitude, longitude, speed, and direction for the airplane are obtained, and in block 3025, a determination is made as to whether or not the airplane is in or near a transition region in the aircraft platform beam. If the airplane is not in a transition region, the airplane continues to obtain its communication via the current aircraft platform beam, as stated in block 3030. If the airplane is in a transition region, then at block 3035, the airplane's path is projected, based on its location, speed, and heading, and at block 3040, the next beam through which the airplane will fly is identified. If at block 3045, the next beam is an aircraft platform beam on the same aircraft platform as the beam that is providing the communication service, then at block 3050, the transition plan is for an intra-aircraft platform communication service change. If at block 3045, the next beam is not an aircraft platform beam on the current aircraft platform, then at block 3055, a determination is made as to whether the next beam is on a different aircraft platform, and if "Yes", then the transition plan is for an inter-aircraft platform communication service change. If at block 3055, the answer is "No", then at block 3065 a determination is made regarding whether the next beam is from a satellite, and if answer is "Yes," at block 3070, then the transition plan is for an aircraft platform-satellite communication service change. If at block 3065, the answer is "No", then at block 3080 a determination is made that the airplane is leaving the service area and continued communication service is not possible.

Embodiments of the invention may include a non-transitory computer-readable storage medium storing computer-readable instructions that, when executed by a processor of a computing device, cause the computing device to perform operations outlined in method 3000 in FIG. 30.

FIG. 31 outlines a general example method 3100 to determine transition plans for an airplane terminal's communication service from an ATG network to another ATG network or a satellite network. Such a communication service may be, for example, connectivity to a private network, a local area network, the Internet, a cellular network such as a 3G, 4G, 4G LTE, LTE or 5G network, other radio network, the PLMN, the PSTN, a component of a Wi-Fi hotspot, or any other network. Applications of a communication service may be for video streaming, linear television, web browsing, e-mail, or other data. The method begins at blocks 3105, 3110, and 3115 at which the boundaries for the primary service region for all of the satellite beams and ATG antenna systems are defined; the boundaries for the transition regions for all the satellite and ATG systems are defined; and the airplane terminal is receiving a communication service via an ATG system beam. At block 3120 the latitude, longitude, speed, and direction for the airplane are obtained, and in block 3125, a determination is made as to whether or not the airplane is in or near a transition region in the ATG antenna system. If the airplane is not in a transition region, the airplane continues to obtain its communication via the current ATG system, as stated in block 3130. If the airplane is in a transition region, then at block 3135, the airplane's path is projected, based on its location, speed, and heading, and at block 3140, the next beam through which the airplane will fly is identified. If at block 3145, the next beam is an ATG beam generated by the same ATG system as the beam that is providing the communication service, then at block 3150, the transition plan is for an intra-ATG communication service change. If at block 3145, the next beam is not an ATG beam derived from the current ATG system, then at block 3155, a determination is made as to whether the next beam is generated at a different ATG system site, and if "Yes", then the transition plan is for an inter-ATG communication service change. If at block 3155, the answer is "No", then at block 3165 a determination is made regarding whether the next beam is from a satellite, and if answer is "Yes," at block 3170, then the transition plan is for an ATG-satellite communication service change. If at block 3165, the answer is "No", then at block 3180 a determination is made that the airplane is leaving the service area and continued communication service is not possible.

Embodiments of the invention may include a non-transitory computer-readable storage medium storing computer-readable instructions that, when executed by a processor of a computing device, cause the computing device to perform operations outlined in method 3100 in FIG. 31.

The airplane terminal may comprise an antenna for satellite and one or more antennas for a terrestrial-based capacity augmentation system, such as one or more of an aircraft platform and ATG system, and a radio, and the radio may provide one or more of receiver and transmitter functions. The role of the airplane terminal in the network is to provide connectivity to a satellite or capacity augmentation network to facilitate the delivery of a communication service to the airplane; the communication service may include connectivity to the Internet. Passengers with devices such as smartphones, tablets, lap top computers, and other devices, obtain connectivity to the airplane terminal, which, in conjunction with the satellite and capacity augmentation network, enables them (the passengers) to obtain connectivity to a network, such as the Internet. The airplane terminal may include a wireless router to facilitate connectivity to the passengers' user devices.

The radio, which may be one or more radios and include modem functions, may contain gateways that are capable of communicating with a satellite network management system and a terrestrial-based capacity augmentation management system and may receive and execute instructions issued by the management systems and report the airplane terminal configuration to the management systems. The aircraft platform antenna and the satellite antenna may be the same antenna. FIG. 32A provides high-level block diagram for a possible arrangement of equipment on board the airplane for reception of signals from one or more of satellite, aircraft platform, and ATG systems and is referred to as airplane terminal configuration 1. In FIG. 32A, there may be a steerable antenna 3210, which may be configured to track either a satellite or aircraft platform and may transmit and receive signals from either a satellite or an aircraft platform, and a steerable or antenna 3220, which may track an ATG antenna system and may transmit and receive signals from an ATG system. The block diagram in FIG. 32A pertains to forward link signals, and those skilled in the art could construct an arrangement of components for transmission of return link signals from the airplane terminal. Antenna 3220 may also be an omni-directional antenna. Both legs of the communication system may have the familiar filtering, low noise amplification (LNA), and frequency translation 3230 hardware found in many communications systems. Each leg may feed a port of a switch 3240, which may be single pole double throw (SPDT) switch and has one port connected to a single modem 3250. The modem may be single or dual channel. The switch function 3240 may be embedded in the modem. When a satellite or aircraft platform provides the communication service to the airplane passengers, external switch 3240 may be set to the satellite/aircraft platform leg, and when the ATG provides the communication service to the airplane passengers, the switch 3240 may be set to the ATG leg. For the case where the switch function is embedded in the modem, the modem may be directly commanded externally to choose the ATG or satellite leg, or the modem may be designed to sense signals on both legs. In the arrangement depicted in FIG. 32A, the usage of the switch may permit a single modem 3250 on board the airplane, and the modem may process signals received from satellite, aircraft platform, or ATG system. A dual channel modem may accept up to 2 signals simultaneously and demodulate and decode them, in the case of the forward link. The signals may come from two separate beams on the satellite, aircraft platform, or ATG system; the dual channel feature in the modem can assist with communication service transitions, since the two channels may process signals from each satellite beam that serves a transition region, for instance. A Wi-Fi router may be communicatively coupled to the modem, and the Wi-Fi router may communicate with the passengers' devices.

FIG. 32B provides a high-level block diagram for another possible arrangement of equipment on board the airplane for reception of signals from one or more of satellite, aircraft platform, and ATG systems and is referred to as airplane terminal configuration 2. In FIG. 32B, there may be a steerable antenna 3210, which may be configured to track either a satellite or aircraft platform and may transmit and receive signals from either a satellite or an aircraft platform, and an omni directional antenna or a steerable antenna 3220, which may track an ATG antenna system and may transmit and receive signals from an ATG system. The block diagram in FIG. 32B pertains to forward link signals, and those skilled in the art could construct an arrangement of components for transmission of return link signals from the airplane terminal. Both legs of the communication system may have the familiar filtering, low noise amplification (LNA), and frequency translation 3230 hardware found in many communications systems. The satellite/aircraft platform leg may be communicatively coupled to a satellite modem 3260, which may operate on either the satellite or aircraft platform signals. The ATG leg may be communicatively coupled to an ATG network modem 3270, which may operate on ATG signals. The output of the satellite/aircraft platform modem and the output of the ATG modem may be connected to a SPDT switch 3240, whose output may be communicatively coupled to a Wi-Fi router, which may communicate with the airplane passengers' devices. Satellite modem 3260 and ATG network modem 3270 may be the same modem or be housed in the same modem.

FIG. 32C provides a high-level block diagram for a third possible arrangement of equipment on board the airplane for reception of signals from one or more of satellite, aircraft platform, and ATG systems and is referred to as airplane terminal configuration 3. In FIG. 32C, there may be a steerable antenna 3210, which may be configured to track either a satellite or aircraft platform and may transmit and receive signals from either a satellite or an aircraft platform, and an omni-directional antenna or a steerable antenna 3220, which may track an ATG antenna system and may transmit and receive signals from an ATG system. The block diagram in FIG. 32C pertains to forward link signals, and those skilled in the art could construct an arrangement of components for transmission of return link signals from the airplane terminal. Both legs of the communication system may have the familiar filtering, low noise amplification (LNA), and frequency translation 3230 hardware found in many communications systems. In the satellite/aircraft platform leg, there may be a switch at the output of the frequency translator, and the switch may be configured such that the satellite/aircraft platform leg may be communicatively coupled to a satellite modem 3260, or such that the satellite/aircraft platform leg is communicatively coupled to the ATG leg. The ATG leg may have a switch 3240 at the output of the frequency translator 3230 and one of the switch ports may be connected to satellite/aircraft platform leg. The switch 3240 in the ATG leg may be communicatively coupled to an ATG/aircraft platform network modem 3270. The switch arrangement may permit aircraft platform or ATG network signals to be similar. The output of the satellite/aircraft platform modem 3260 and the output of the ATG/aircraft platform modem 3270 may be connected to a switch 3240, whose output may be communicatively coupled to a Wi-Fi router, which may communicate with the airplane passengers' devices.

In FIGS. 32A, 32B, and 32C, the frequency translator and switch functions may be implemented via well-known Digital Signal Processing methods and techniques.

FIG. 33A provides a list of the potential communication service transitions in an aeronautical wireless communication system and the before and after system RF beams that may serve the airplane. After a communication service transition, the data path between the airplane terminal 625 and the router 660 may be different. In the event of a communication service transition, the wireless communication system may be reconfigured to support the continuity of service to the airplane passengers, and the reconfigurable items may fall into 3 categories: equipment on board an airplane, equipment on board or in a satellite/aircraft platform/ATG system, and equipment in the gateway, including the router.

The table in FIG. 33B lists the airplane communications equipment that may be reconfigured in the event of a particular communication service transition. For instance, if a communication service is transitioned from satellite to an ATG system, the terrestrial antenna (on board the airplane) may be commanded to seek out and track the correct ATG system, switches (on-board the airplane) may be set so that the Wi-Fi router (on board the airplane) may be communicatively coupled to the correct modem, and the ATG leg may be tuned to correct frequency. There are many more communication service transitions, and FIG. 33B highlights the communications equipment that may be impacted on the airplane for each of the transitions. In response to a communication service transition or anticipated communication service transition, command files may be prepared and then may be issued to the airplane terminal for execution at the appropriate time.

The table in FIG. 33C lists the satellite, aircraft platform, and ATG antenna system equipment that may be reconfigured in the event of a particular communication service transition. For instance, if a communication service is transitioned from satellite to an ATG system, the ATG antenna system may be commanded to form a beam to track the airplane and to set the RF level in the beam. There are many more communication service transitions, and FIG. 33C highlights the equipment that may be impacted in the satellite, aircraft platform, and ATG antenna system for each of the transitions. In response to a communication service transition or anticipated communication service transition, command files may be prepared and then issued to the satellite, aircraft platform, and ATG antenna system for execution at the appropriate time.

The table in FIG. 33D lists the ground gateway equipment and router that may have to be reconfigured in the event of a particular communication service transition. For instance, if a communication service is transitioned from satellite to an ATG system, the router at the ATG gateway may be configured to send and receive data packets from a network, which may be the public Internet, and the path between the ATG antenna and router may be configured. There are many more communication service transitions, and FIG. 33D highlights the equipment that is impacted in the satellite, aircraft platform, and ATG antenna system for each of the transitions.

Embodiments of the invention may include a non-transitory computer-readable storage medium storing computer-readable instructions that, when executed by a processor of a computing device, cause the computing device to command operations to implement the service transitions outlined in FIG. 33A. FIGS. 33B, 33C, and 33D list components in the airplane terminal, satellite, ATG system, aircraft platform, and gateways for the satellite, ATG system, and aircraft platform.

In response to a communication service transition or anticipated communication service transition, the NMS instructs the system to create command files to configure the system to deliver the new communication service. The NMS issues commands to the appropriate parts of the system and they are executed at an appointed time to configure the system to deliver the new communication service to an airplane terminal.

FIG. 34 illustrates a method 3400 to prepare the aeronautical broadband Internet delivery system described herein for a communication service transition. The method starts at block 3405, in which the validation of the new communication service on the new platform is validated. The platform may be the satellite, aircraft platform, or ATG network. At block 3410 plans are made to deactivate the communication service from the current platform, also called the old platform in FIG. 34. At block 3415 the communication service for the new platform is provisioned for the affected airplane terminal, and at block 3420, the time for the execution of the communication service transition is determined. At block 3425 command files are generated and issued to reconfigure the new platform (the satellite, aircraft platform, or ATG system) for the new communication service. At block 3430, command files are generated and issued to configure the gateway and router for the new communication service, and in block 3445, command files are generated and issued to airplane terminal to prepare for the new communication service. Upon the completion of 3400, the system is prepared to implement the new communication service and deactivate the old communication service for an airplane terminal.

Embodiments of the invention may include a non-transitory computer-readable storage medium storing computer-readable instructions that, when executed by a processor of a computing device, cause the computing device to command operations to implement the service transitions outlined in method 3400 in FIG. 34.

FIG. 35 provides a method for execution of a communication service transition for an airplane terminal. At block 3505 the commands to configure or reconfigure the platform that will provide a new communication service are executed, and at block 3510 the commands for configuring gateway and router associated with the new communication service are executed. At block 3515, the new communication service forward link transmission begins. At block 3520 the commands for airplane terminal reconfiguration are executed. The time of the execution of the commands is provided in step 3420 in the method to prepare the system for a communication service transition. At block 3530 a determination is made as to whether the terminal can simultaneously process signals for the old and new communication services. Maintaining the old communication service while enacting the new communication is not strictly necessary but can help the transition. If the answer at block 3530 is "No," then the current communication service is deactivated and the terminal antenna is changed or pointed to the new platform at block 3535. At block 3545 the terminal radio is configured to receive packets from the new communication service on the new platform. If the answer to block 3530 is "Yes," then the terminal radio is configured to receive packets from the new communication service on the new platform at block 3540. At block 3550 the terminal sends an acknowledgement that the service cutover was successful. At block 3555 a determination is made as to whether the terminal can simultaneously process signals for the old and new communication services; this block is identical to block 3530. If the answer at block 3555 is "Yes," then the current communication service is deactivated and configuration files for the platform, gateway, and router, associated with the old communication service, are updated at block 3565. If the answer at block 3555 is "No," then configuration files for the platform, gateway, and router, associated with the old communication service, are updated at block 3565. At block 3570 the capacity inventory for the platform associated with the old communication service is updated. At block 3575 the configuration files associated with the communication service for the new platform are updated, and at block 3580 the capacity inventory for the platform associated with the new communication service is updated. The communication service transition is complete.

Embodiments of the invention may include a non-transitory computer-readable storage medium storing computer-readable instructions that, when executed by a processor of a computing device, cause the computing device to command operations to implement the service transitions outlined in method 3500 in FIG. 35.

What is claimed is:

1. A method, comprising:
determining a first bandwidth for a first gateway to a first user beam connection on a multi-beam satellite, associated with a satellite service area, to provide a first communication service to a first airplane terminal to enable the first airplane terminal to connect to a network;
providing the first communication service to the first airplane terminal;
increasing the first bandwidth an additional bandwidth, wherein the additional bandwidth is obtained by switching a second bandwidth from a second gateway to a second user beam connection on the multi-beam satellite to the first bandwidth;
continuing to provide-the first communication service for the first airplane terminal;
preparing a third gateway to a third user beam connection with a third bandwidth to provide a third communication service to a second airplane terminal to enable the second airplane terminal to connect to the network; and configuring the third gateway to the third user beam connection via a satellite switch to provide the third communication service to the second airplane terminal.

2. The method of claim 1 further comprising:

receiving a first request regarding the first airplane terminal; and changing, based on the first request, the first airplane terminal from the first communication service to a second communication service.

3. The method of claim 1 further comprising:

receiving a second request regarding the first airplane terminal; and changing, based on the second request, the first airplane terminal from a second communication service to the first communication service.

4. The method of claim 1, wherein the first gateway to first user beam connection and the second gateway to second user beam connection are implemented using the same gateway.

5. The method of claim 1, wherein the gateway to the third user beam connection that provides the third communication service is generated by a second multi-beam satellite.

6. The method of claim 1, further comprising:

configuring the first gateway to the first user beam connection via a satellite switch to continue to provide the first communication service to the first airplane terminal.

7. The method of claim 1, further comprising:

configuring the second gateway to the second user beam connection via a satellite switch to provide a second communication service to a third airplane terminal.

8. The method of claim 1, further comprising:

configuring at least a portion of the first bandwidth with sufficient power to provide the first communication service.

9. The method of claim 1 further comprising:

Configuring at least portion of the third bandwidth with sufficient power to provide the third communication service.

10. A non-transitory computer-readable storage medium storing computer-readable instructions that, when executed by a processor of a computing device, cause the computing device to perform operations comprising:

determining a first bandwidth for a first gateway to a first user beam connection on a multi-beam satellite, associated with a satellite service area, to provide a first communication service to a first airplane terminal to enable the first airplane terminal to connect to a network;

providing the first communication service to the first airplane terminal;

increasing the first bandwidth with an additional bandwidth, wherein the additional bandwidth is obtained by switching a second bandwidth of second gateway to second user beam connection on the multi-beam satellite to the first bandwidth;

continuing to provide the first communication service for the first airplane terminal;

preparing a third gateway to a third user beam connection with sufficient bandwidth to provide a third communication service to a second airplane terminal to enable the second airplane terminal to connect to the network; and configuring the third gateway to the third user beam connection via a satellite switch to provide the third communication service to the second airplane terminal.

11. The non-transitory computer-readable storage medium of claim 10, wherein the computer-readable instructions cause the computing device to perform further operations comprising:

receiving a first request regarding the first airplane terminal;

changing, based on the first request, the first airplane terminal from the first communication service to a second communication service.

12. The non-transitory computer-readable storage medium of claim 10, wherein the first gateway to first user beam connection and the second gateway to second user beam connection are implemented using the same gateway.

13. The non-transitory computer-readable storage medium of claim 10, wherein the third gateway to the third user beam connection that provides the third communication service is generated by a second multi-beam satellite.

14. The non-transitory computer-readable storage medium of claim 10, wherein the computer-readable instructions cause the computing device to perform further operations comprising:

configuring the first bandwidth with sufficient power to provide the first communication service.

15. A system comprising:

a first device configured to determine a first bandwidth for a first gateway to a first user beam connection on a multi-beam satellite, associated with a satellite service area, to provide a first communication service to a first airplane terminal to enable the first airplane terminal to connect to a network a second device configured to configure the first gateway to first user beam connection with the first bandwidth on the satellite;

a third device configured to determine an additional bandwidth sufficient to provide at least the first communication service to the first airplane terminal;

a fourth device configured to increase the first bandwidth by the additional bandwidth, wherein the additional bandwidth is obtained by switching a second bandwidth from a second gateway to a second user beam connection on the multi-beam satellite to the first bandwidth; and a fifth device configured to configure a third gateway to a third user beam connection with a third bandwidth to provide a third communication service to a second airplane terminal to enable the second airplane terminal to connect to the network, wherein the third gateway to the third user beam connection is established via a satellite switch to provide the third communication service to the airplane terminal.

16. The system of claim 15, wherein the first gateway to the first user beam connection and the second gateway to the second user beam connection are implemented using the same gateway.

17. The system of claim 15, wherein the system is further configured to cause the multi-beam satellite to configure the first bandwidth with sufficient power to provide the first communication service.

* * * * *